Oct. 17, 1933.  W. L. VAN NESS  1,931,336
GLASSWARE FORMING MACHINE
Filed Aug. 23, 1929  55 Sheets-Sheet 4
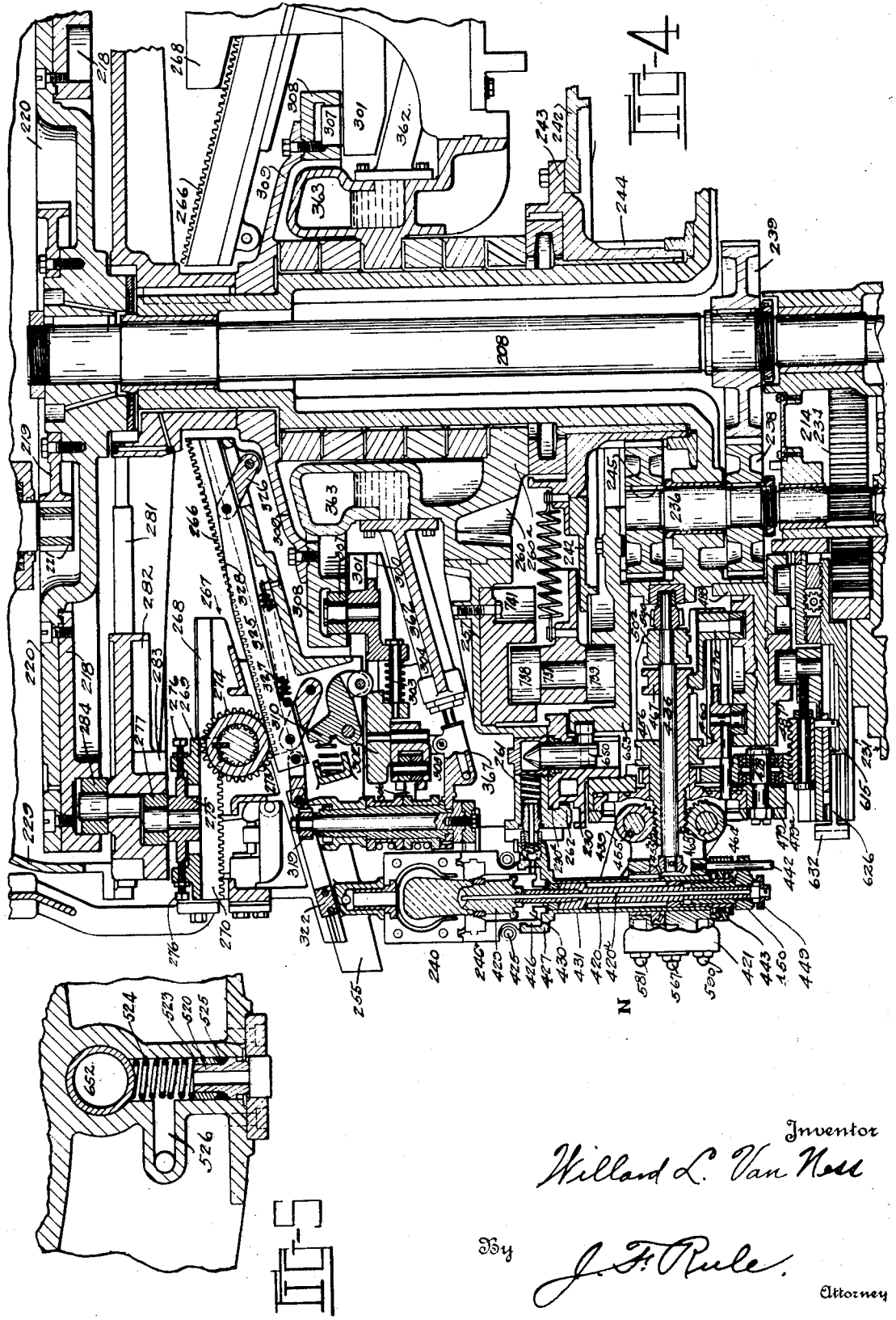
Inventor
Willard L. Van Ness
By J. F. Rule.
Attorney

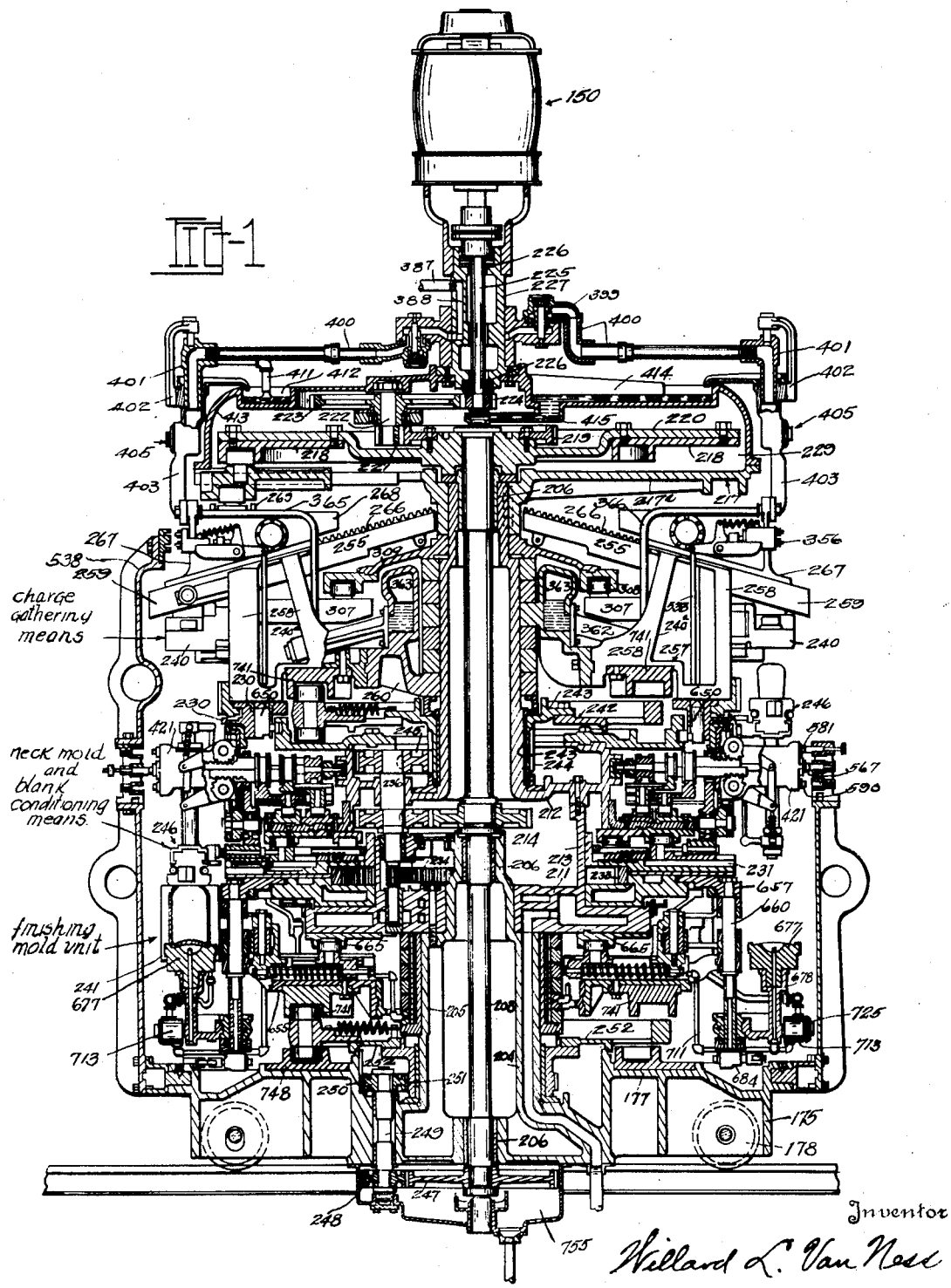

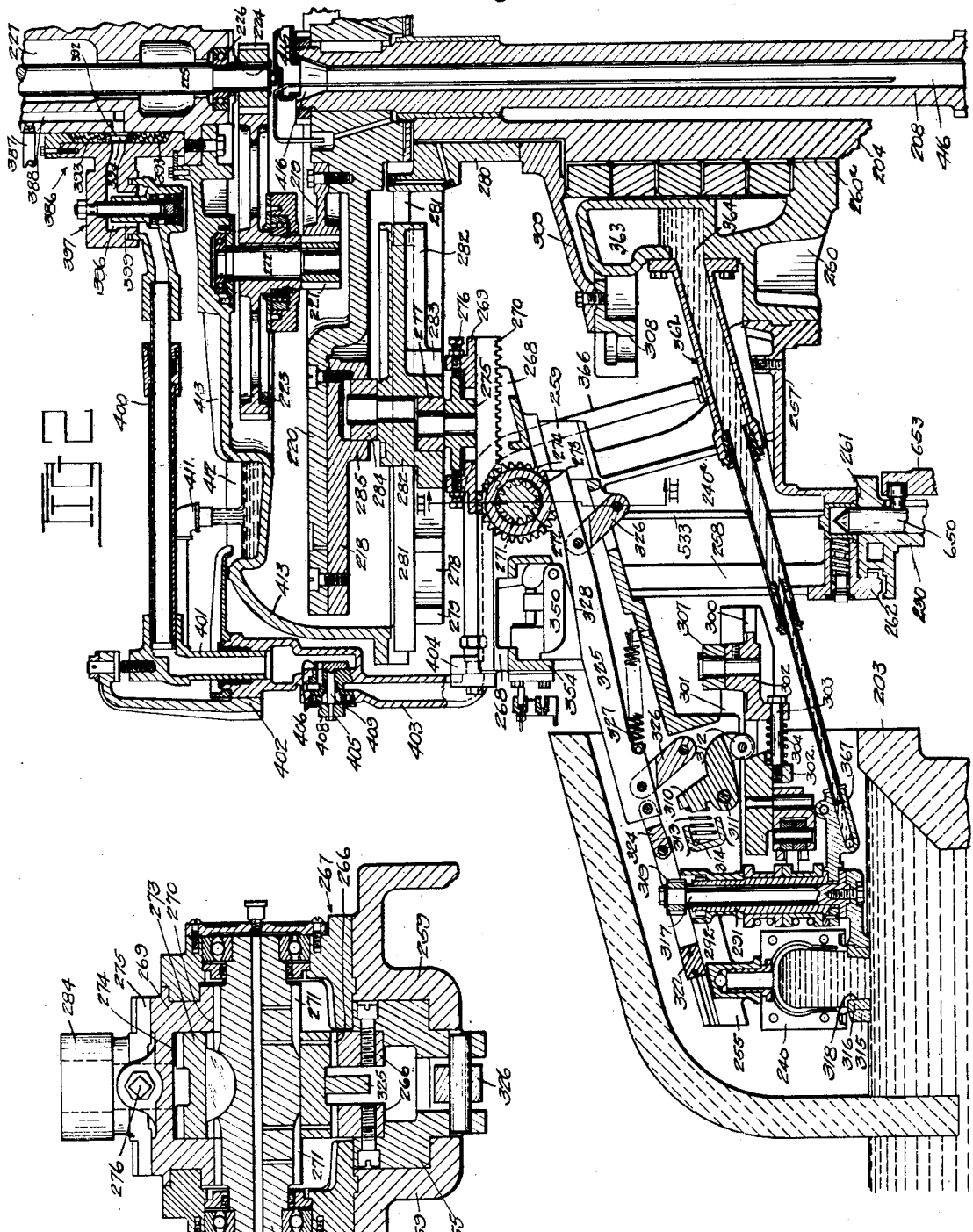

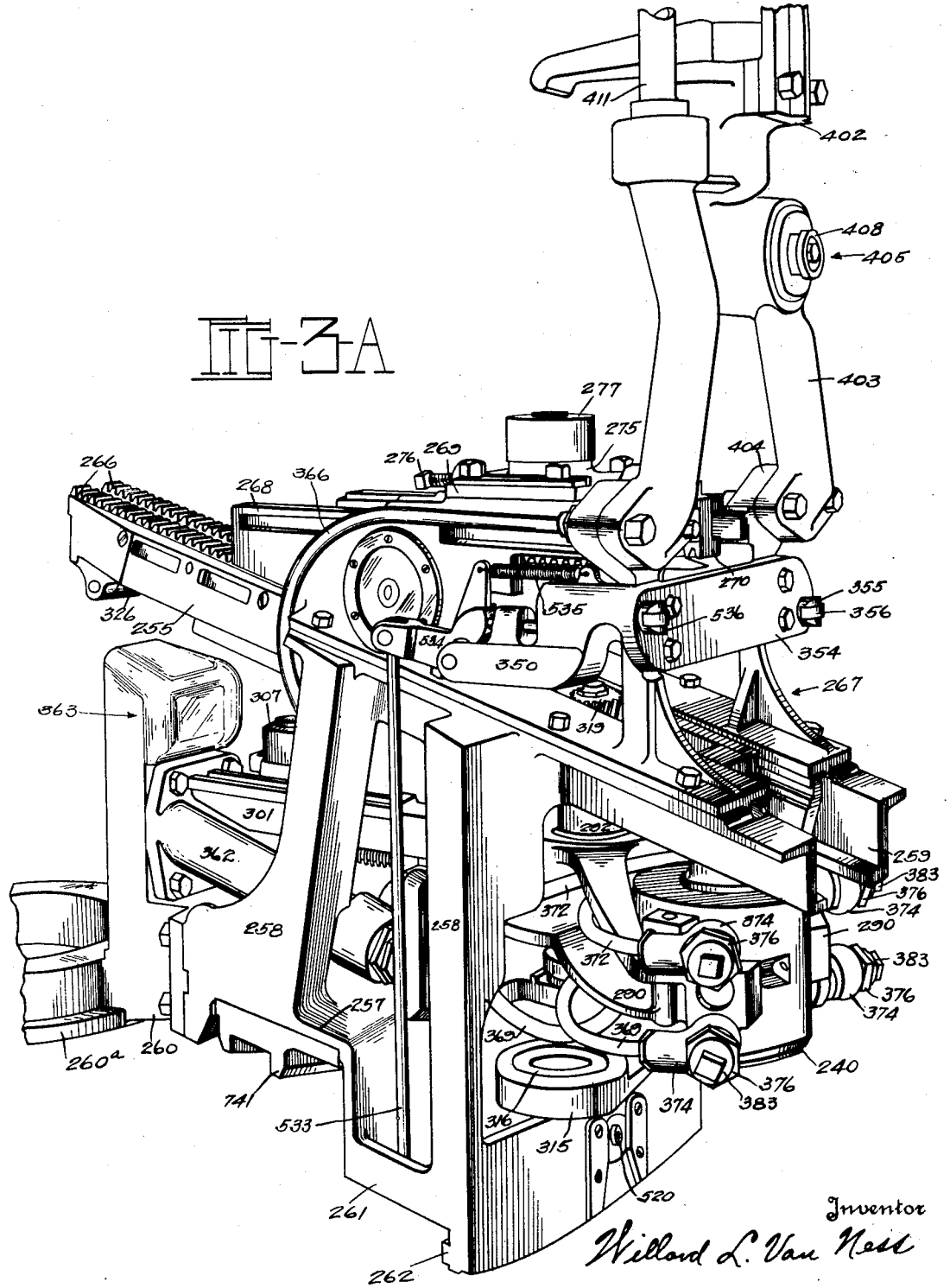

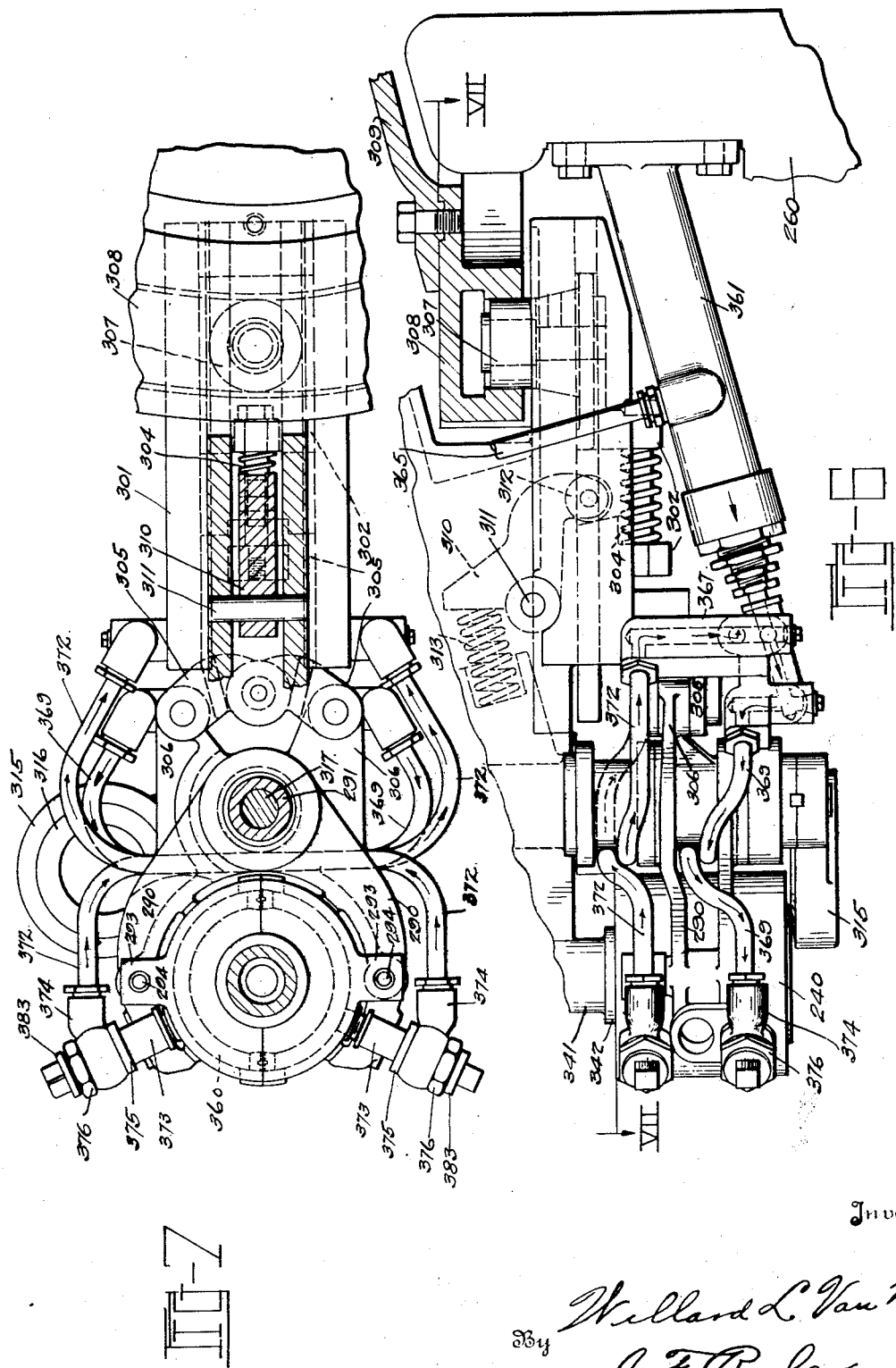

Oct. 17, 1933.  W. L. VAN NESS  1,931,336
GLASSWARE FORMING MACHINE
Filed Aug. 23, 1929  55 Sheets-Sheet 6
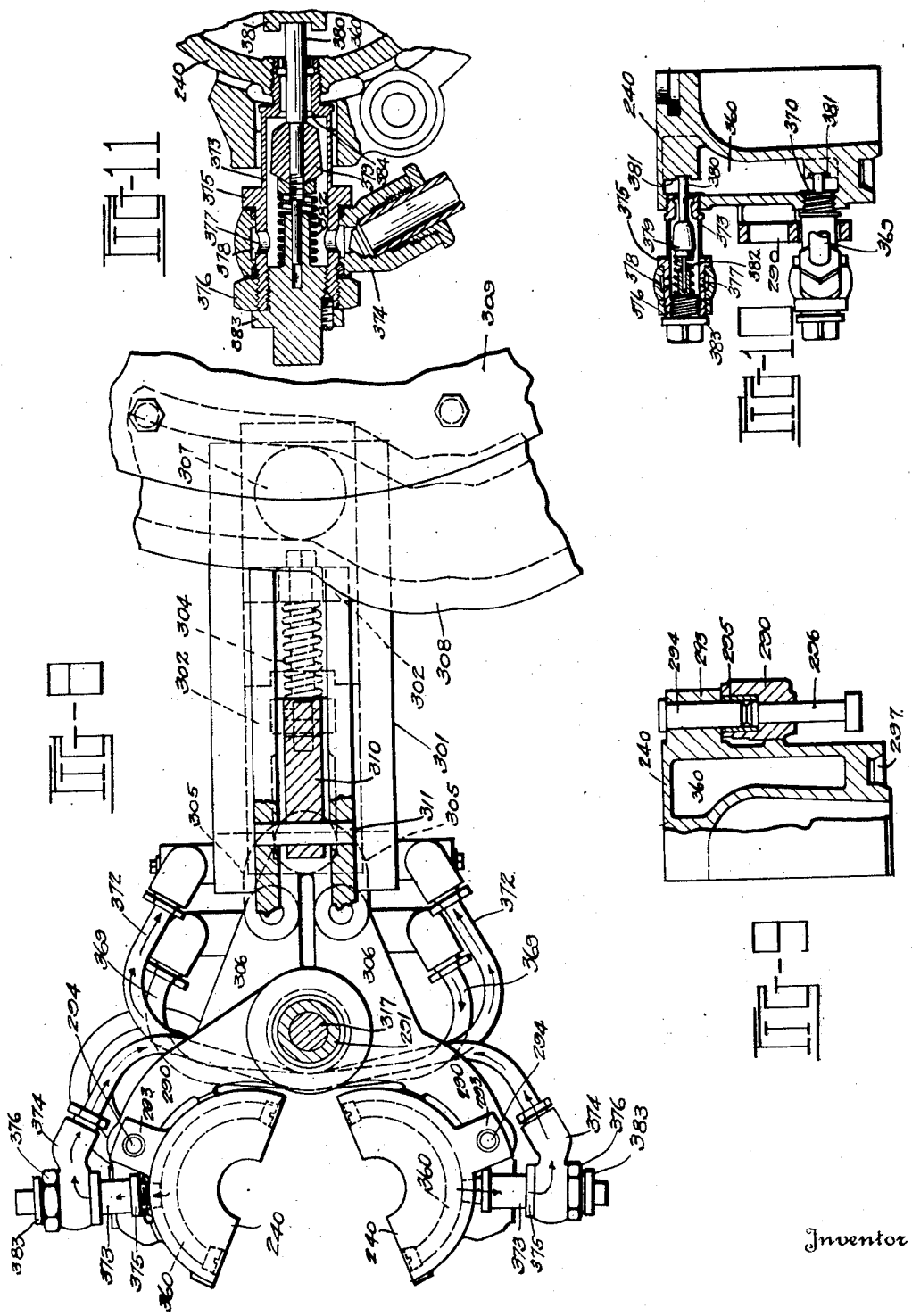
Inventor
By Willard L. Van Ness
J. F. Rule, Attorney

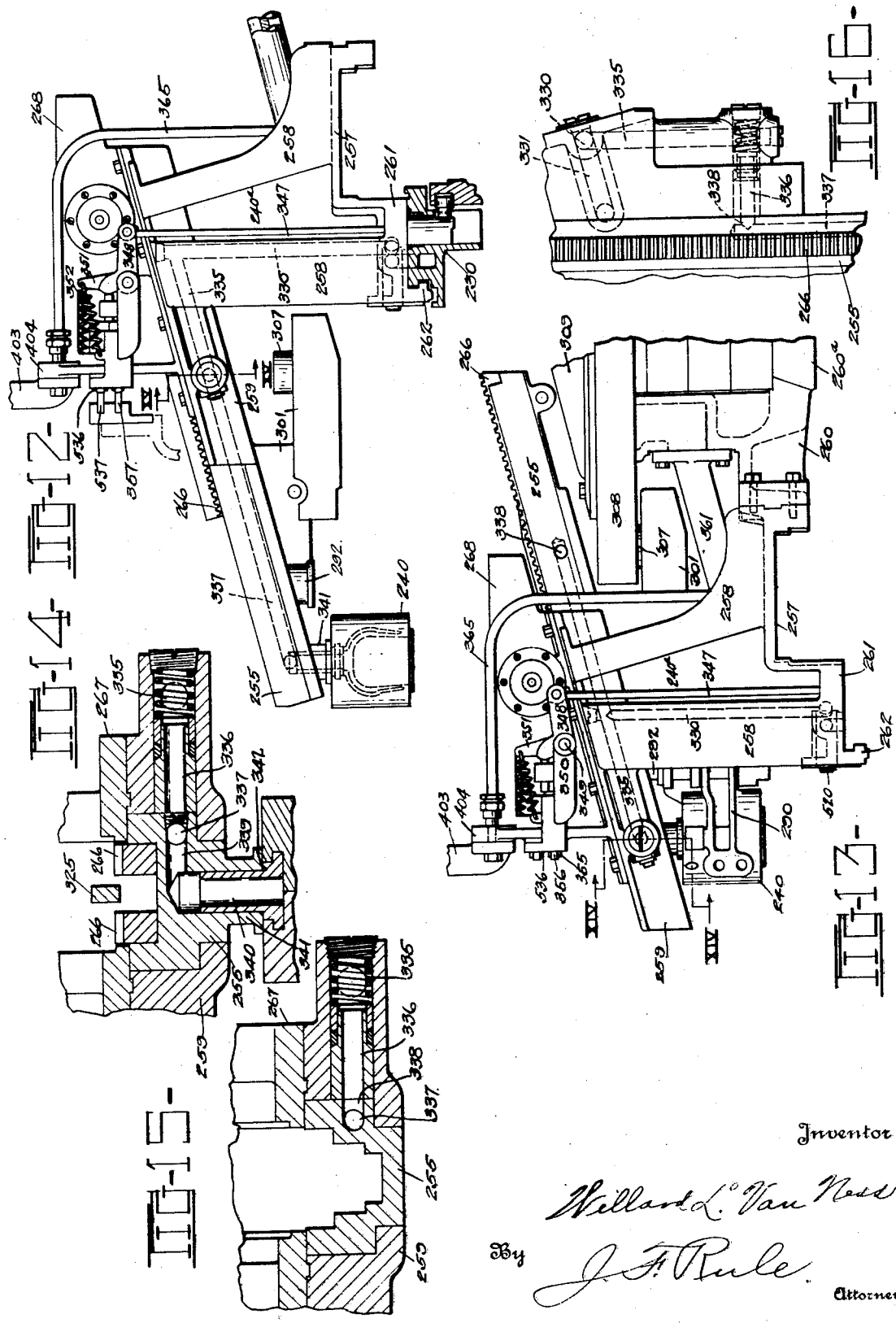

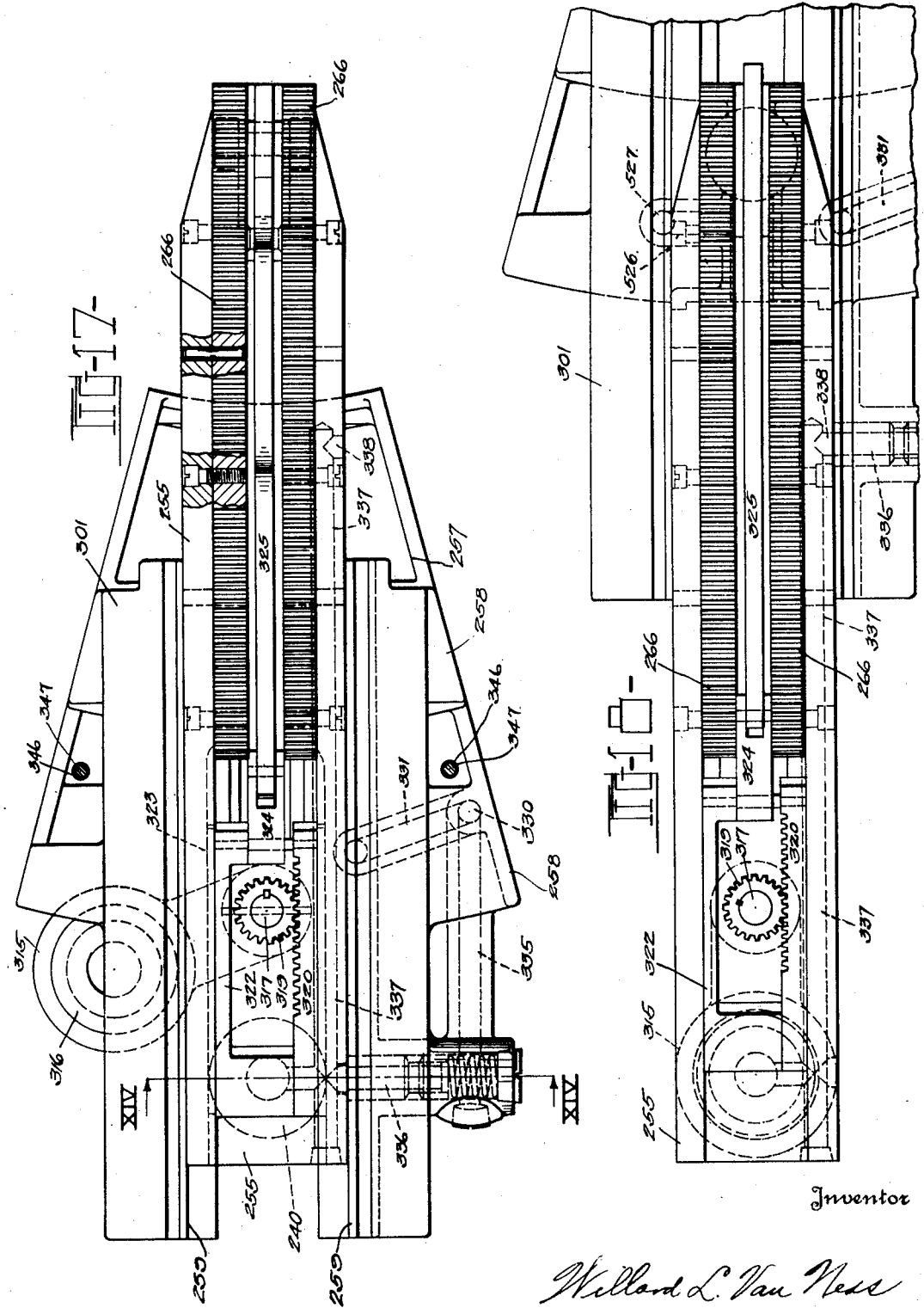

Oct. 17, 1933.  W. L. VAN NESS  1,931,336
GLASSWARE FORMING MACHINE
Filed Aug. 23, 1929   55 Sheets-Sheet 9
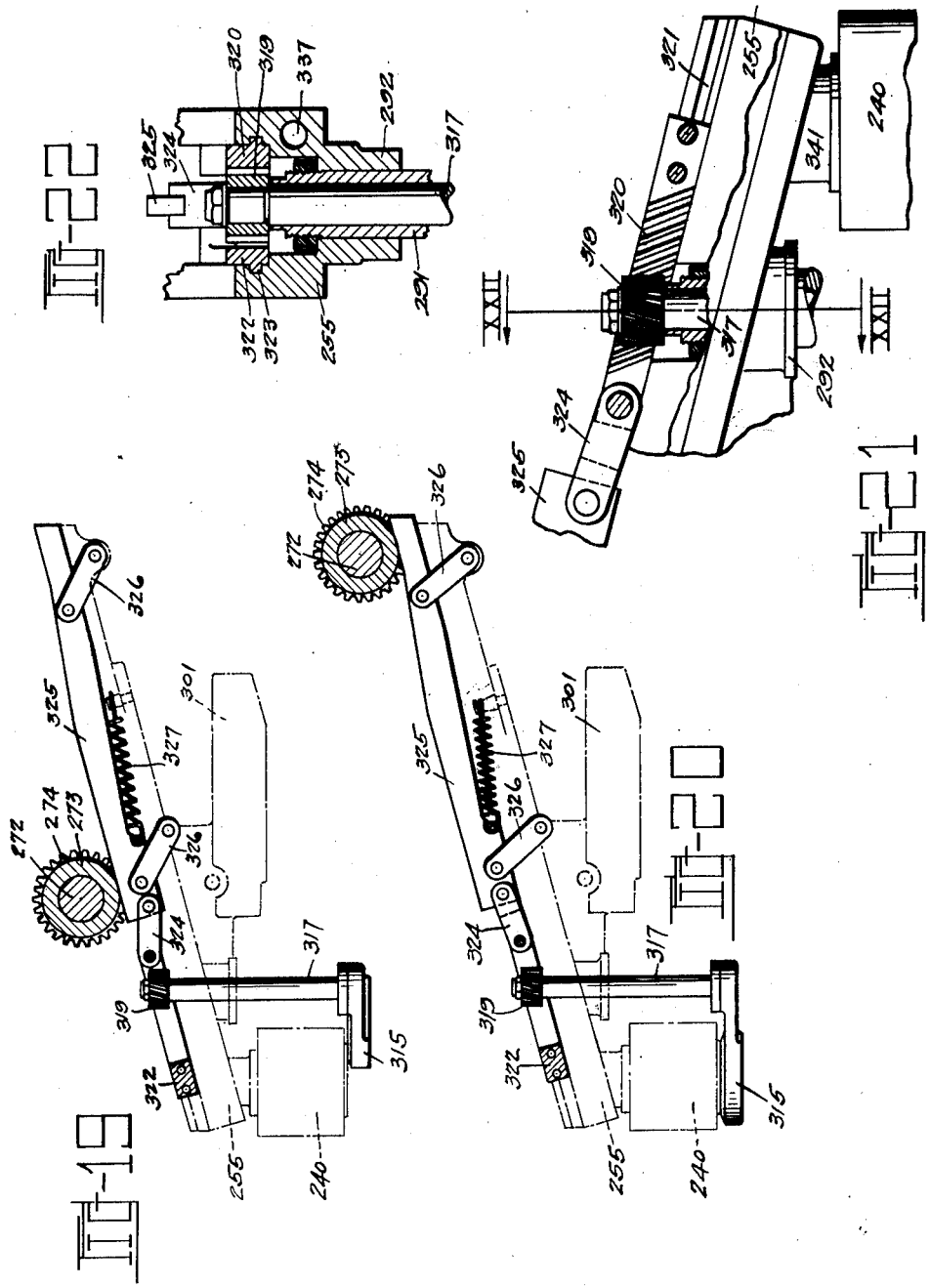
Inventor
Willard L. Van Ness
By J. F. Rule.
Attorney

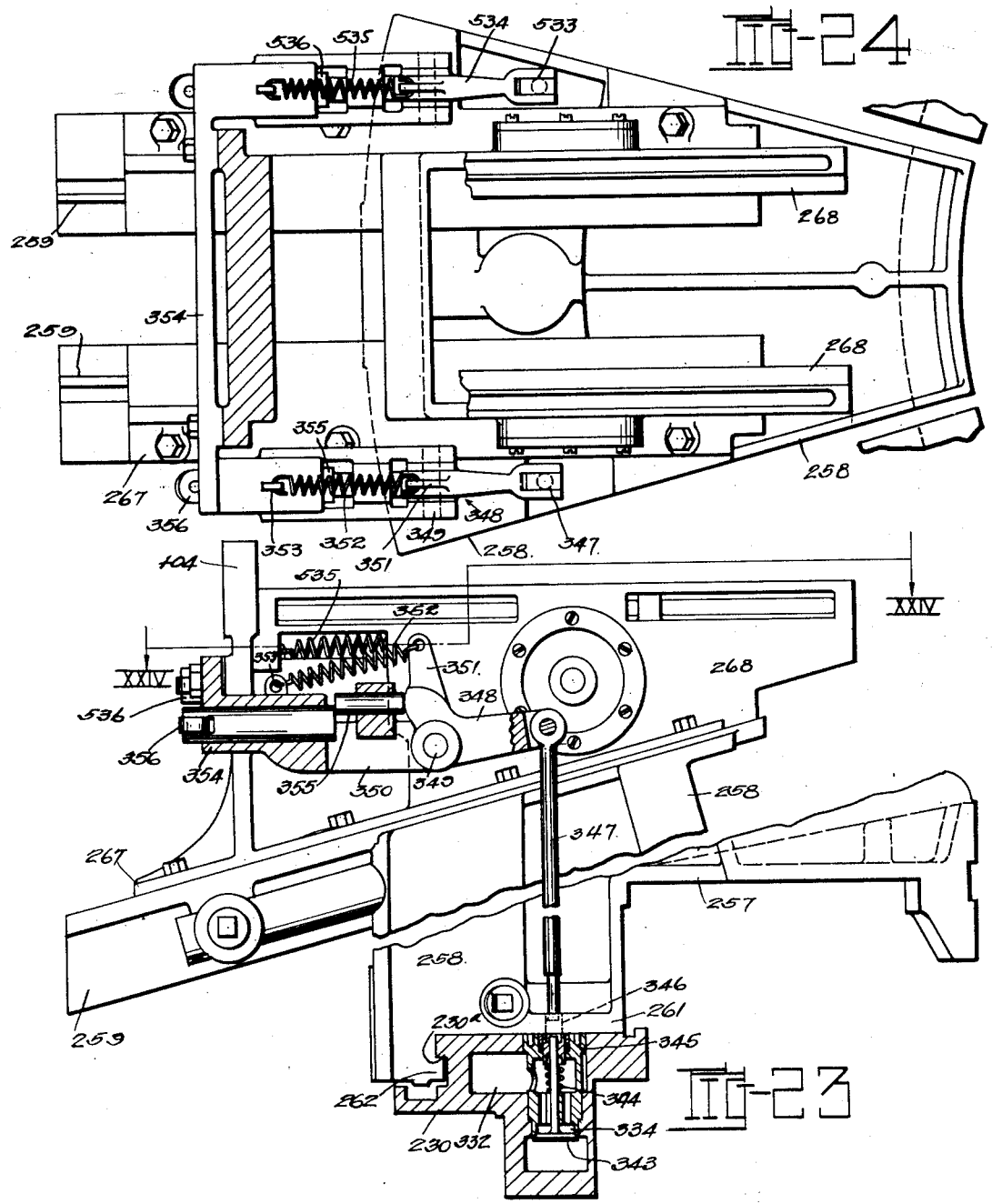

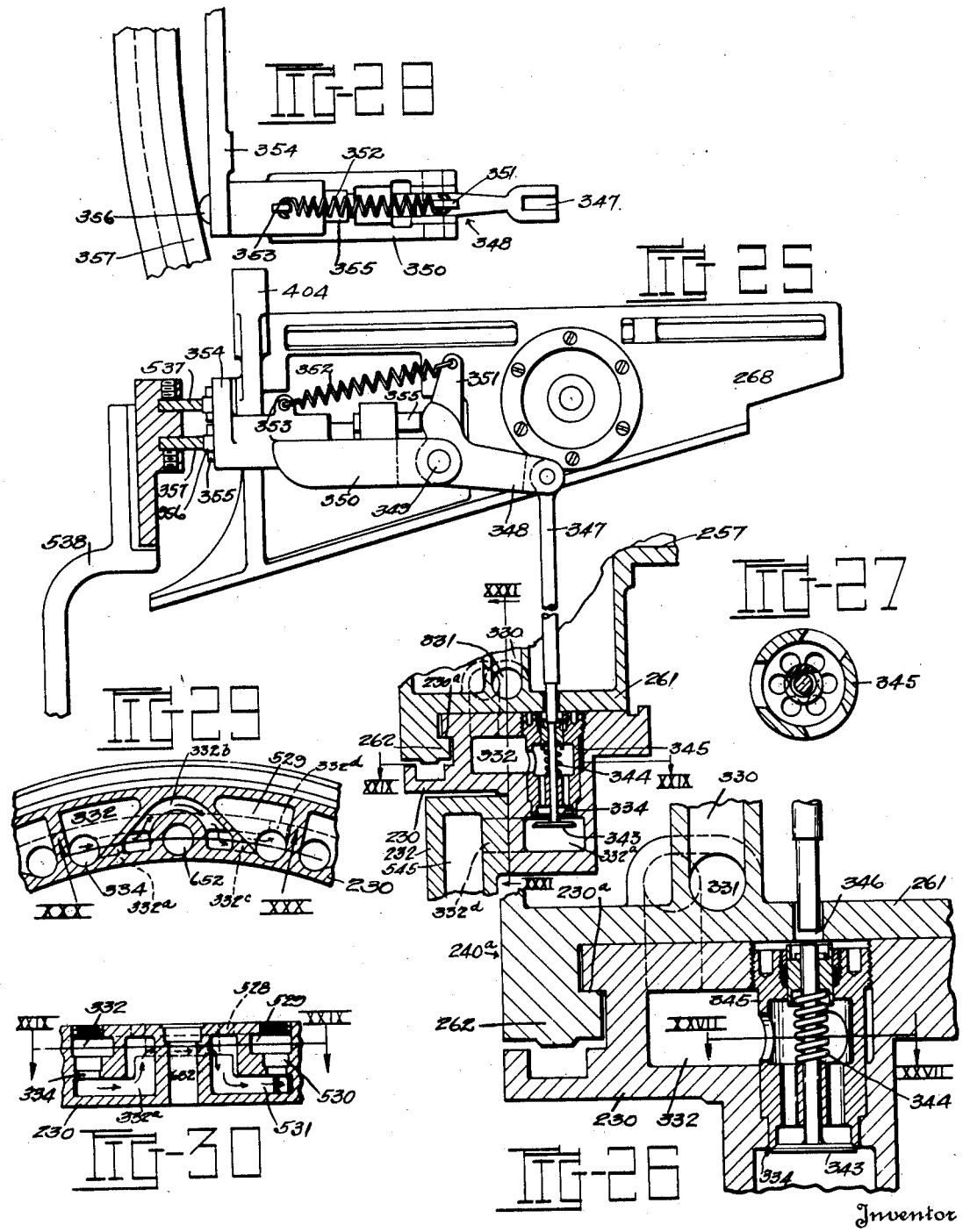

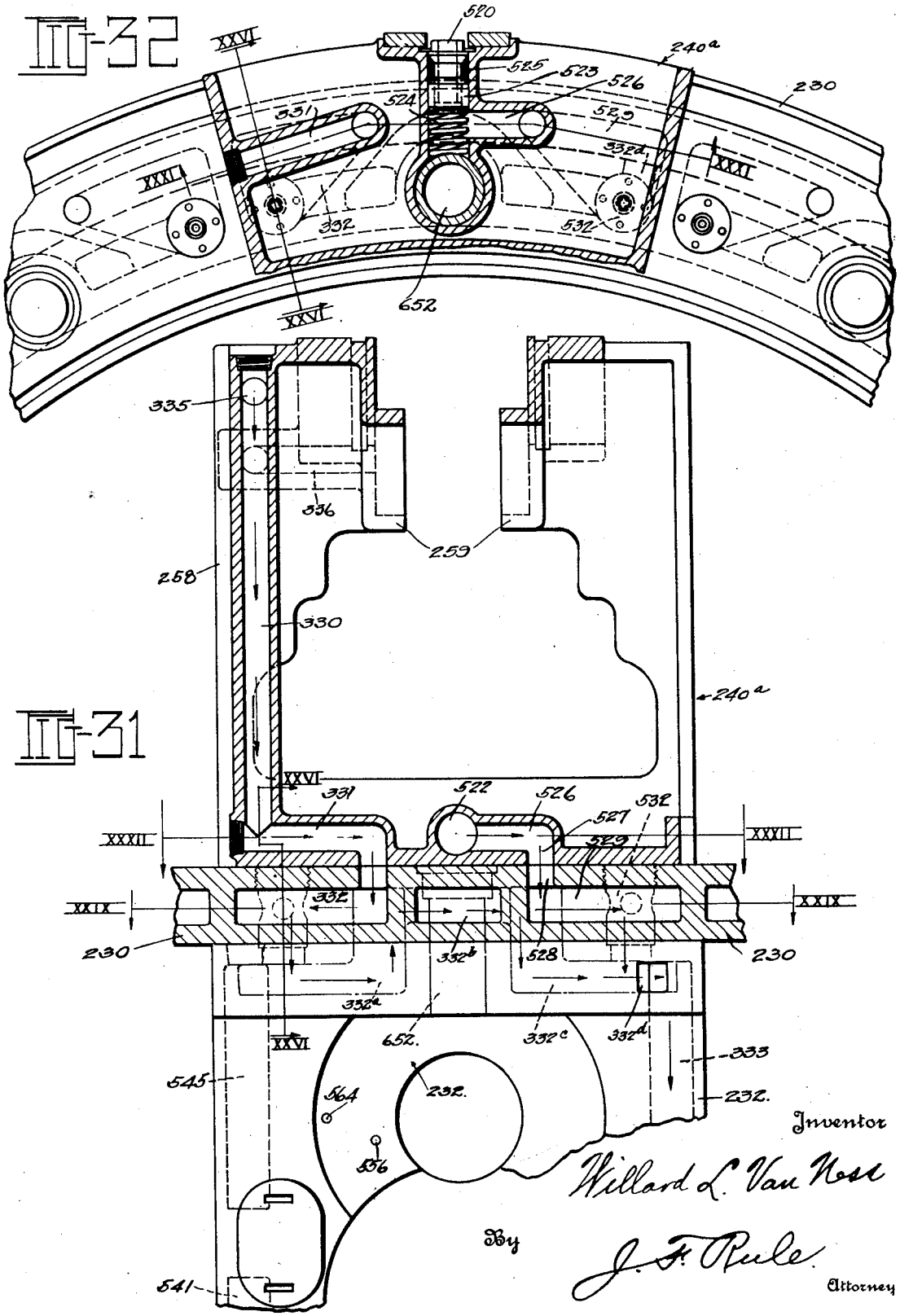

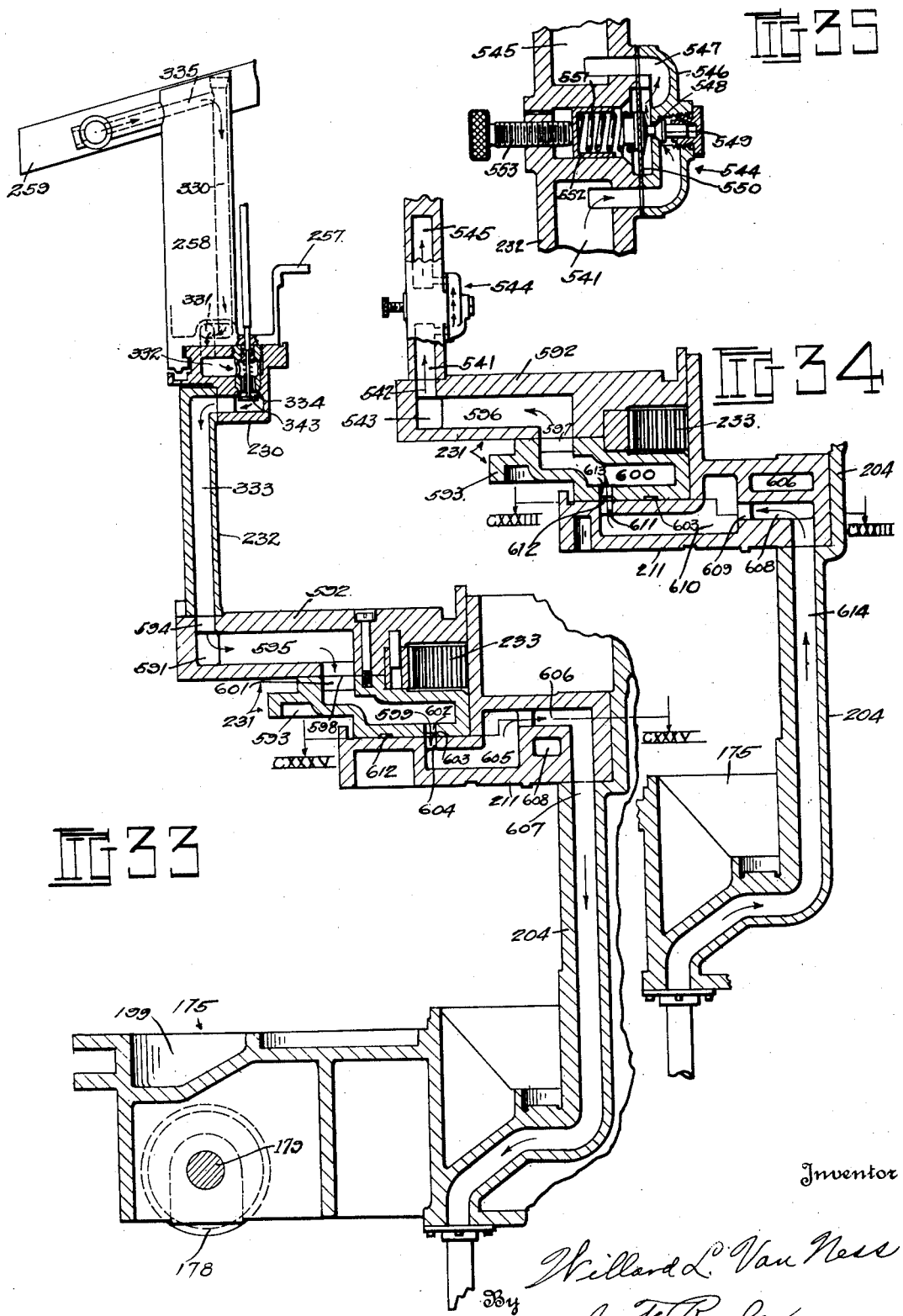

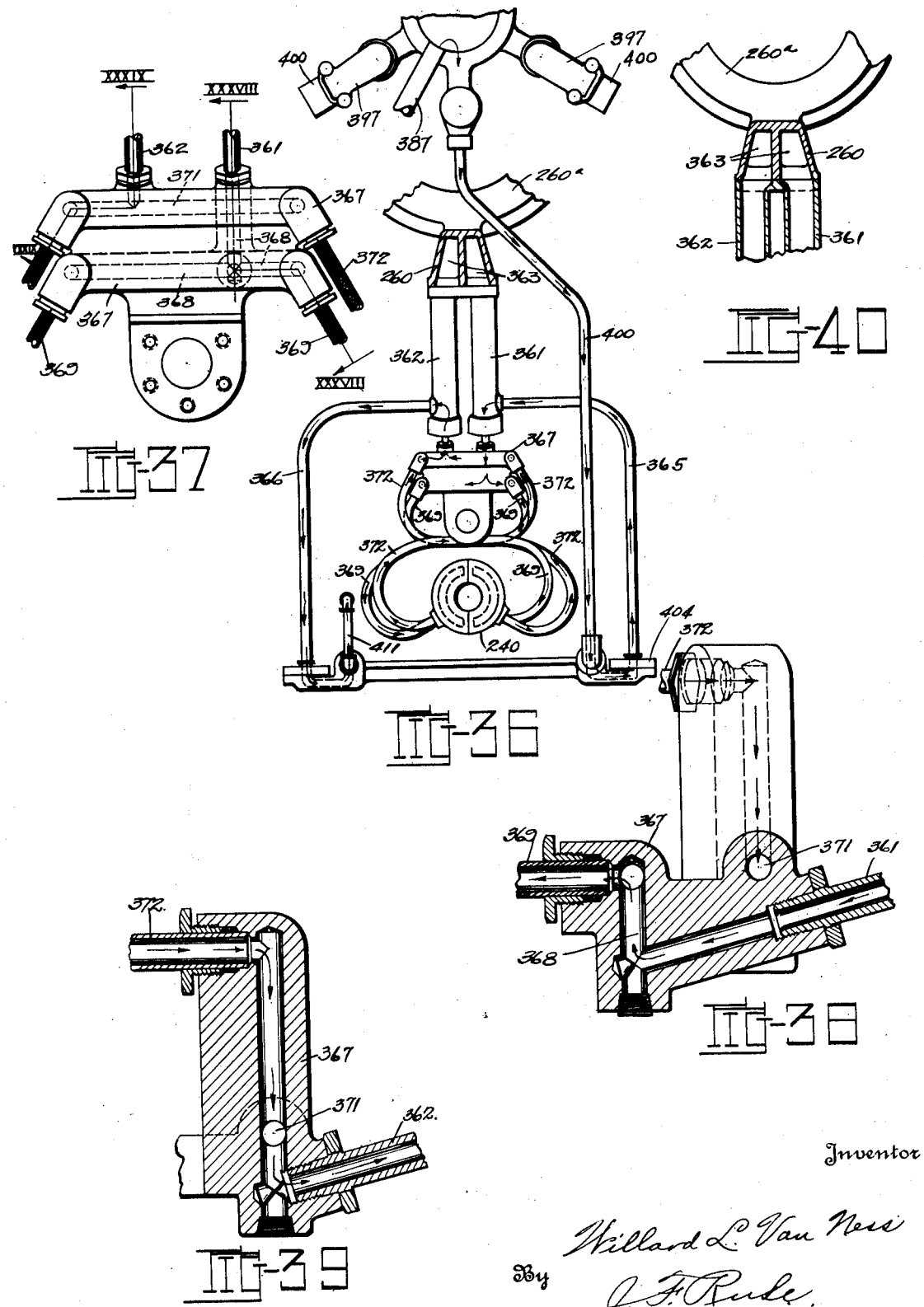

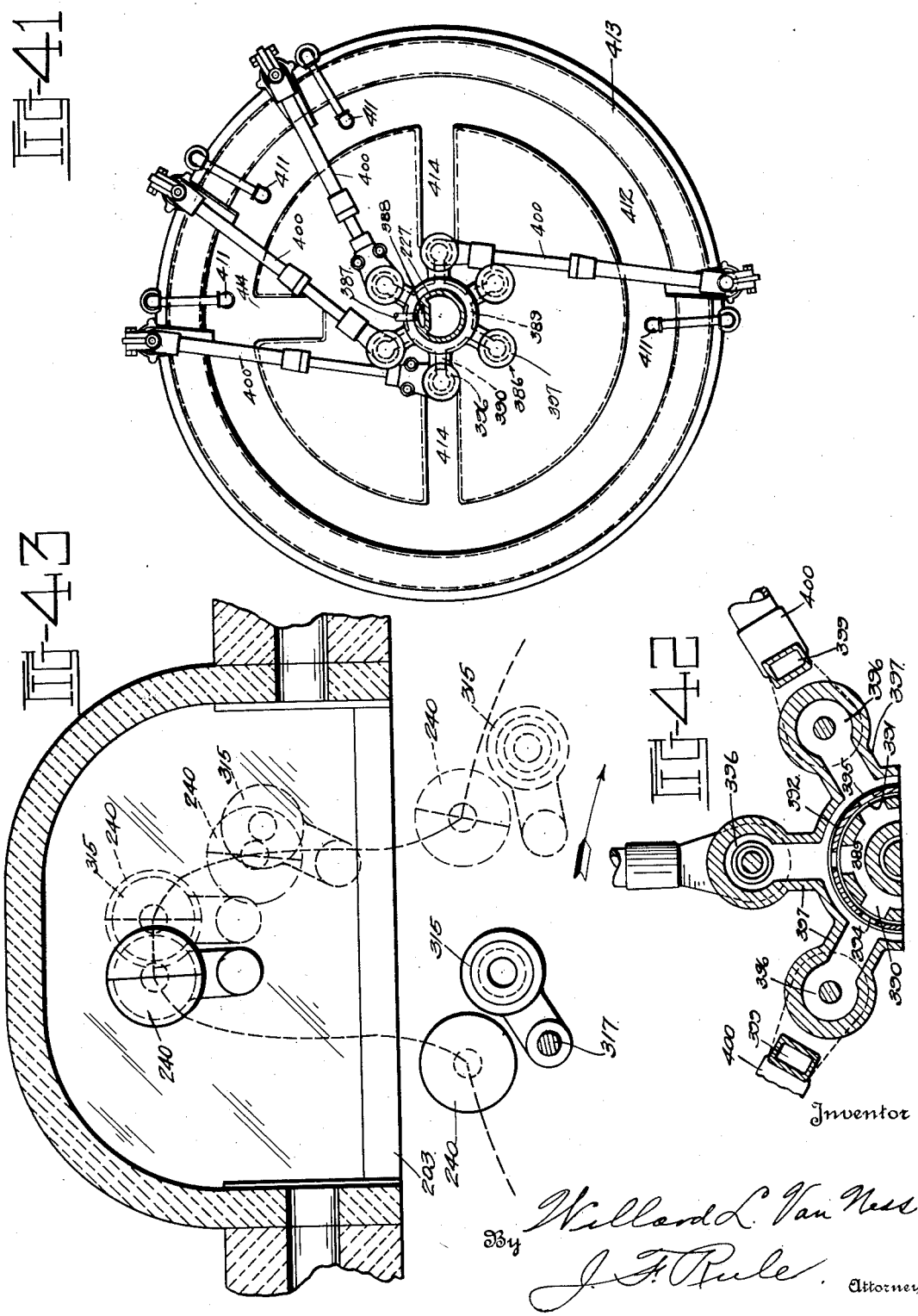

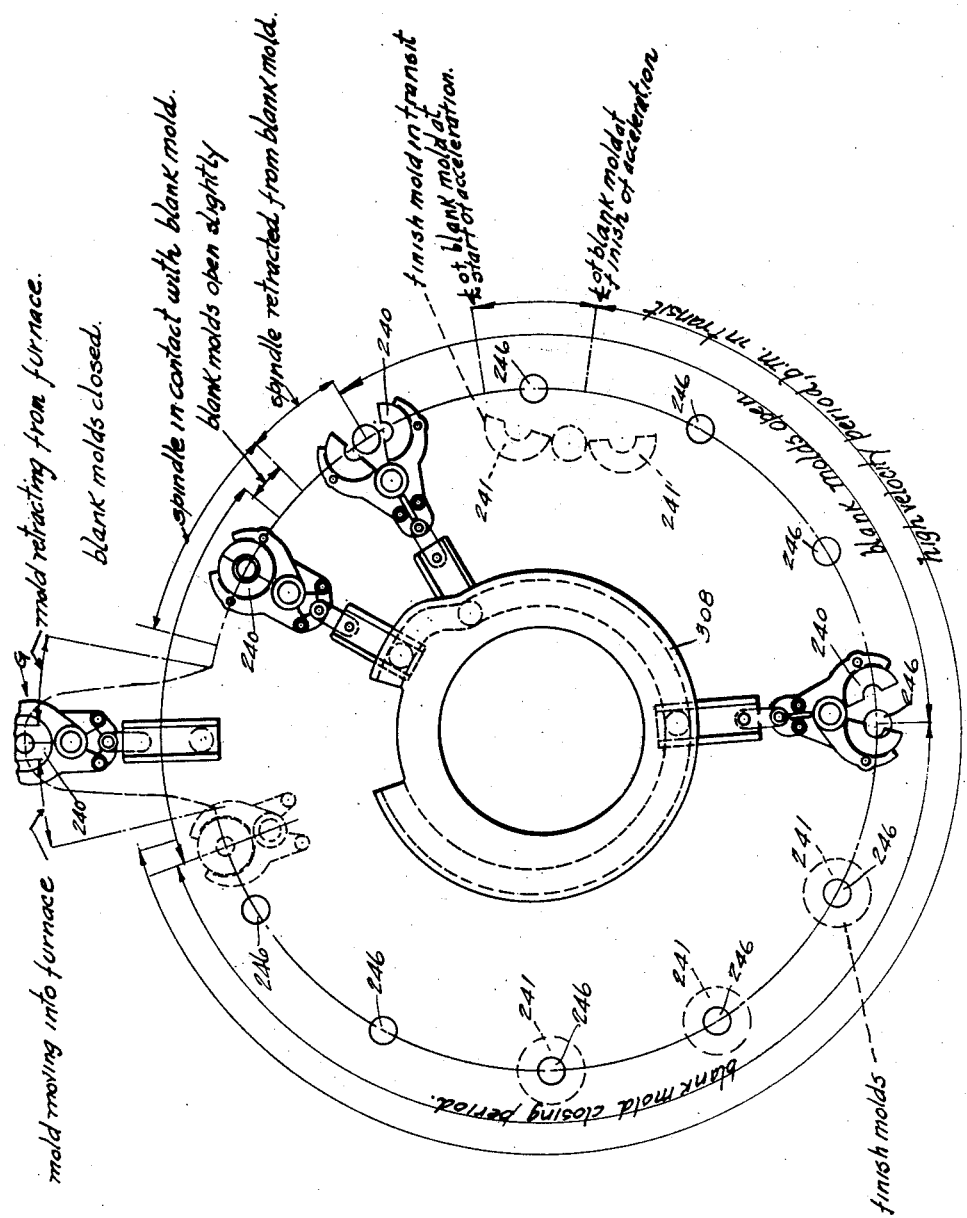

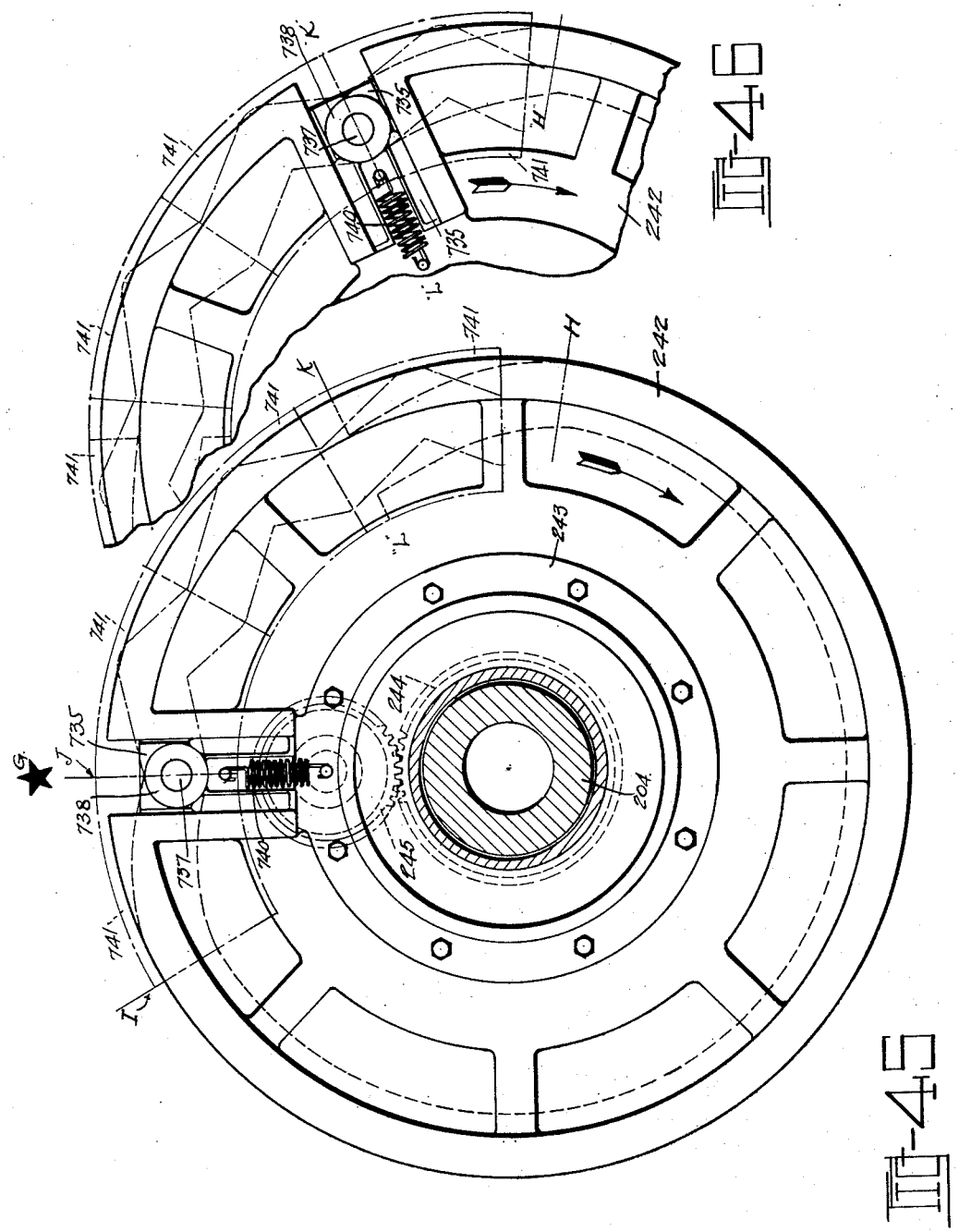

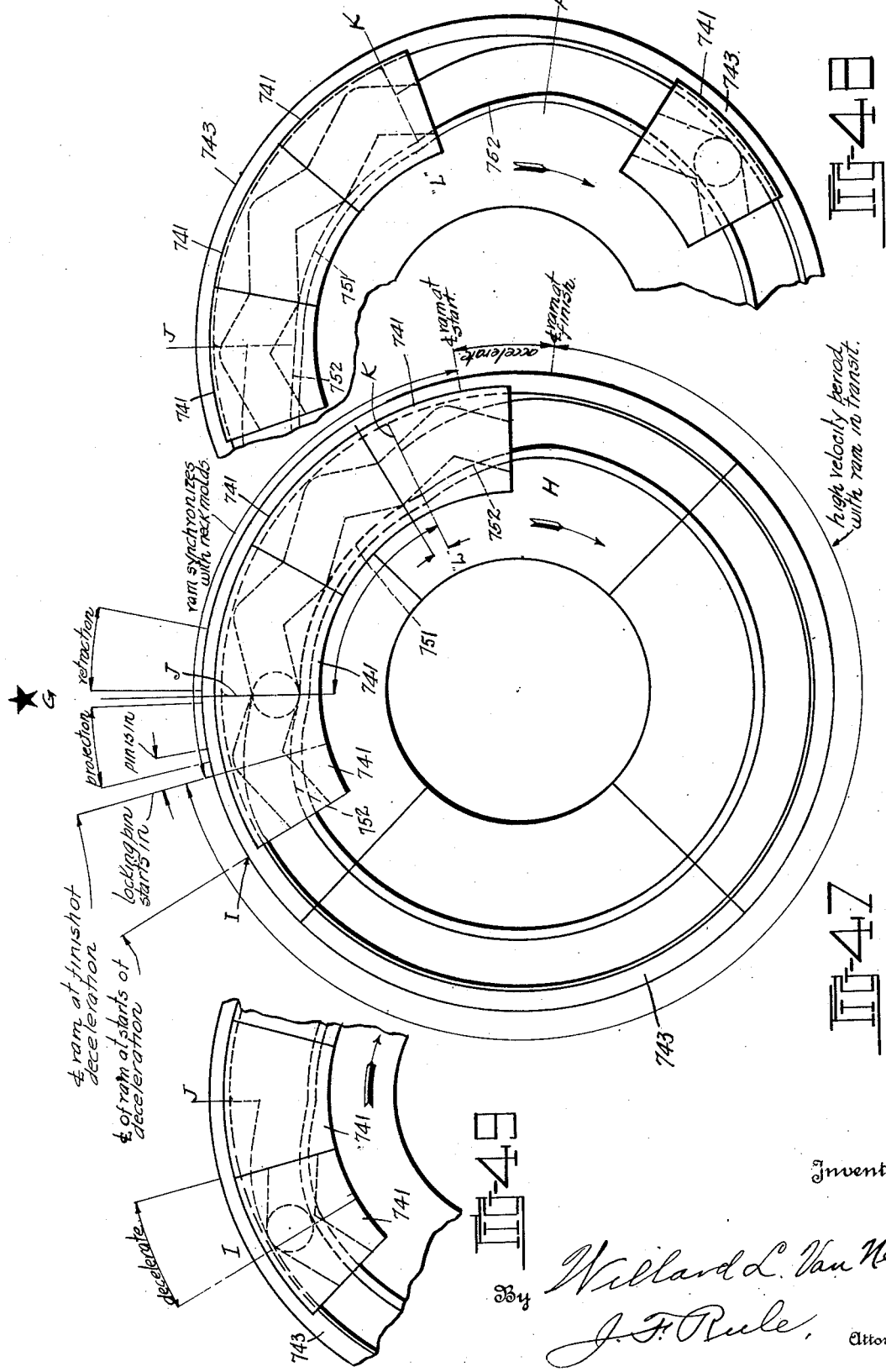

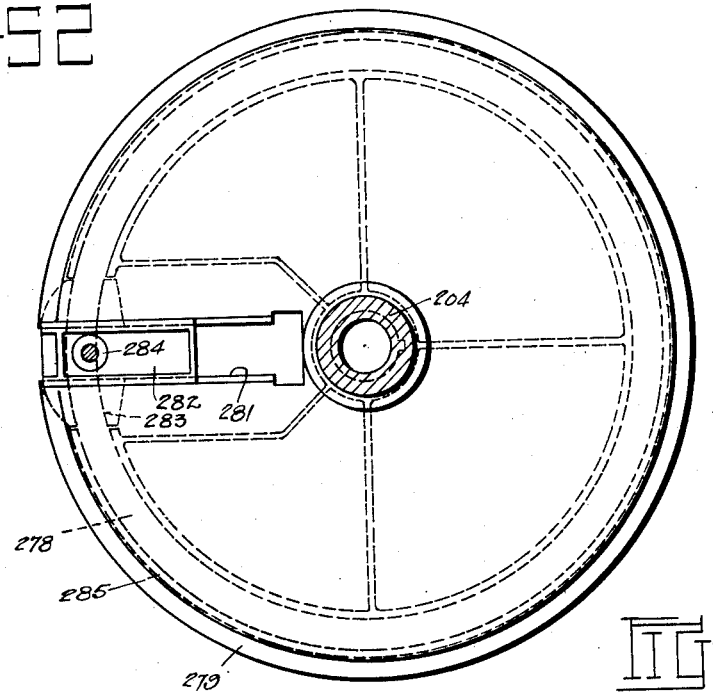
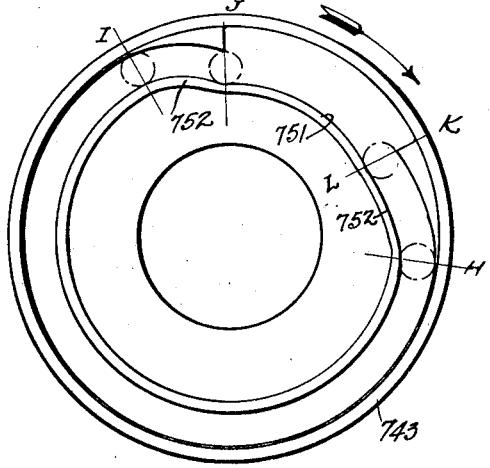
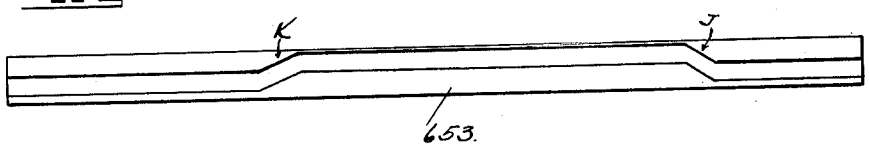

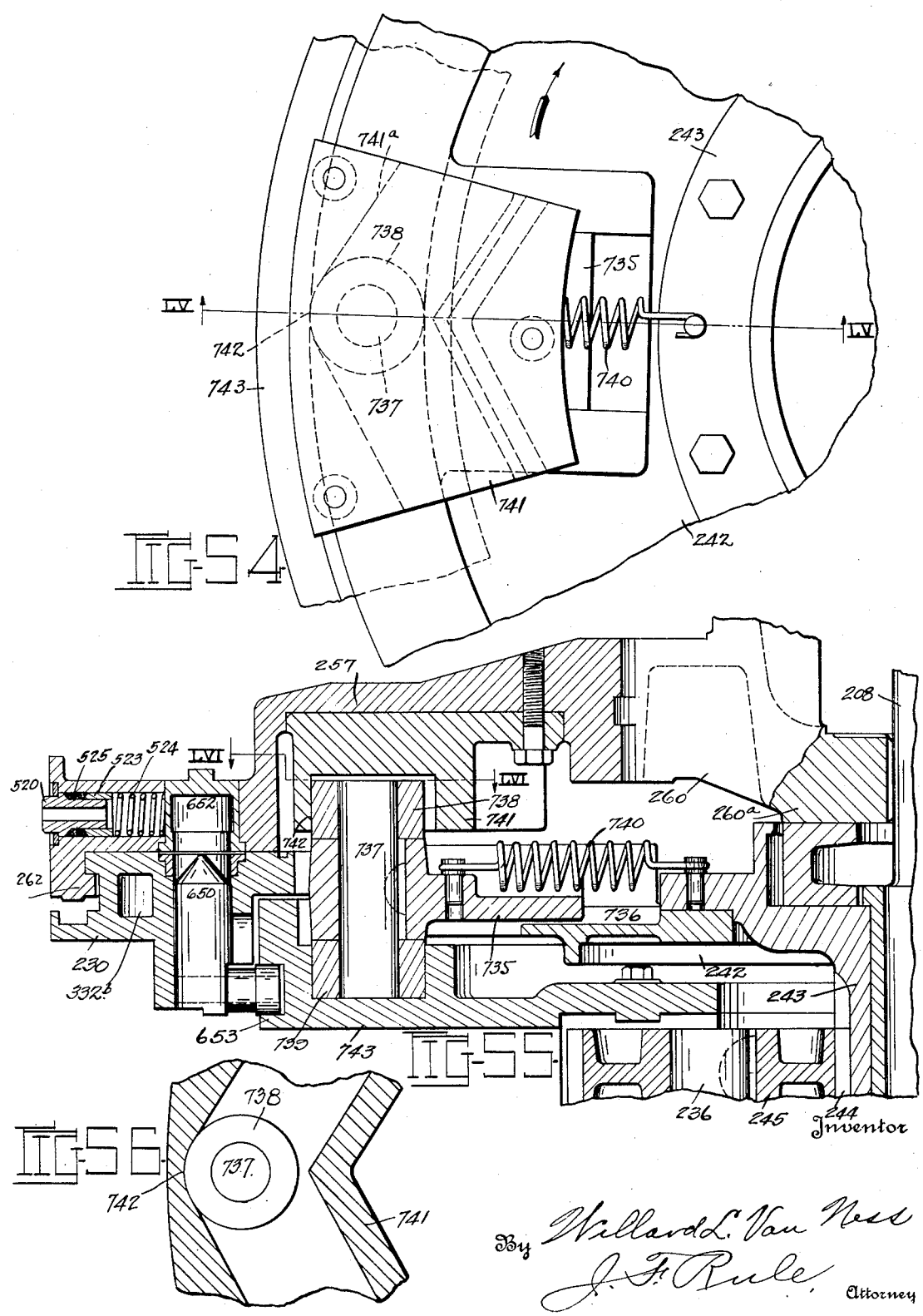

Oct. 17, 1933.  W. L. VAN NESS  1,931,336
GLASSWARE FORMING MACHINE
Filed Aug. 23, 1929  55 Sheets-Sheet 21
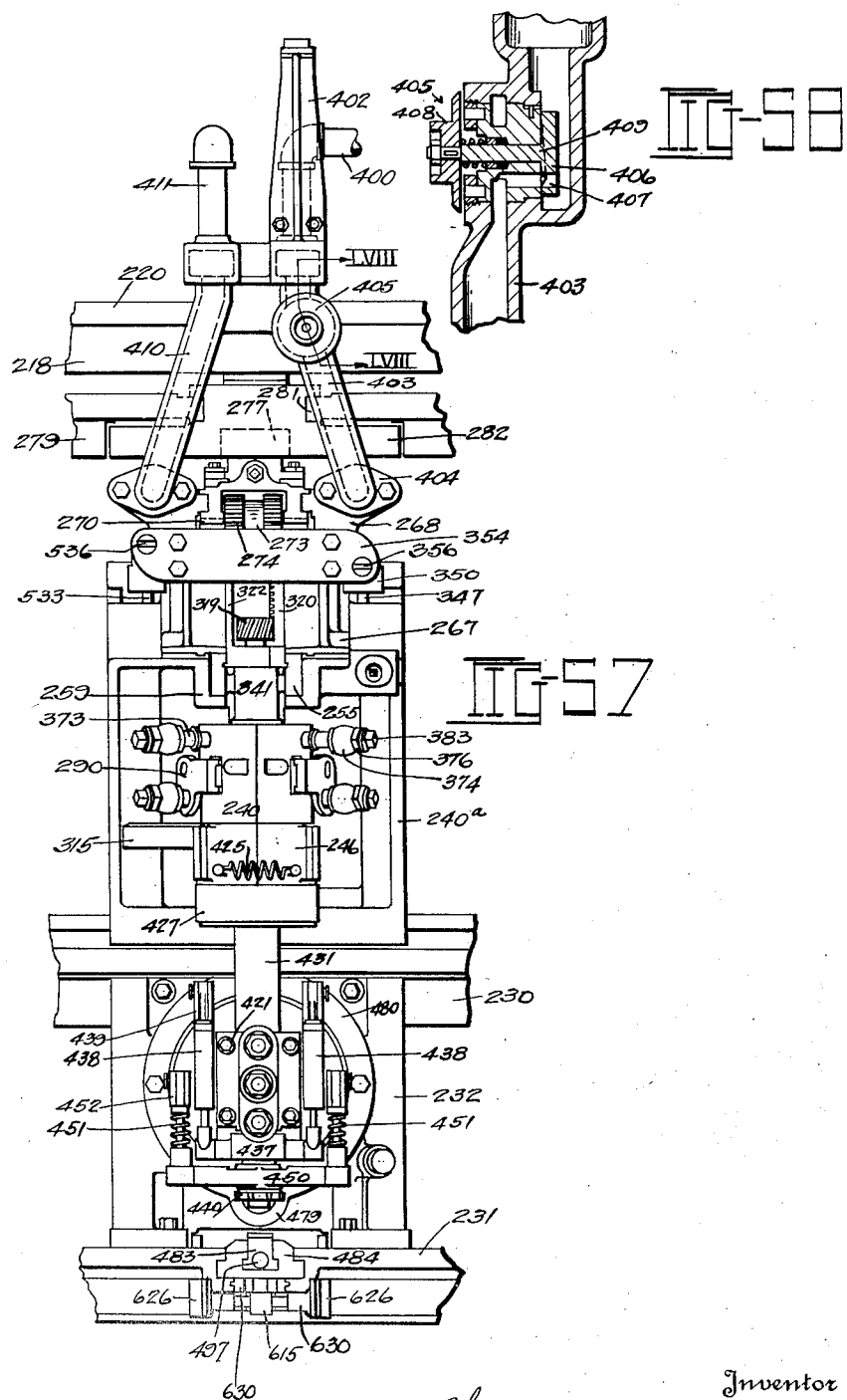
Inventor
Willard L. Van Ness
By
J. F. Rule
Attorney

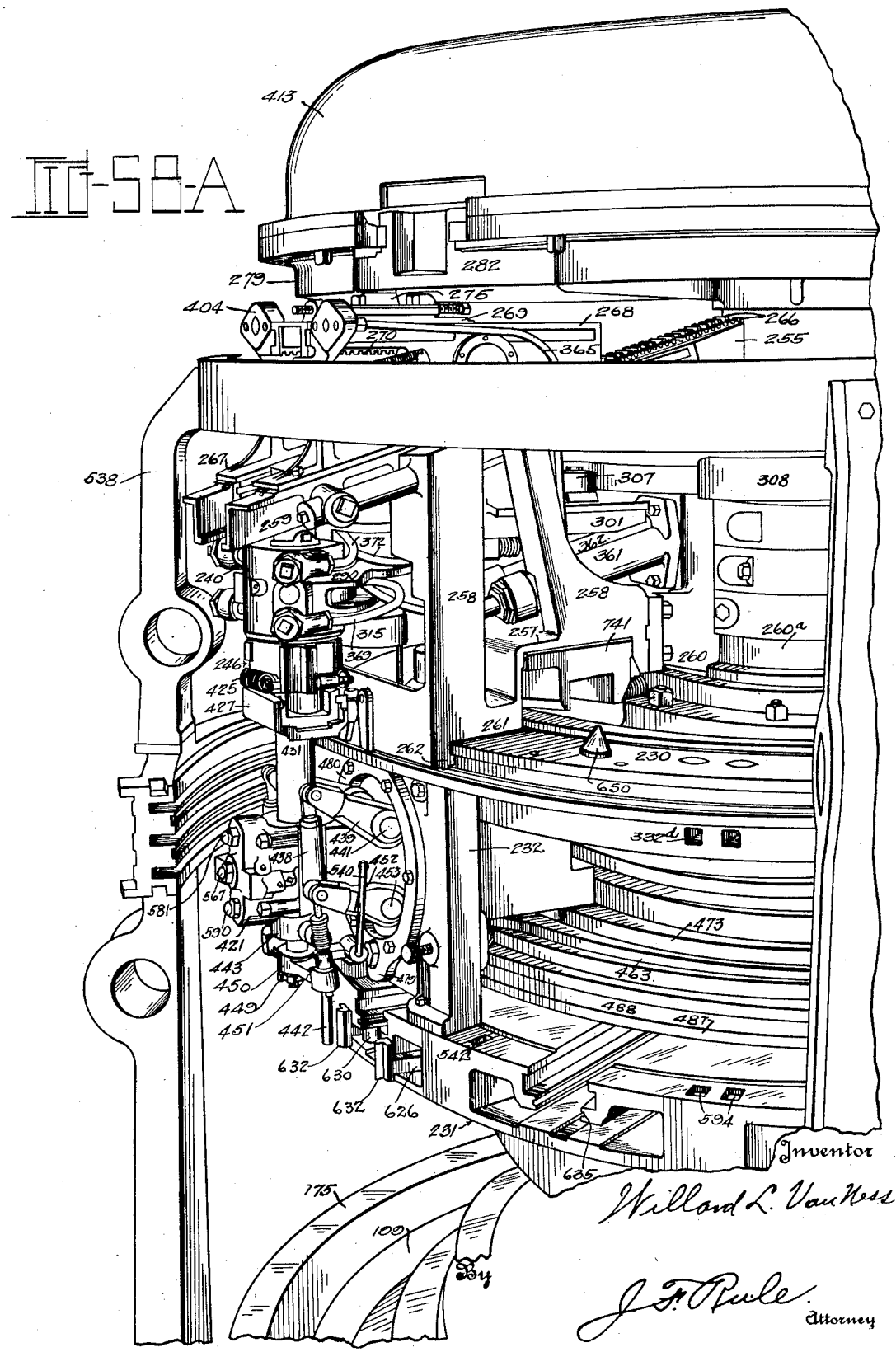

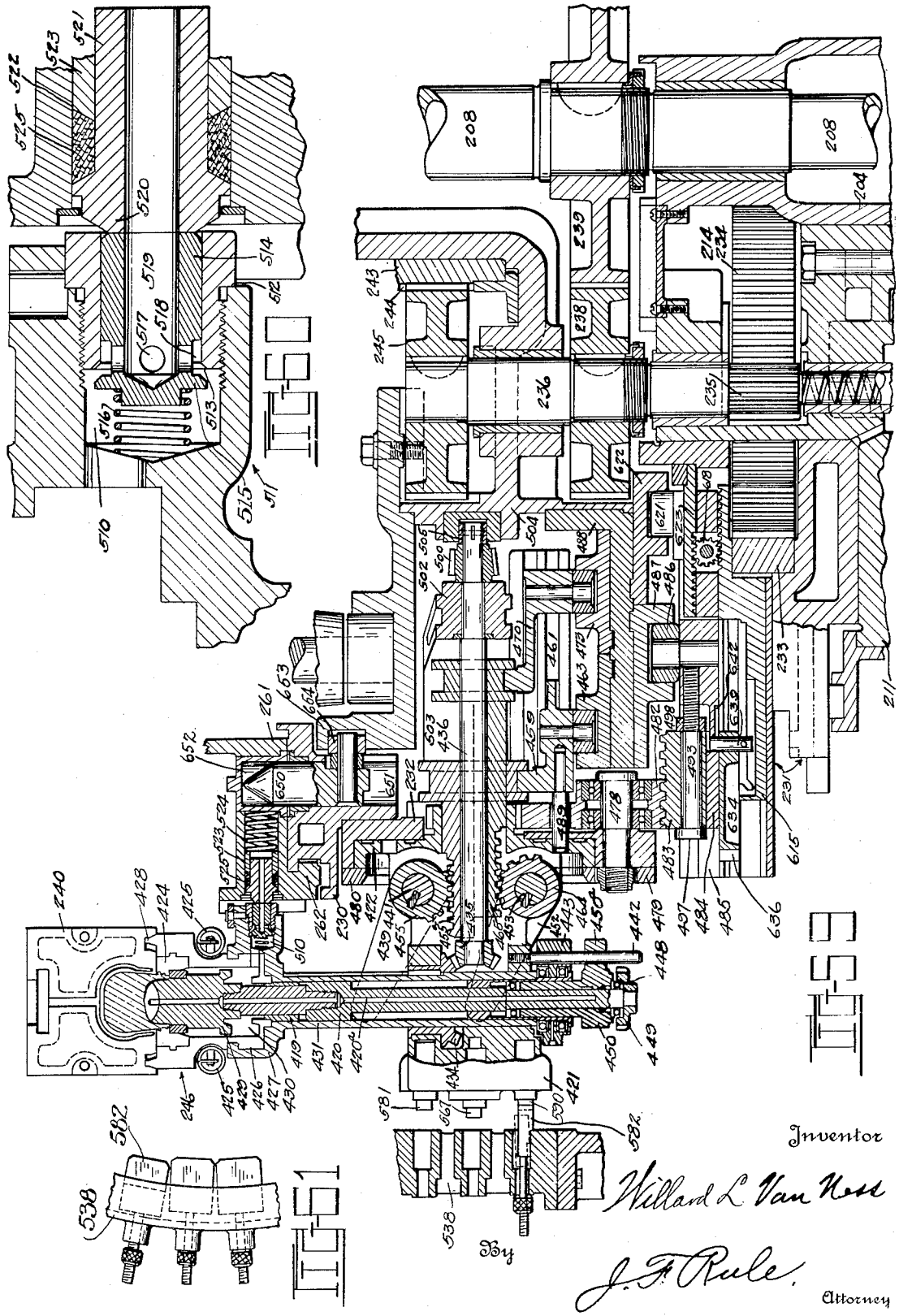

Oct. 17, 1933.                W. L. VAN NESS                1,931,336
                        GLASSWARE FORMING MACHINE
                    Filed Aug. 23, 1929      55 Sheets-Sheet 24
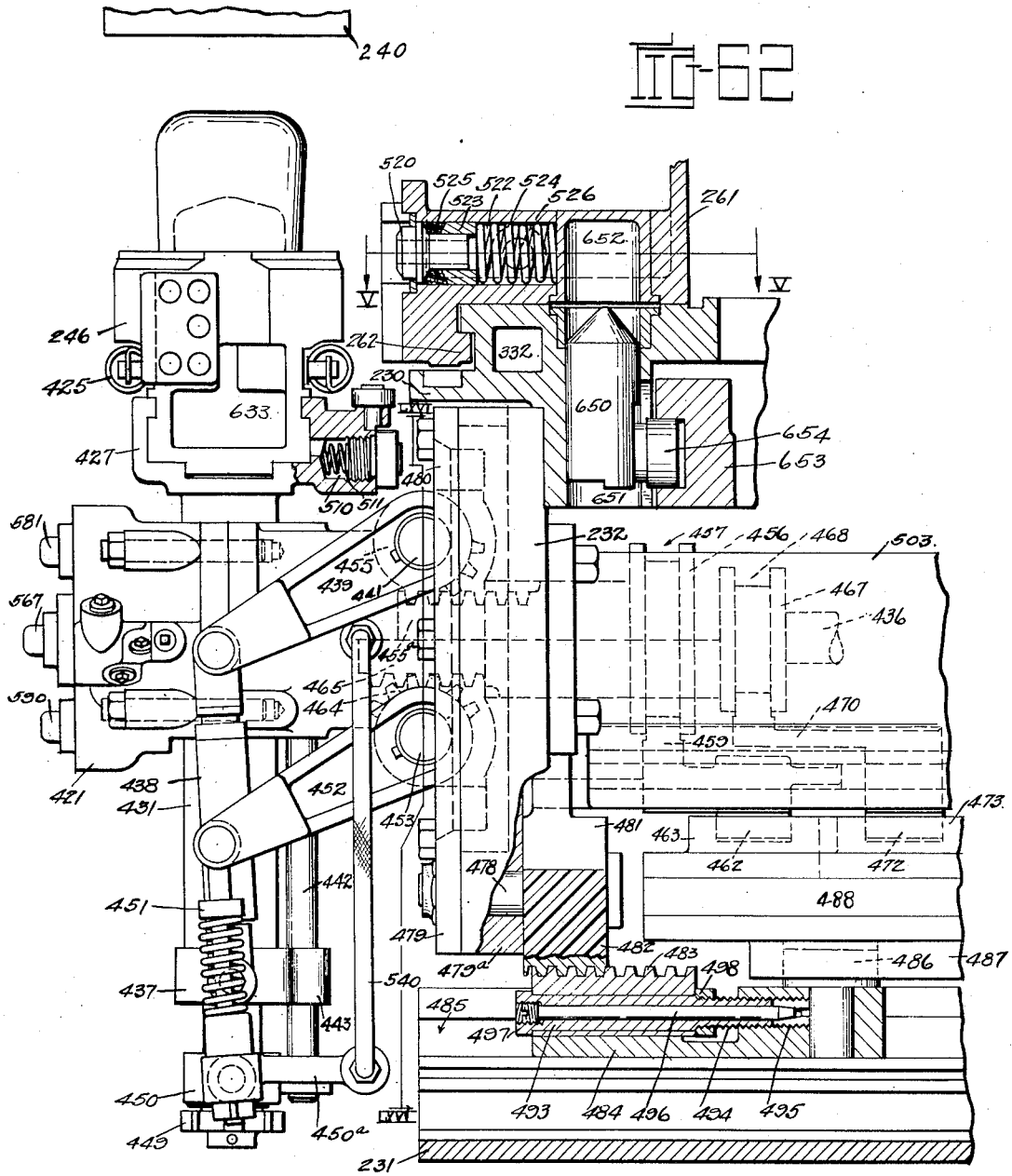
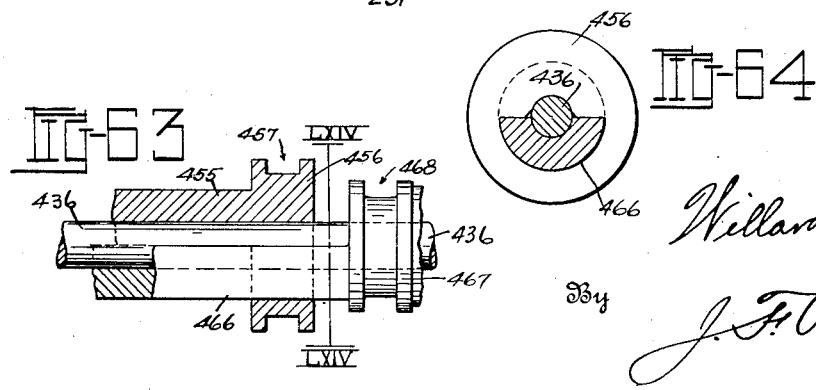

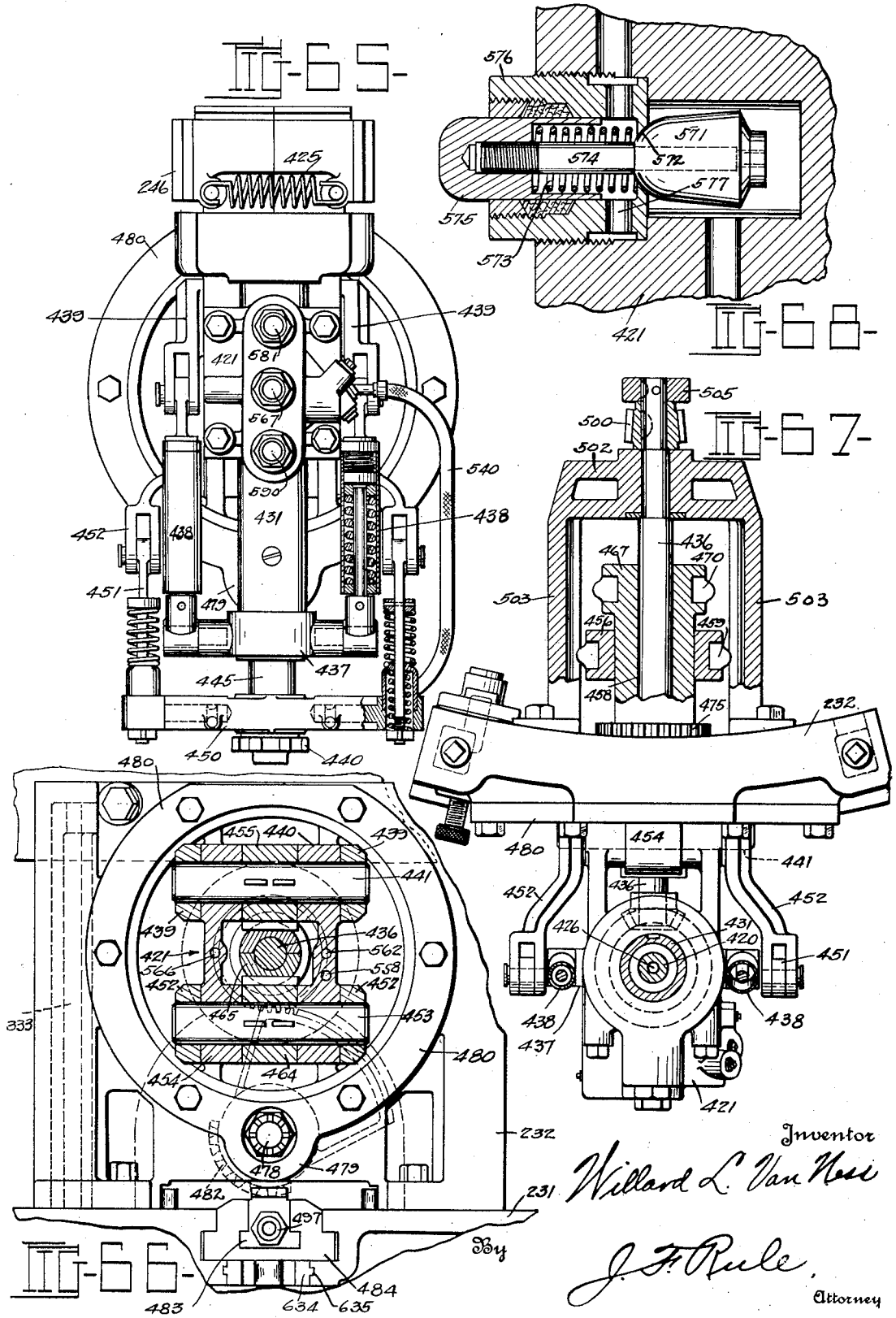

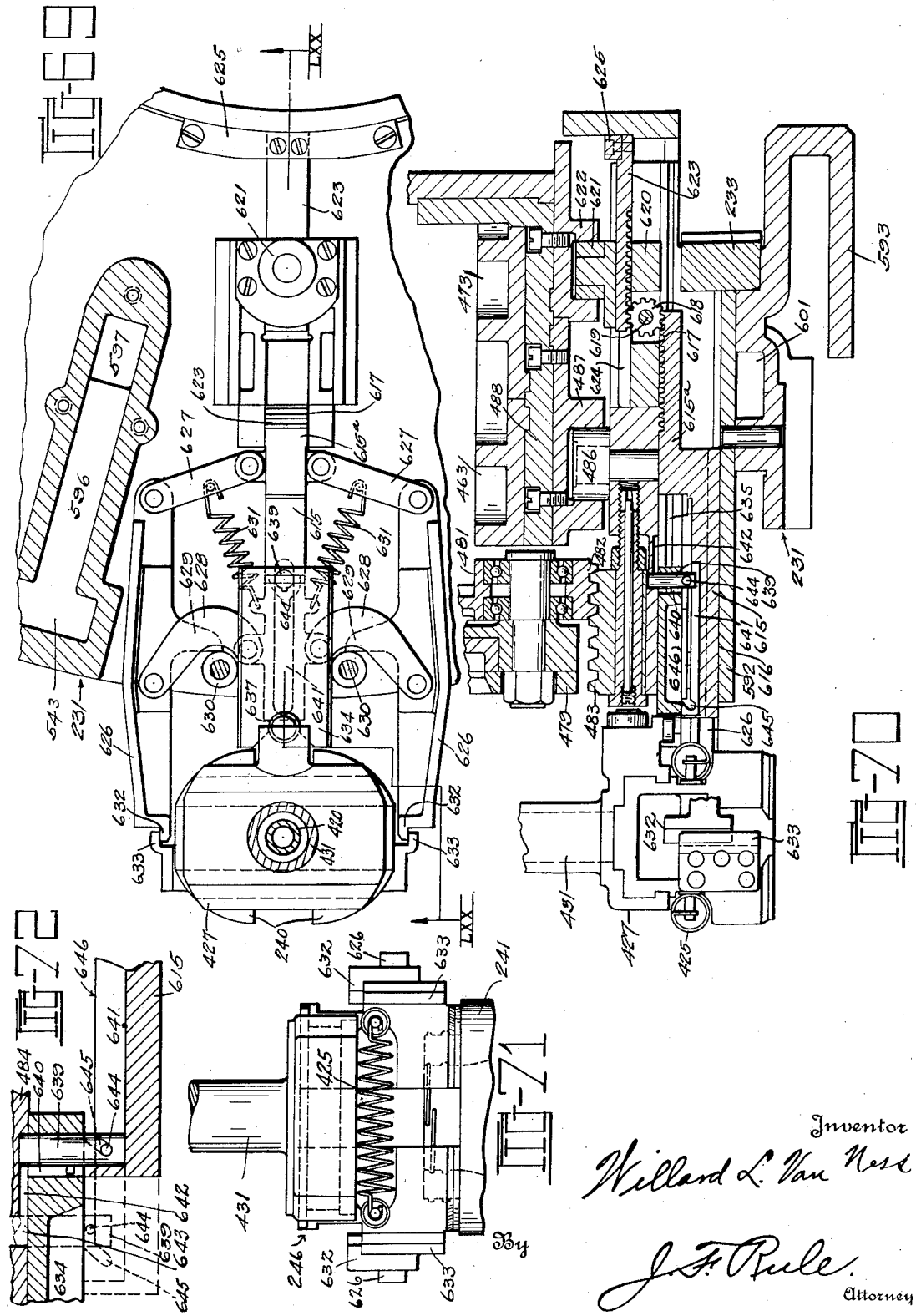

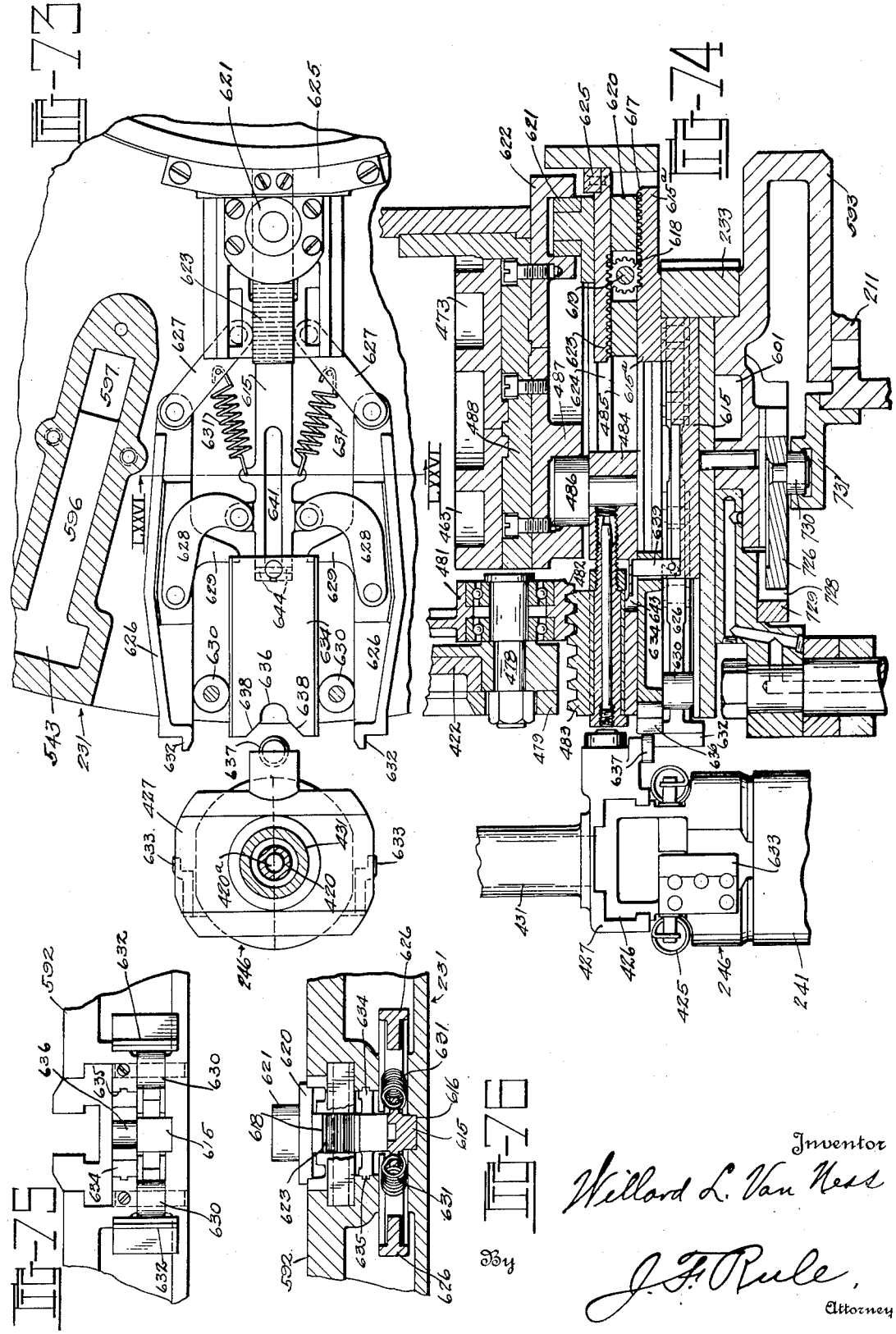

Oct. 17, 1933. W. L. VAN NESS 1,931,336
GLASSWARE FORMING MACHINE
Filed Aug. 23, 1929 55 Sheets-Sheet 28
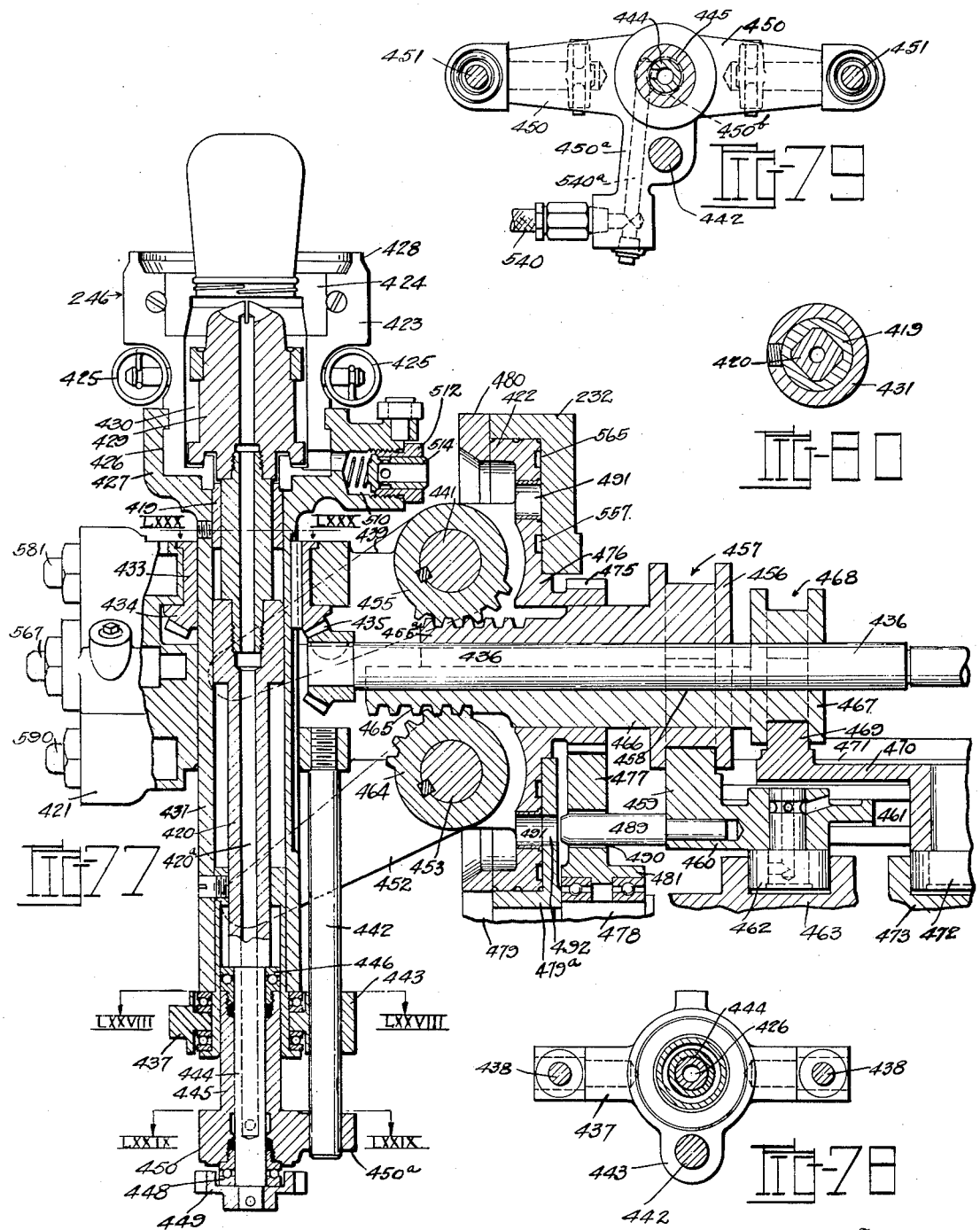

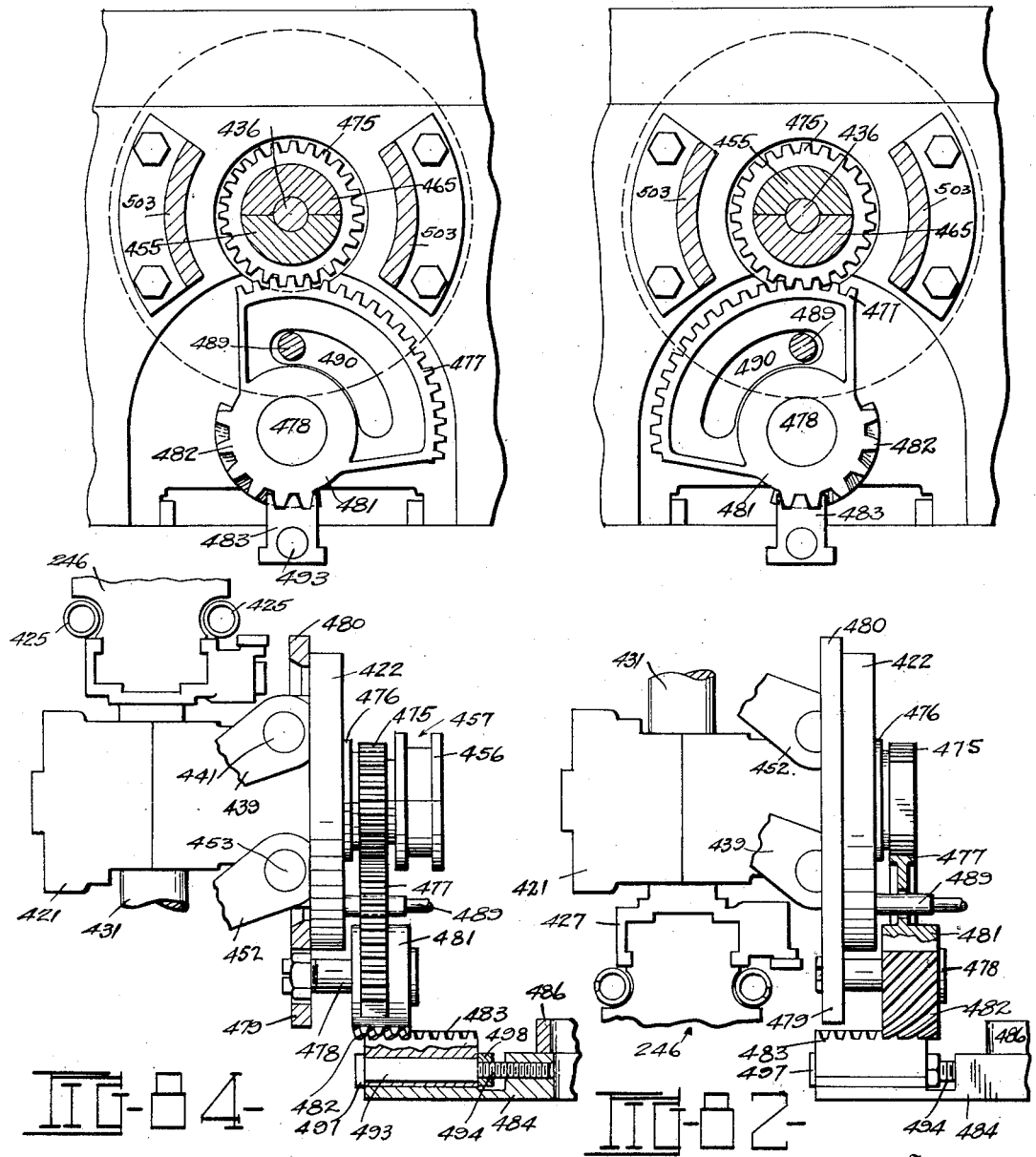

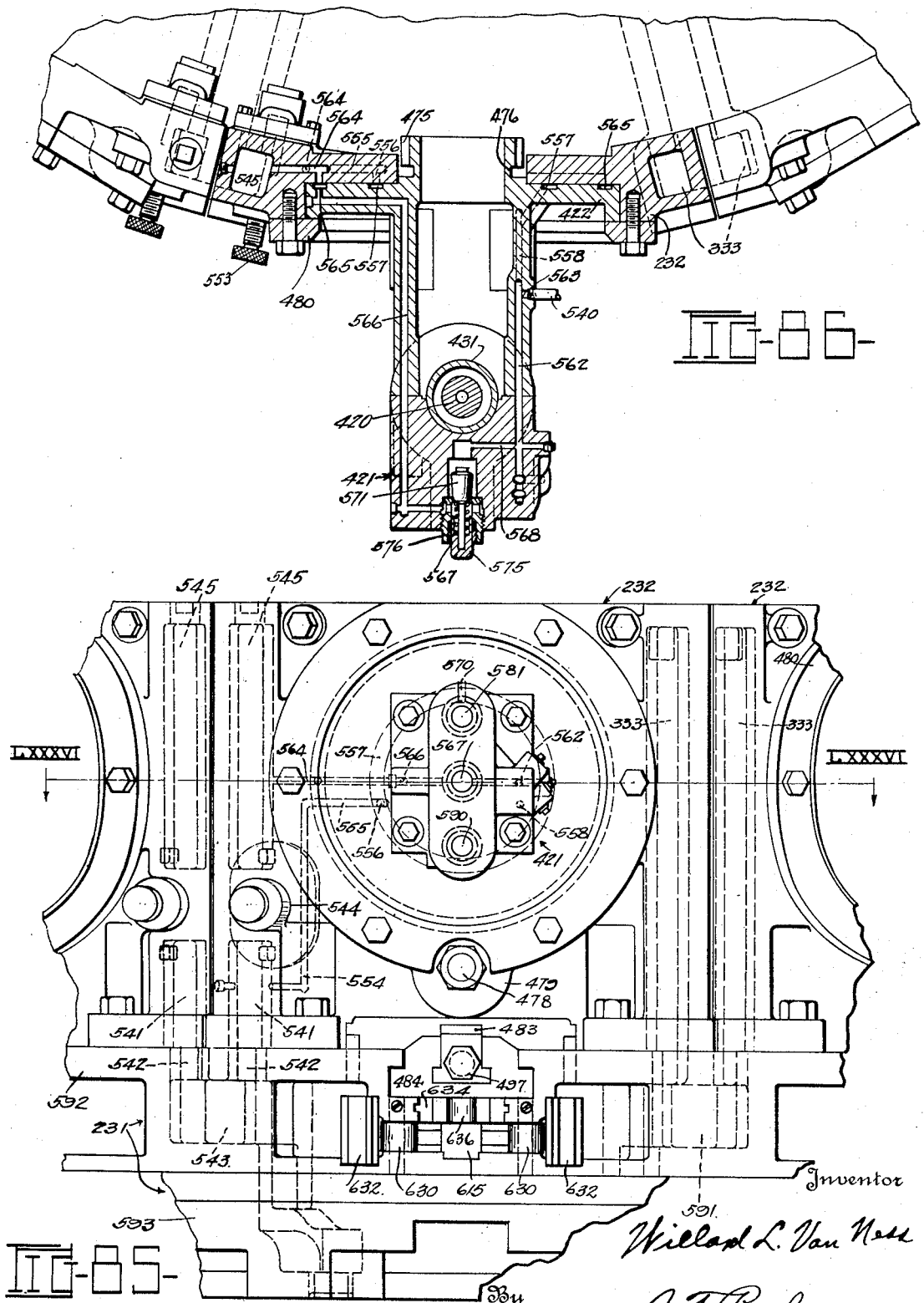

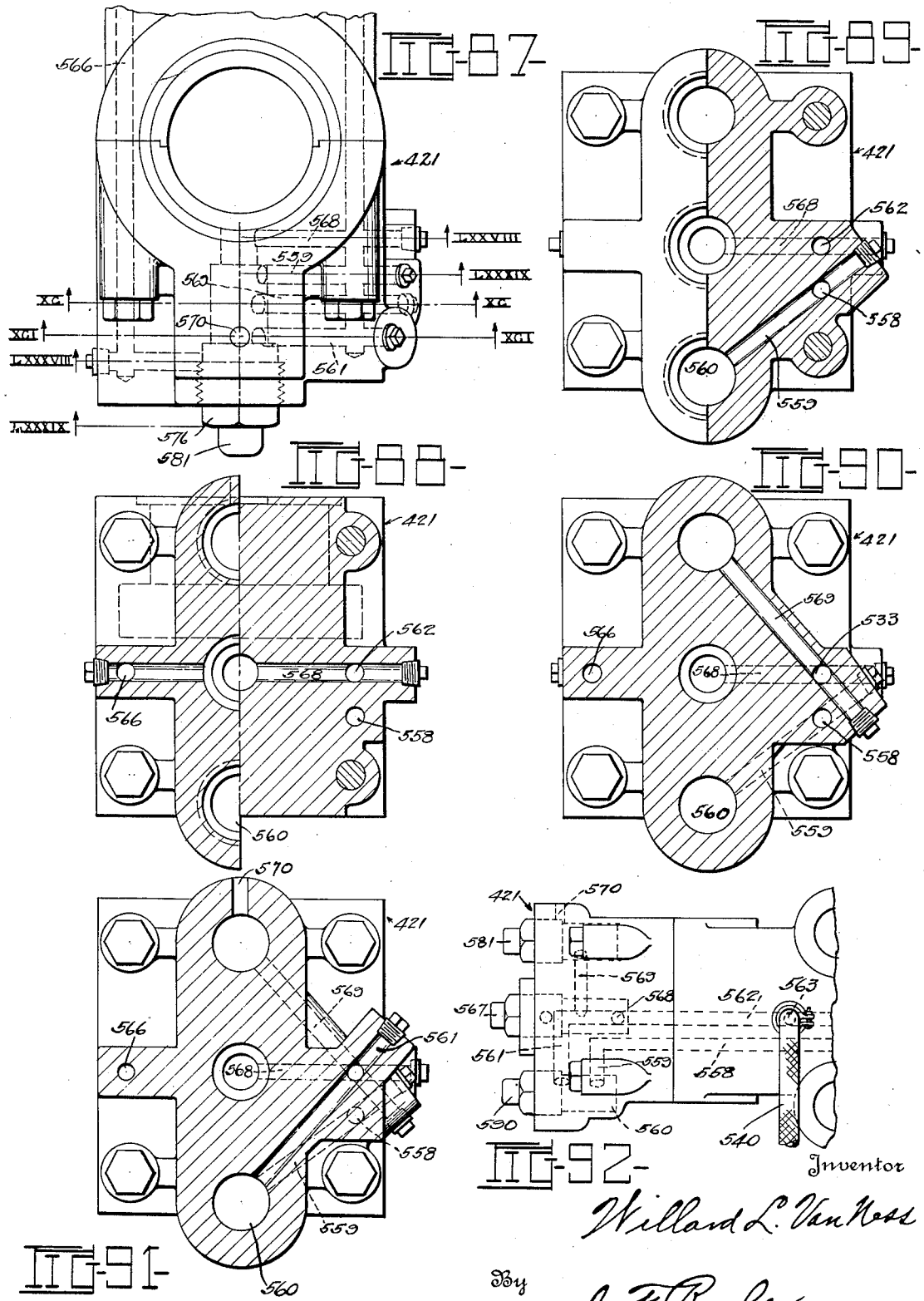

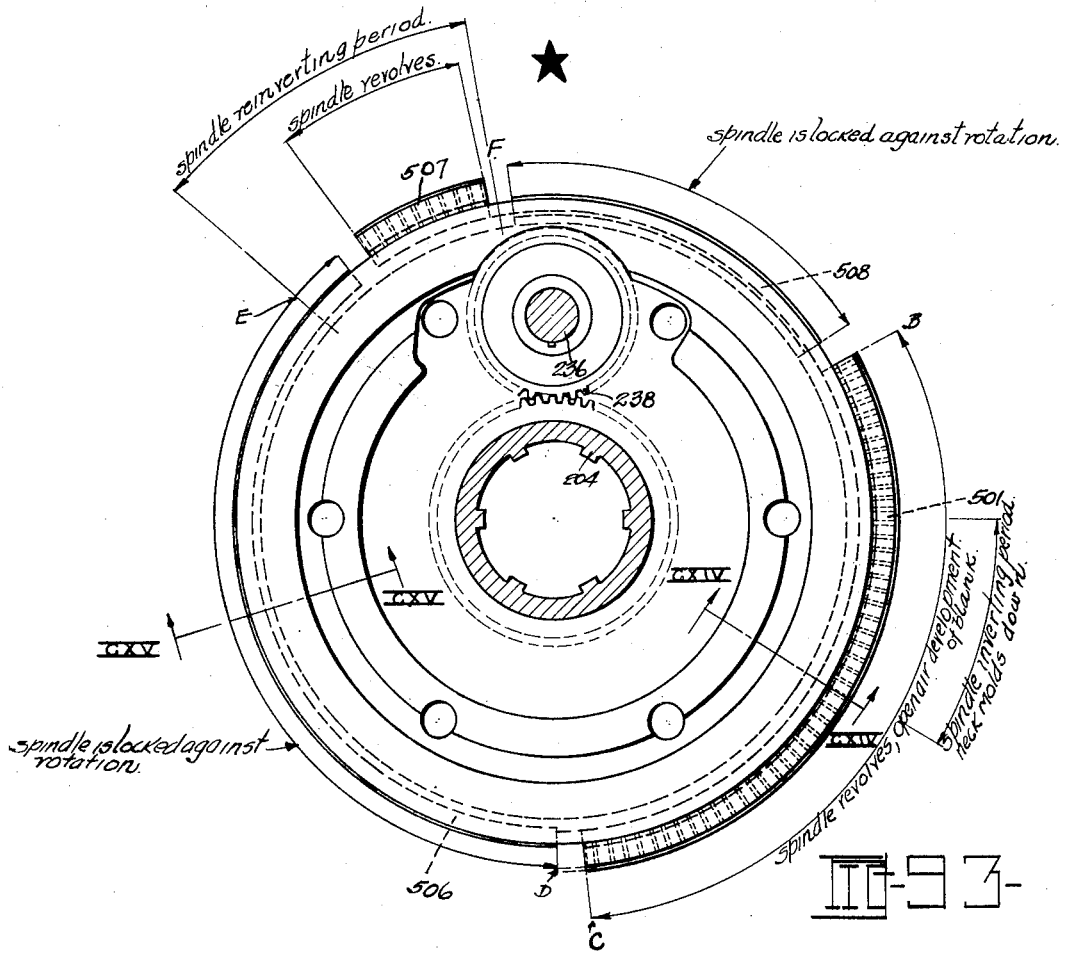
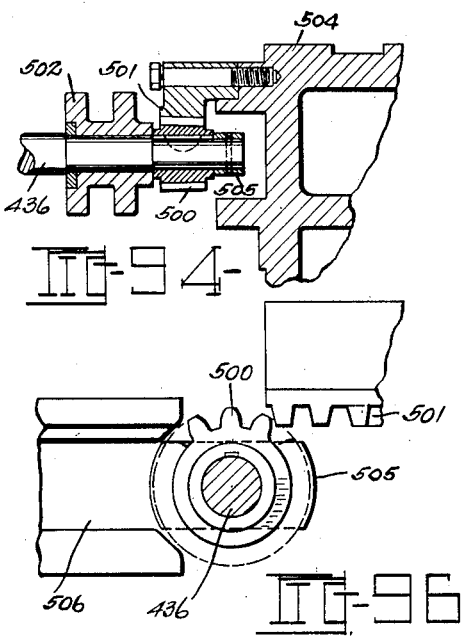

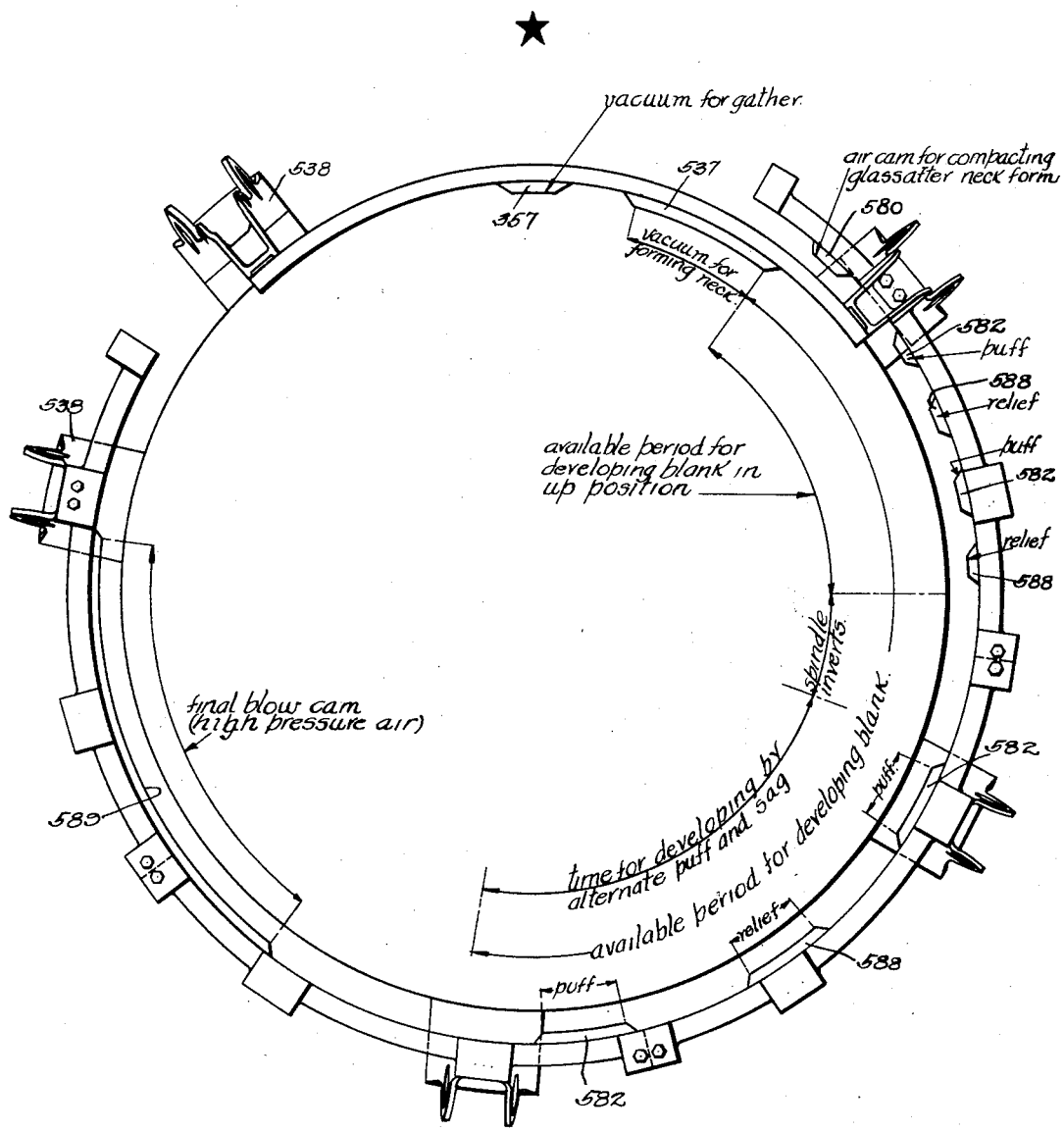

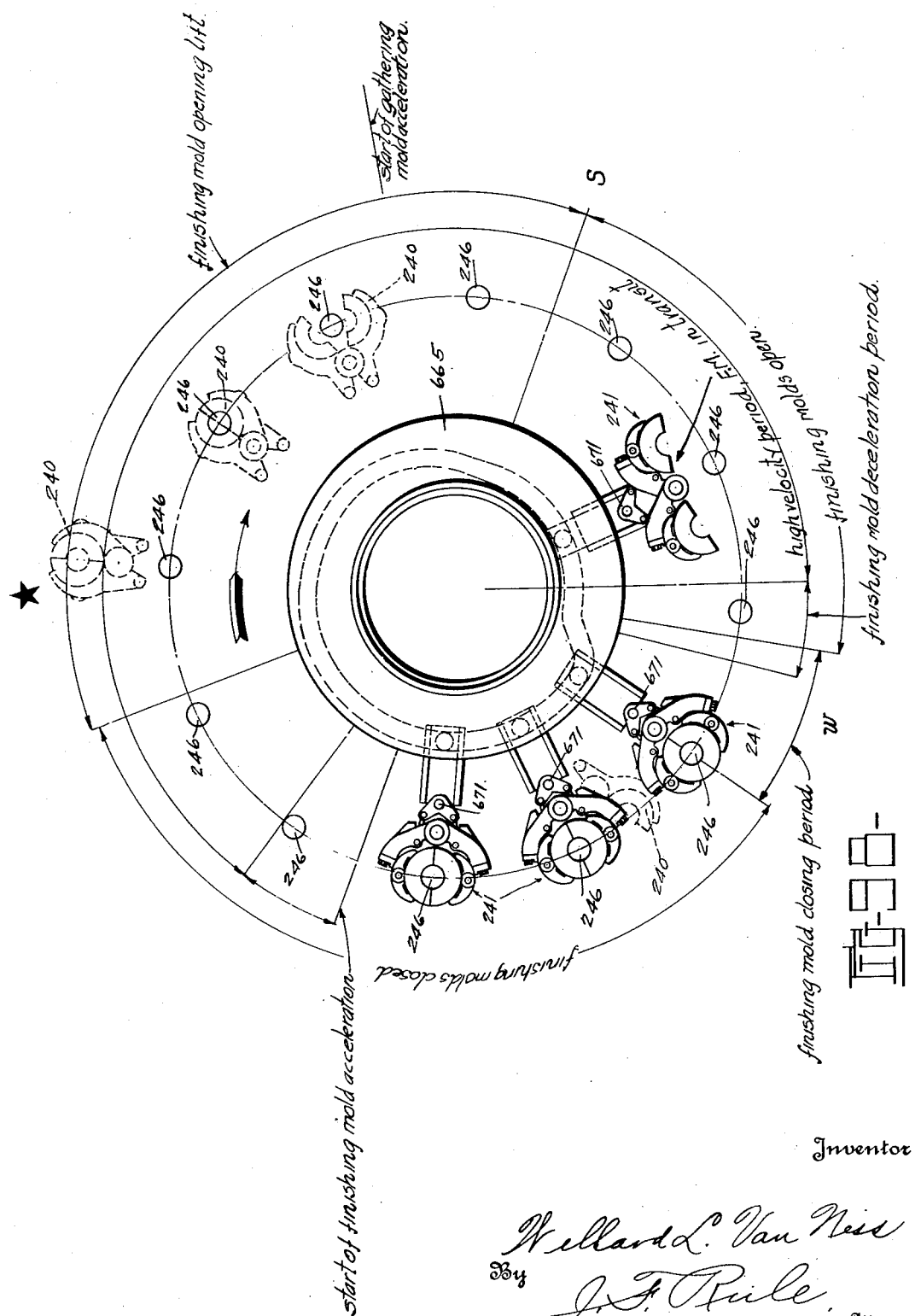

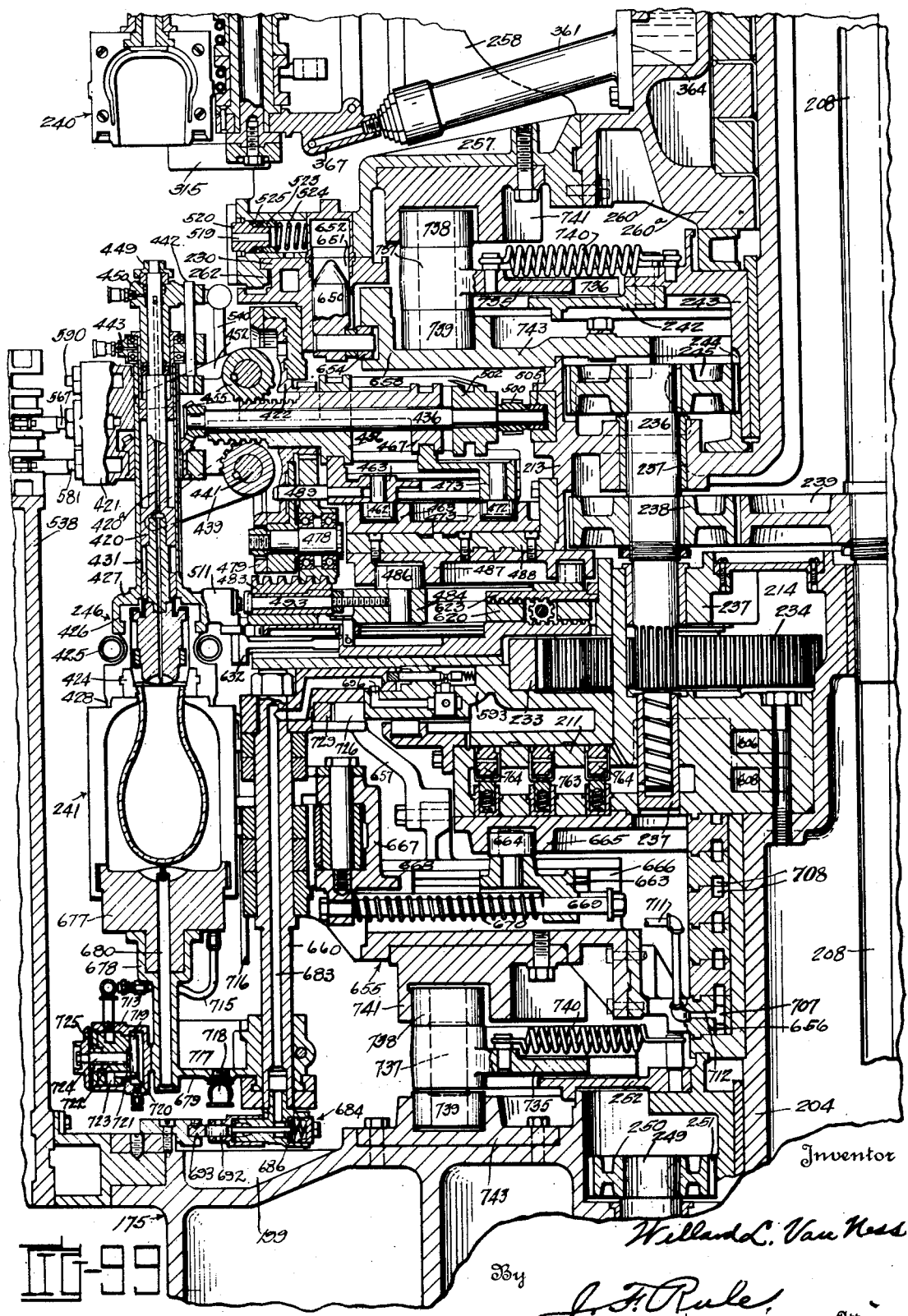

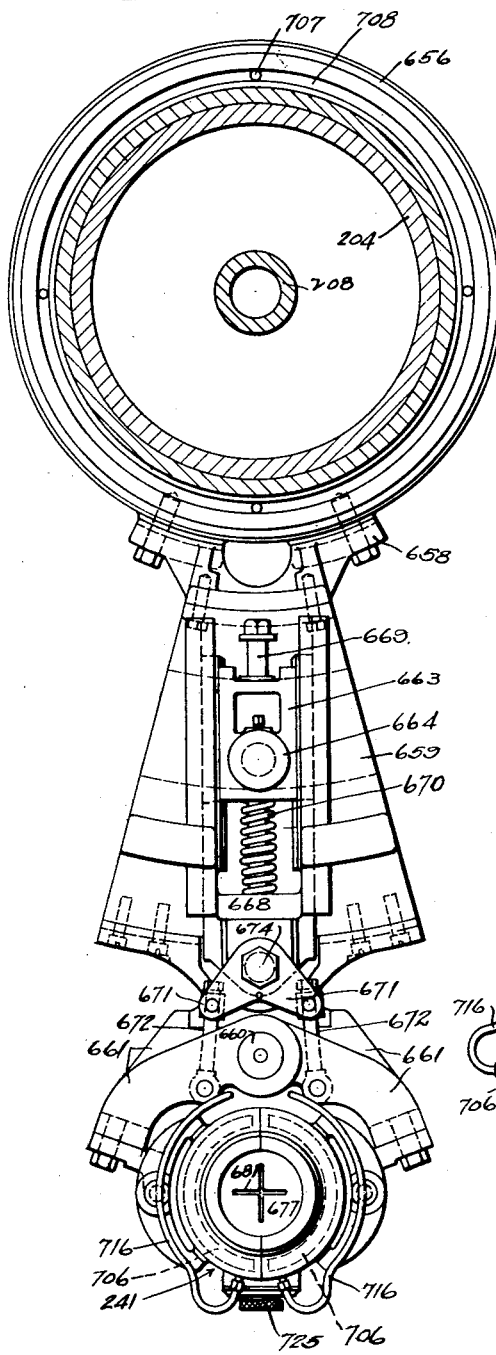
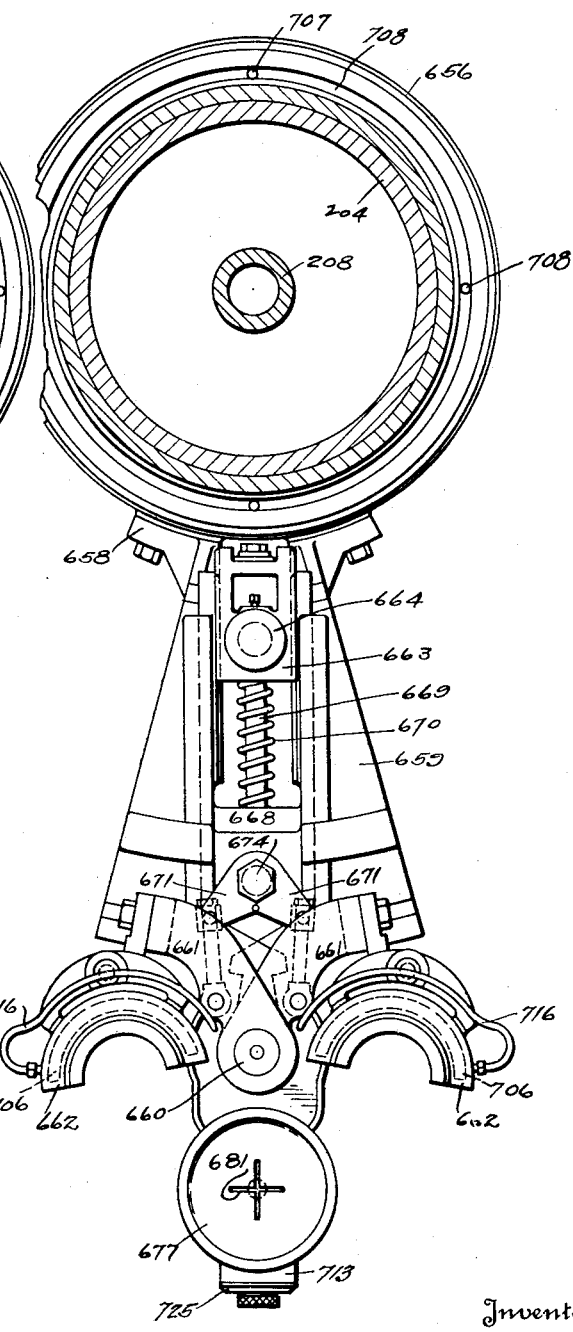

Oct. 17, 1933.  W. L. VAN NESS  1,931,336
GLASSWARE FORMING MACHINE
Filed Aug. 23, 1929   55 Sheets-Sheet 37
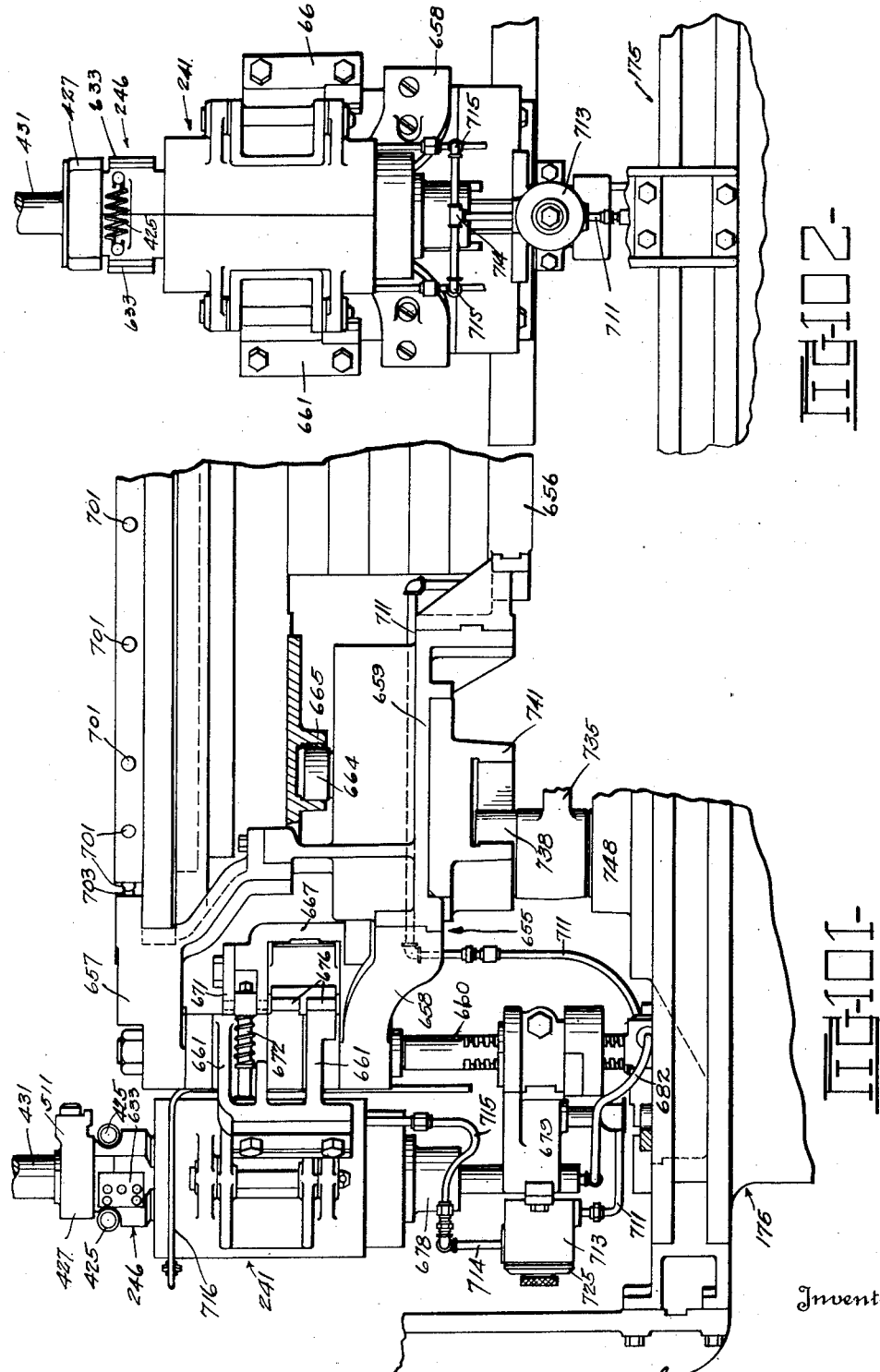
Inventor
Willard L. Van Ness
By J. F. Rule,
Attorney Oct. 17, 1933.  W. L. VAN NESS  1,931,336
GLASSWARE FORMING MACHINE
Filed Aug. 23, 1929  55 Sheets-Sheet 38
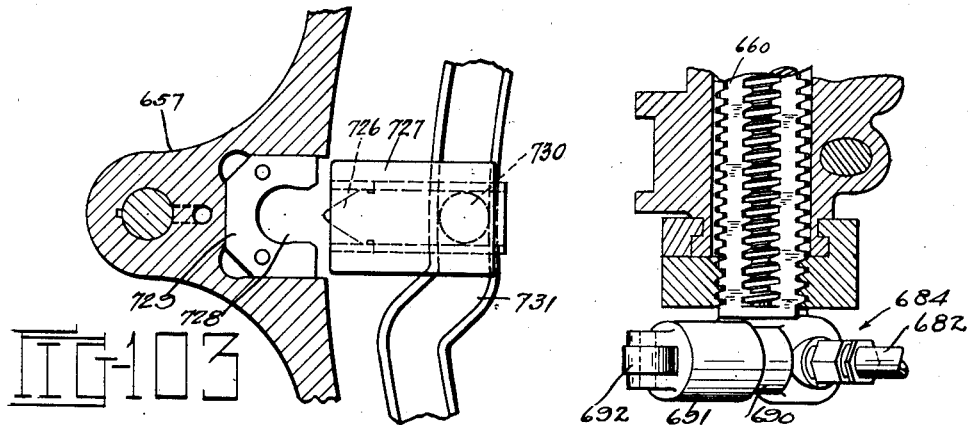
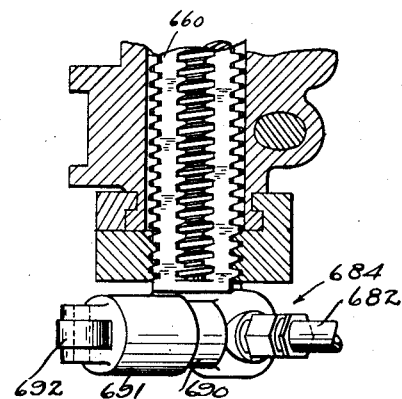
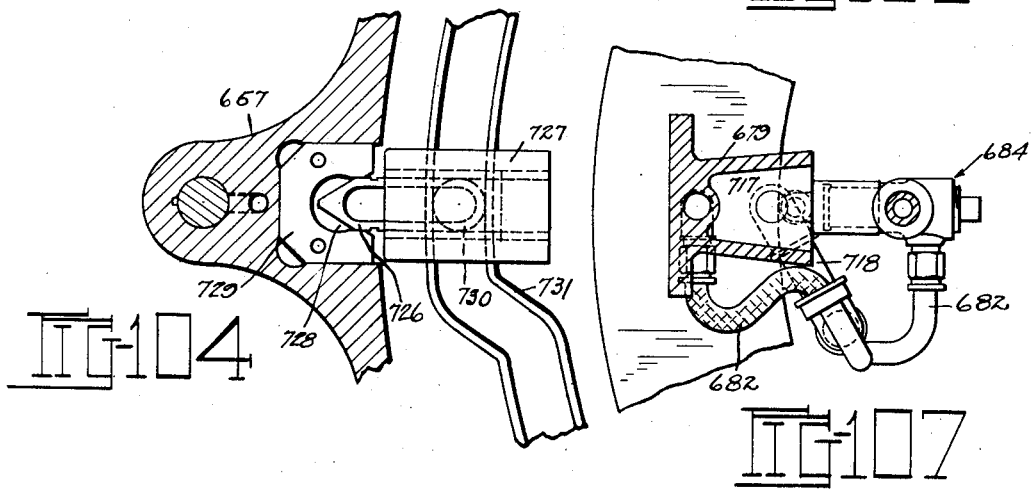
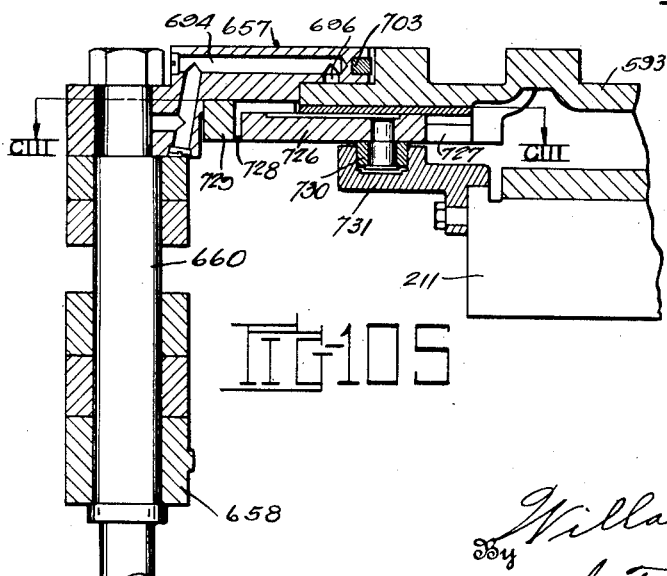
Inventor
Willard L. Van Ness
By J. F. Rule,
Attorney

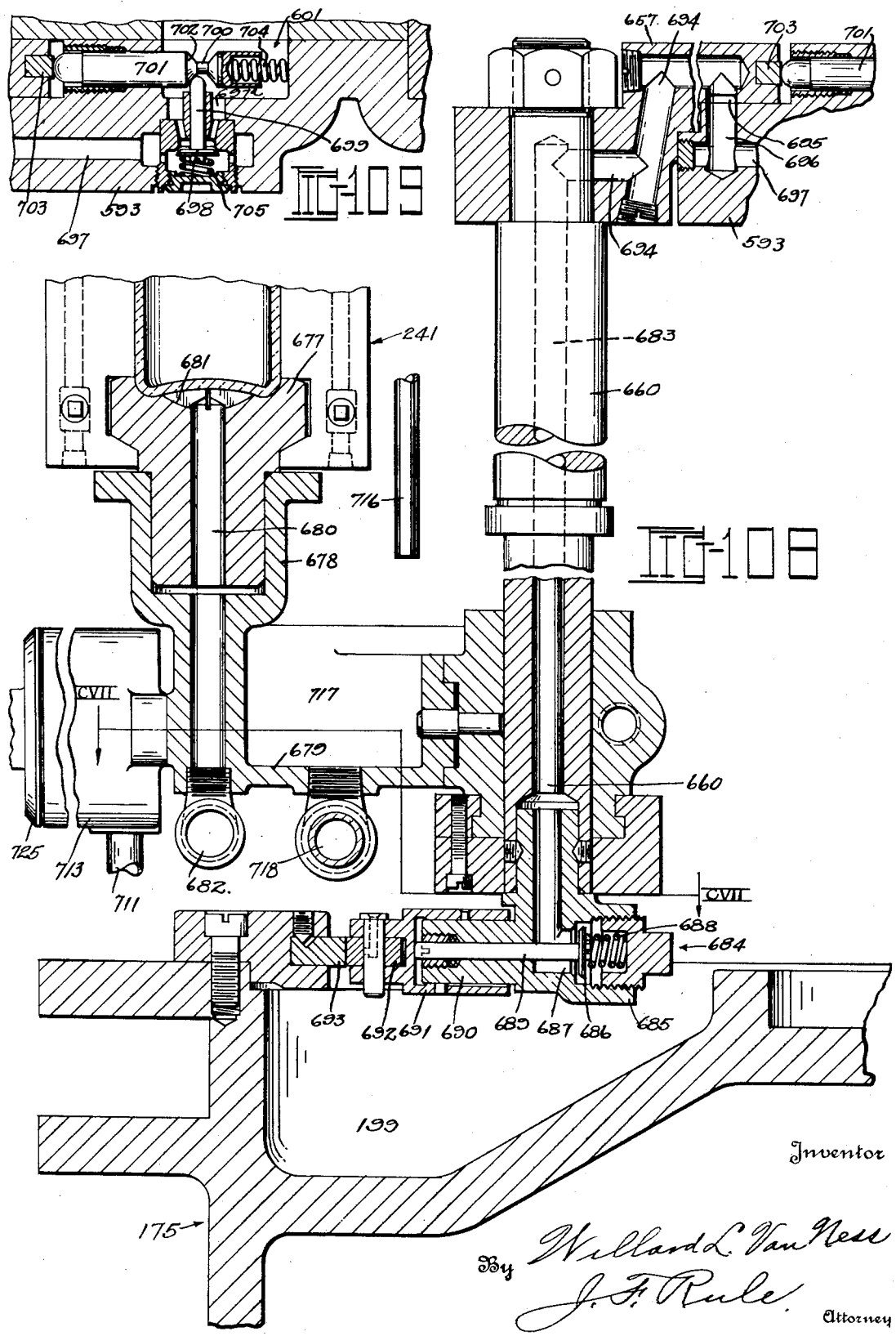

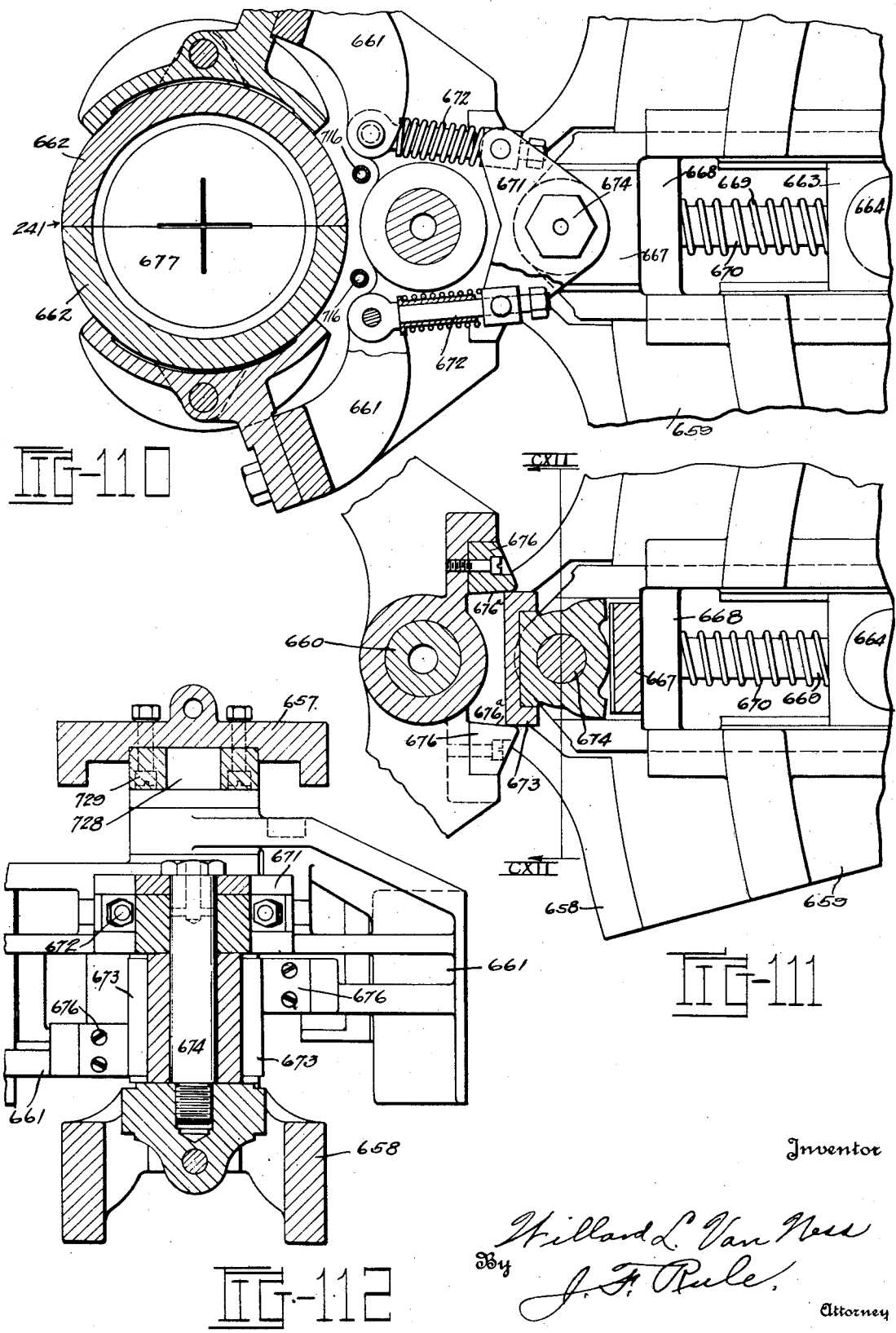

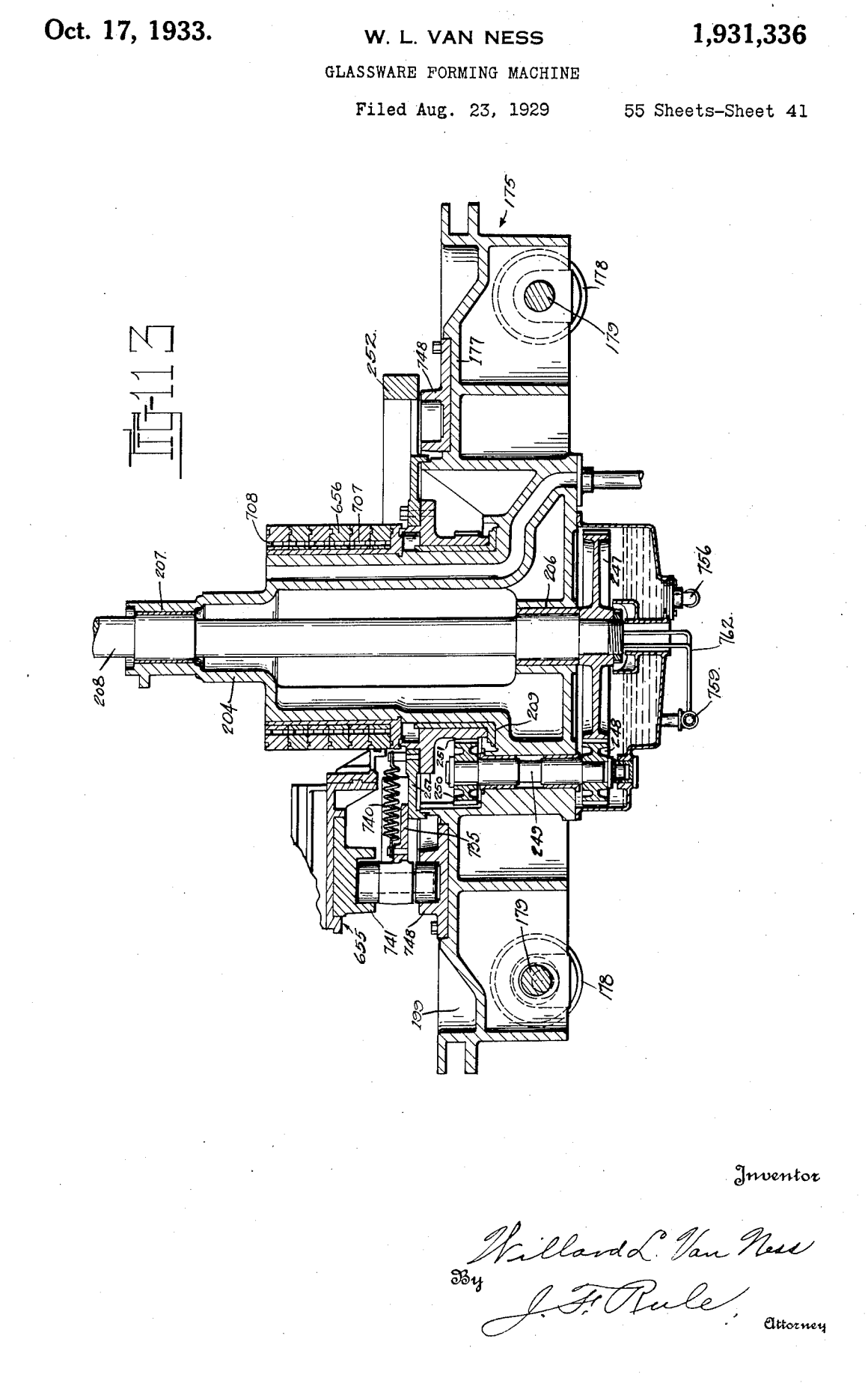

Oct. 17, 1933.　　　W. L. VAN NESS　　　1,931,336
GLASSWARE FORMING MACHINE
Filed Aug. 23, 1929　　　55 Sheets-Sheet 41

FIG-113

Inventor
Willard L. Van Ness
By J. F. Rule
Attorney

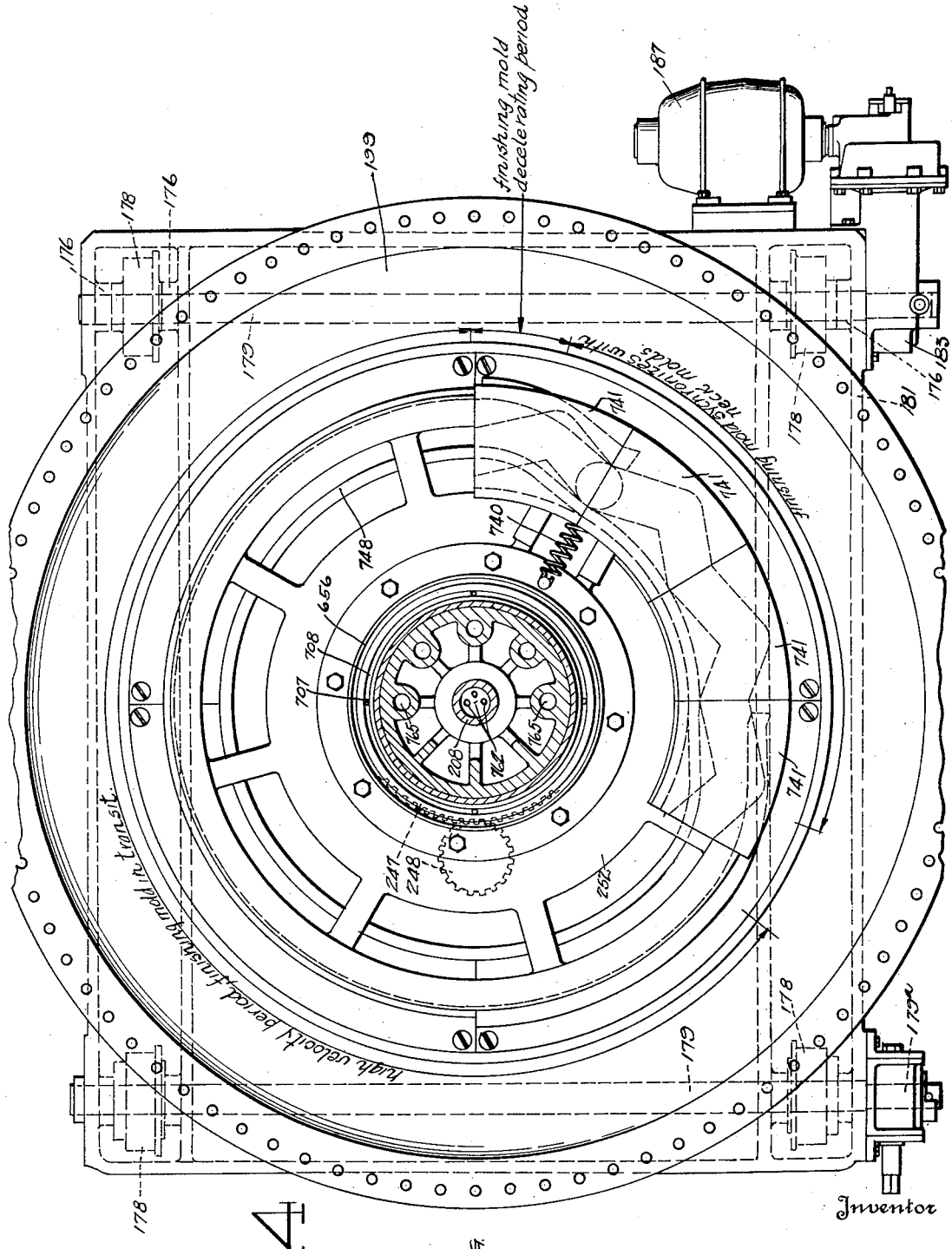

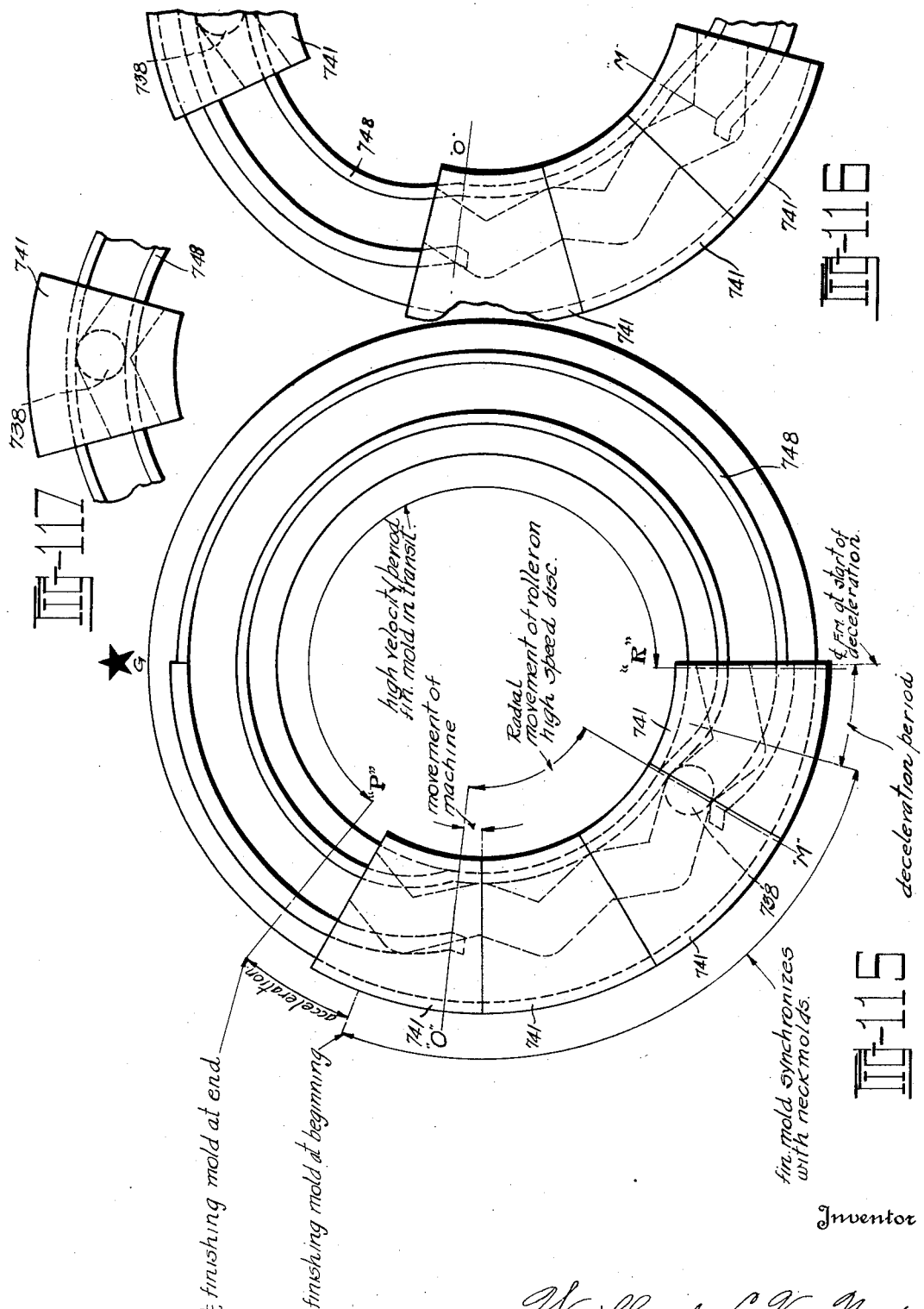

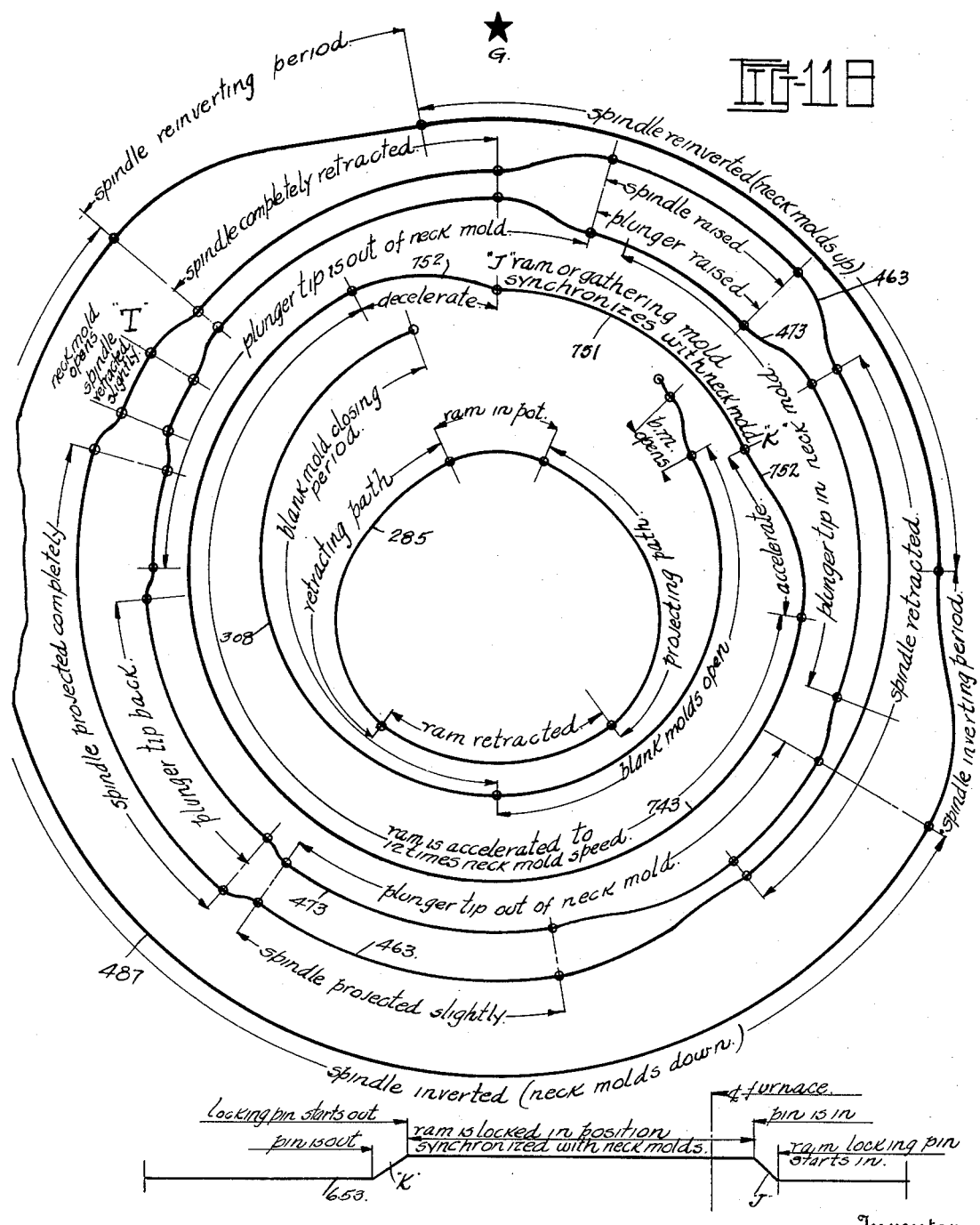

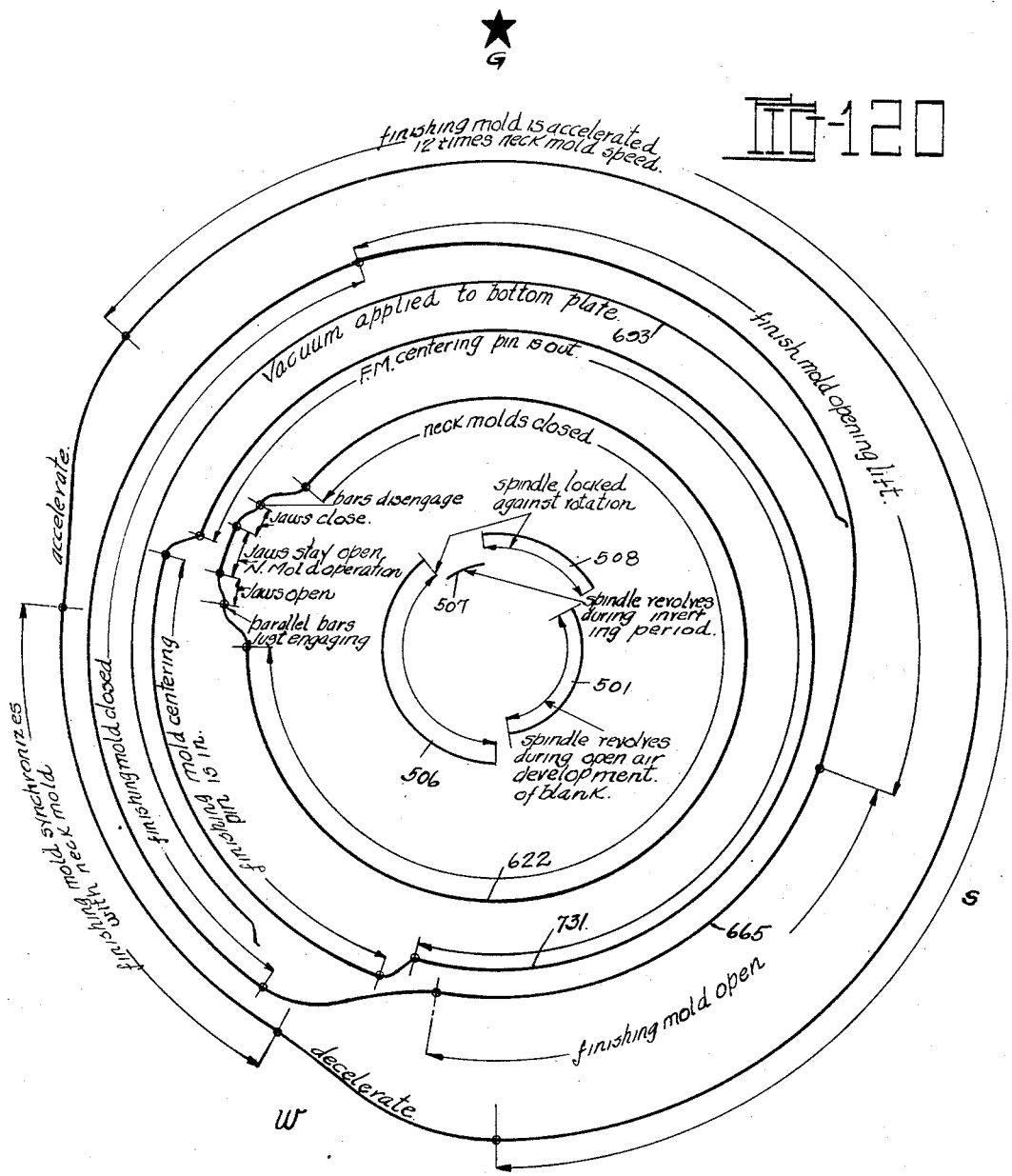

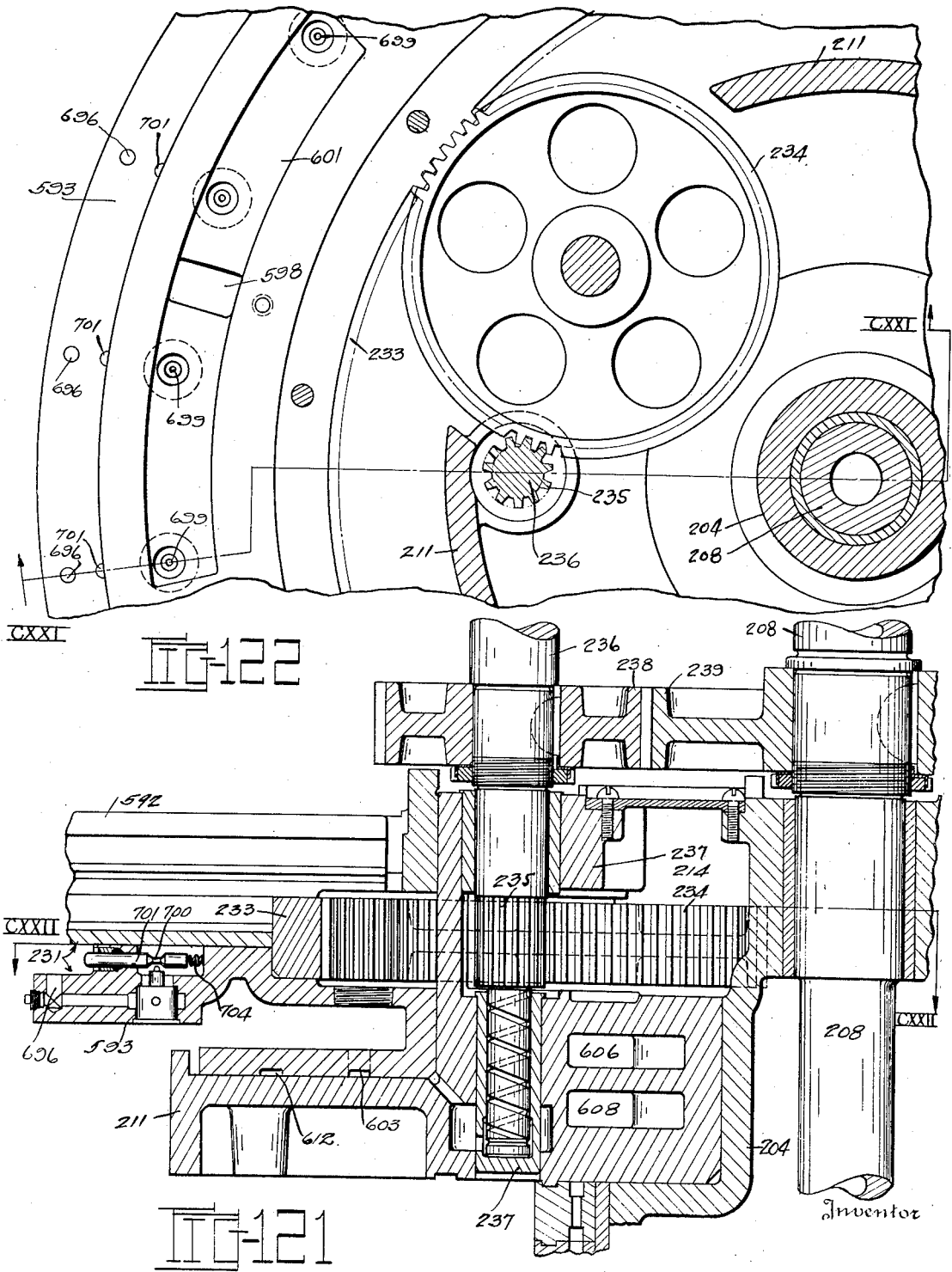

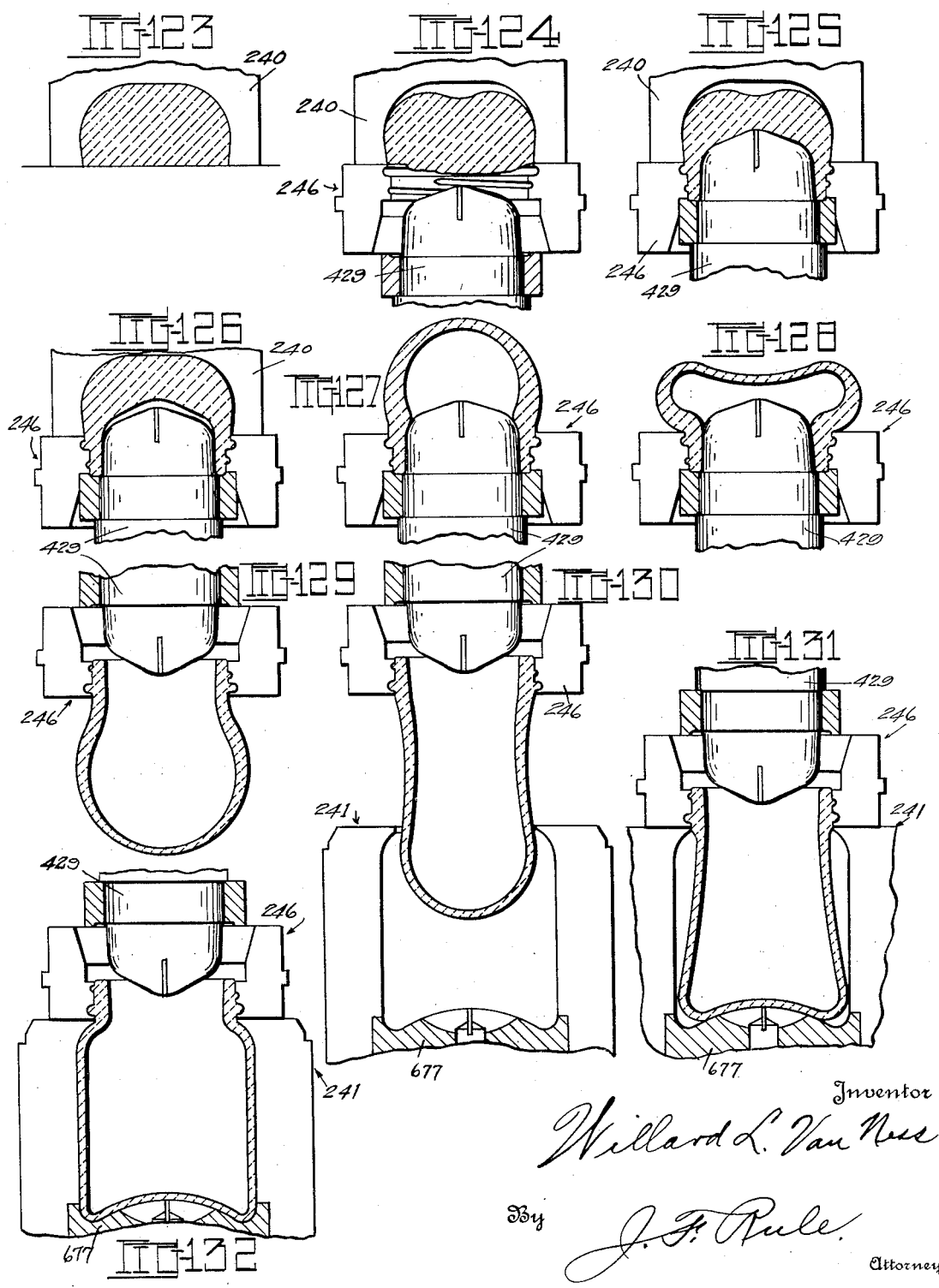

Oct. 17, 1933.  W. L. VAN NESS  1,931,336
GLASSWARE FORMING MACHINE
Filed Aug. 23, 1929   55 Sheets-Sheet 48
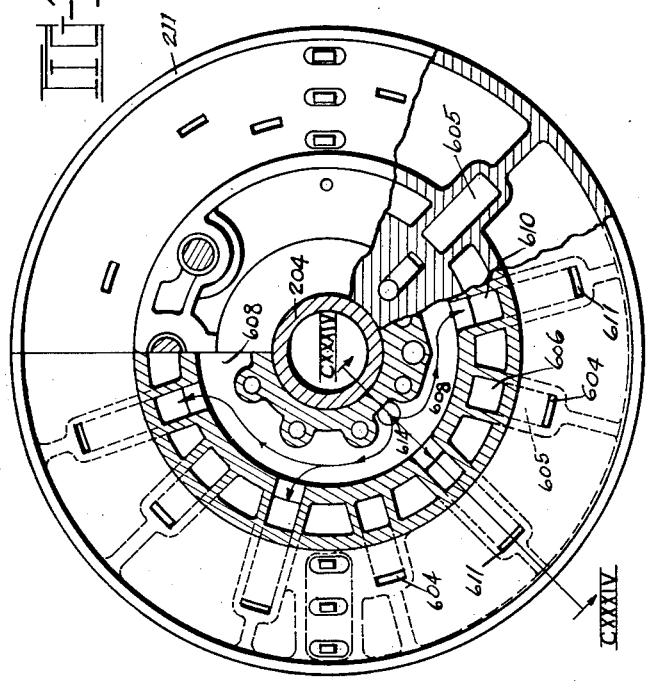
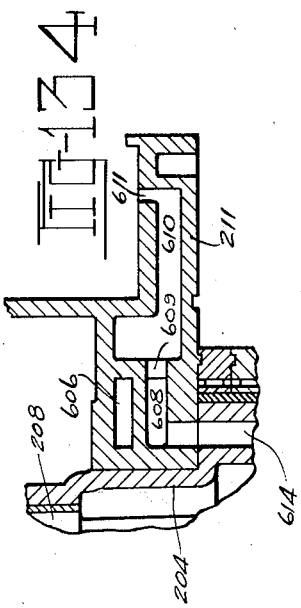
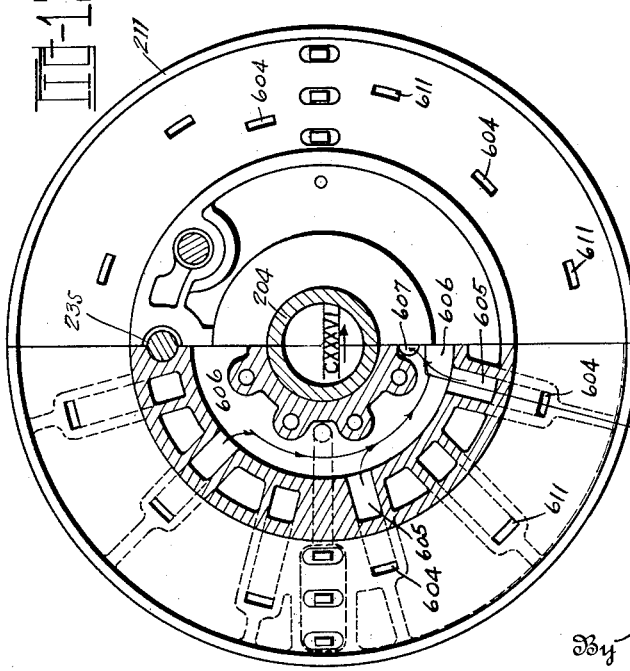
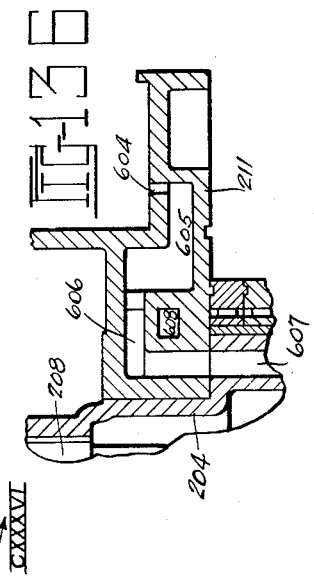
Inventor
Willard L. Van Ness
By J. F. Rule
Attorney

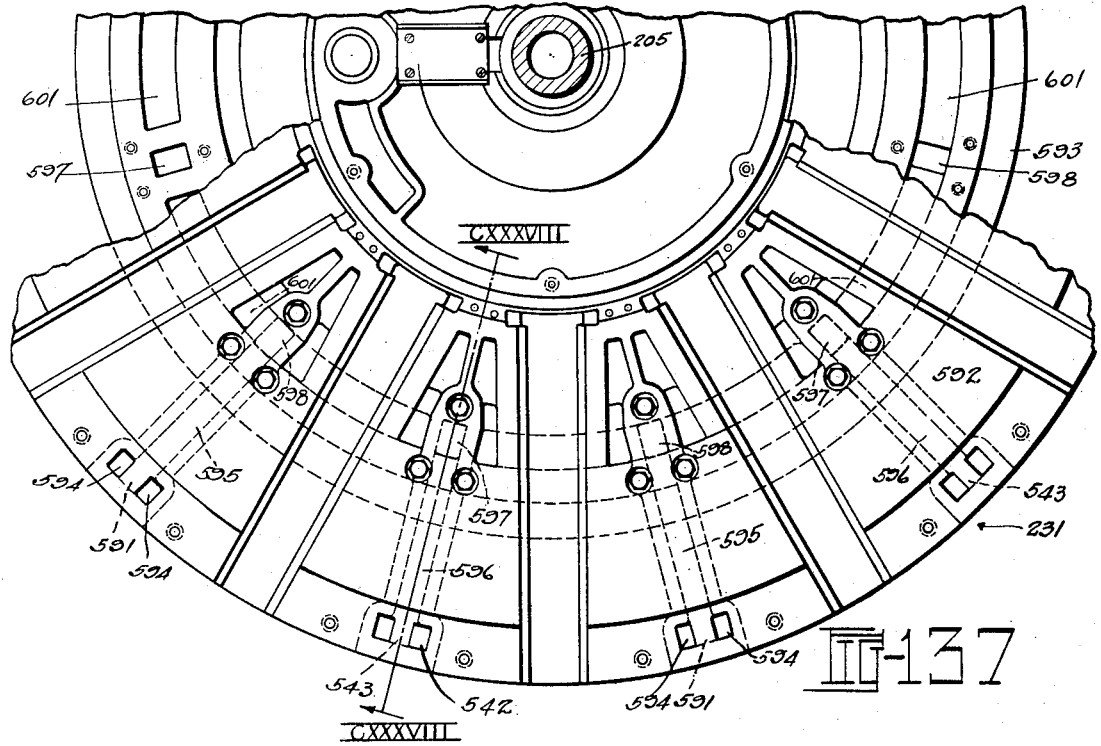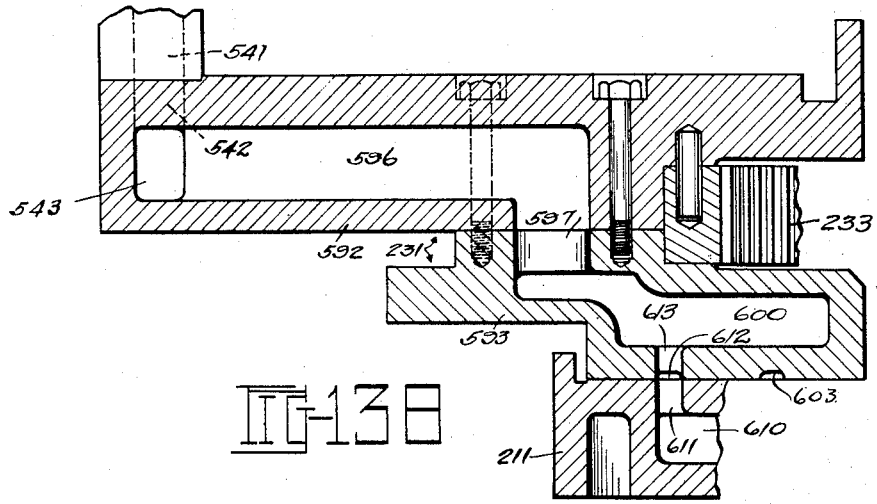

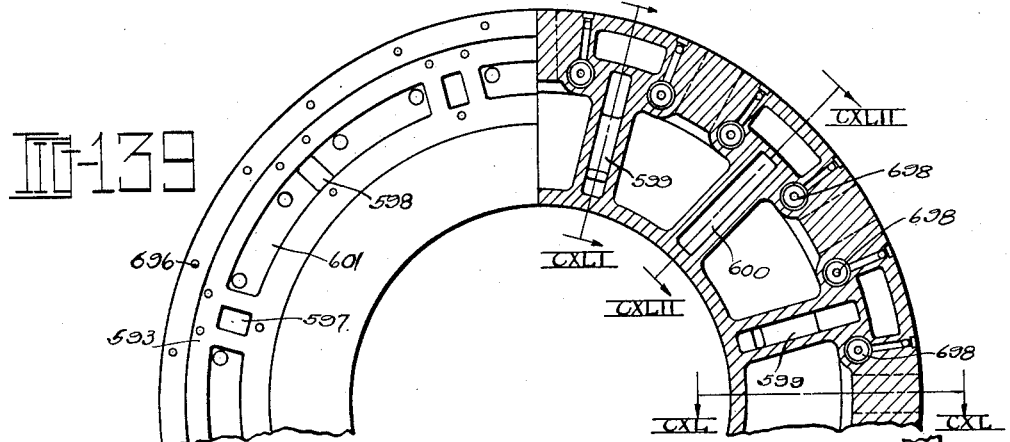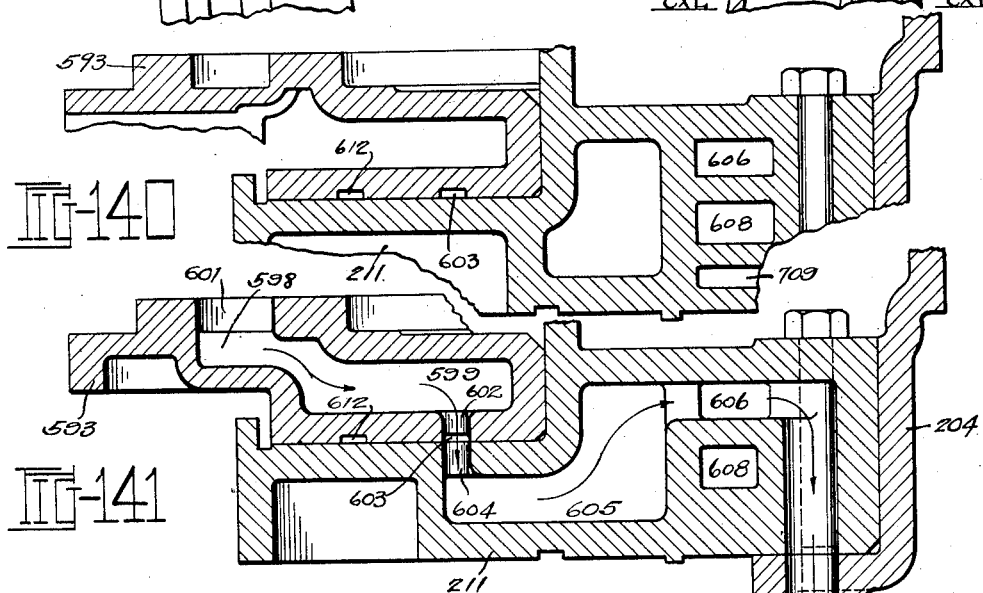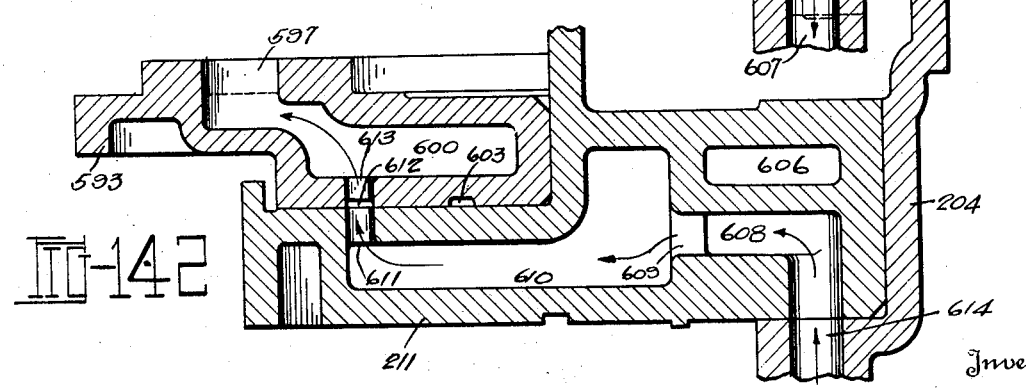

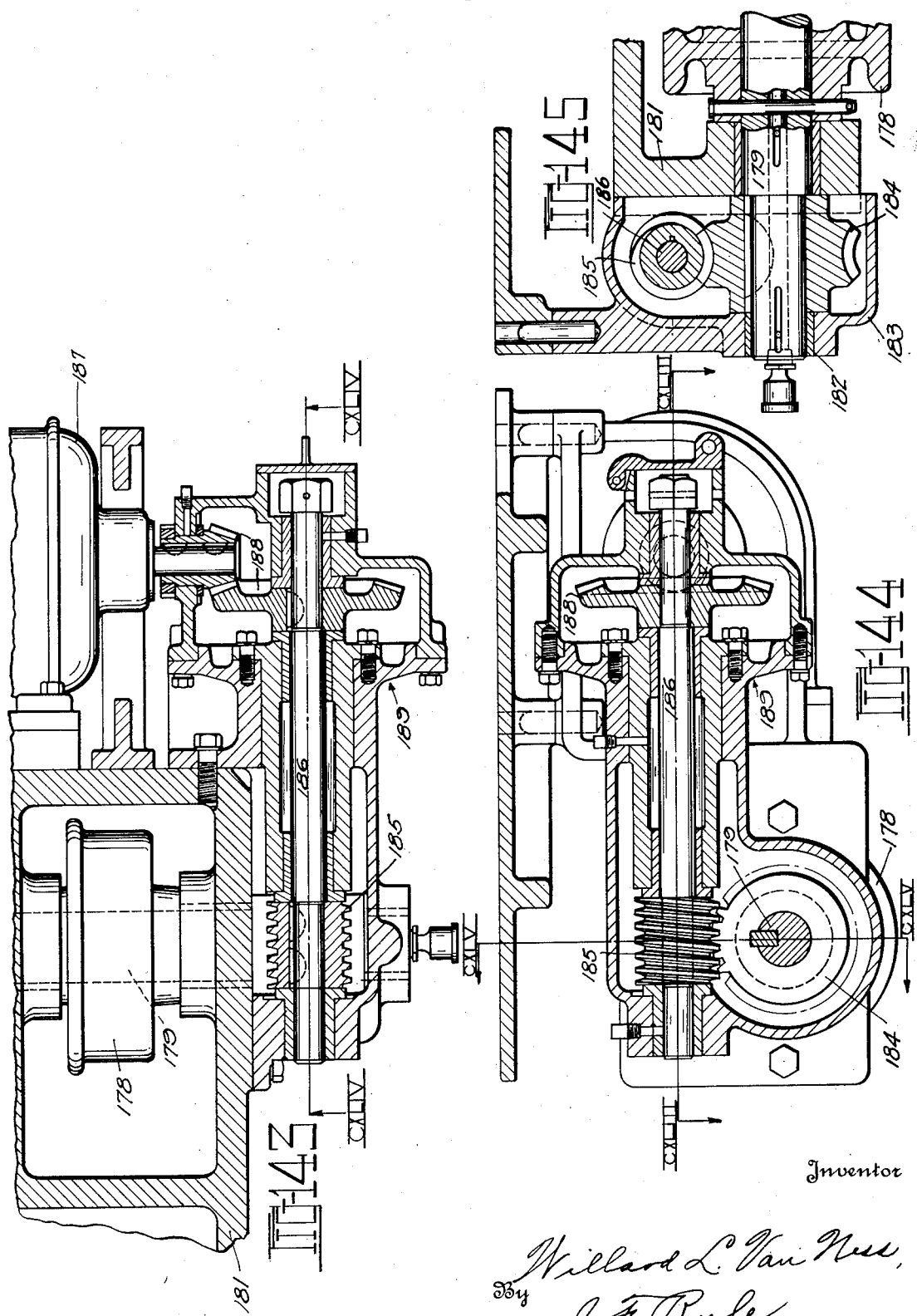

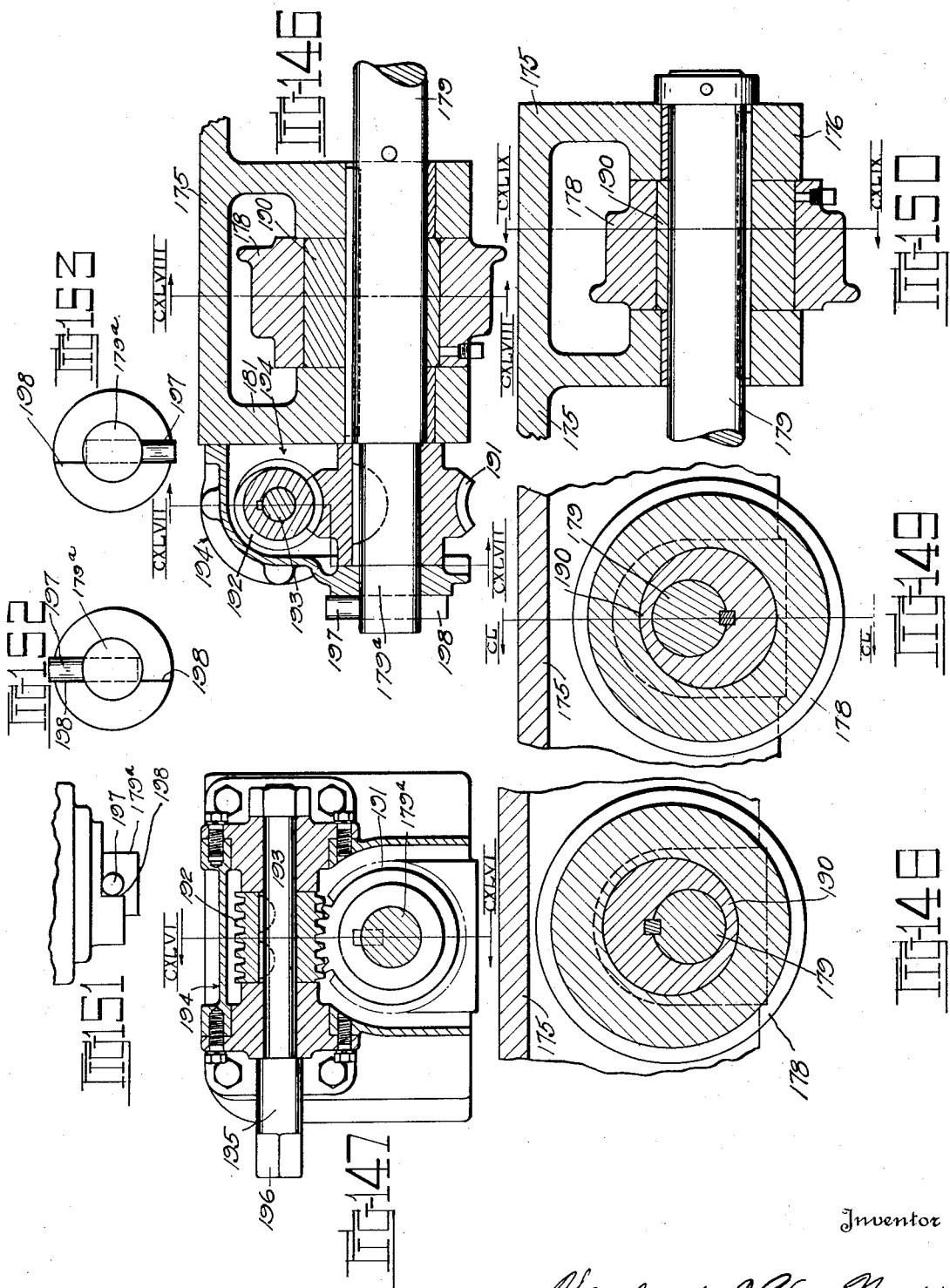

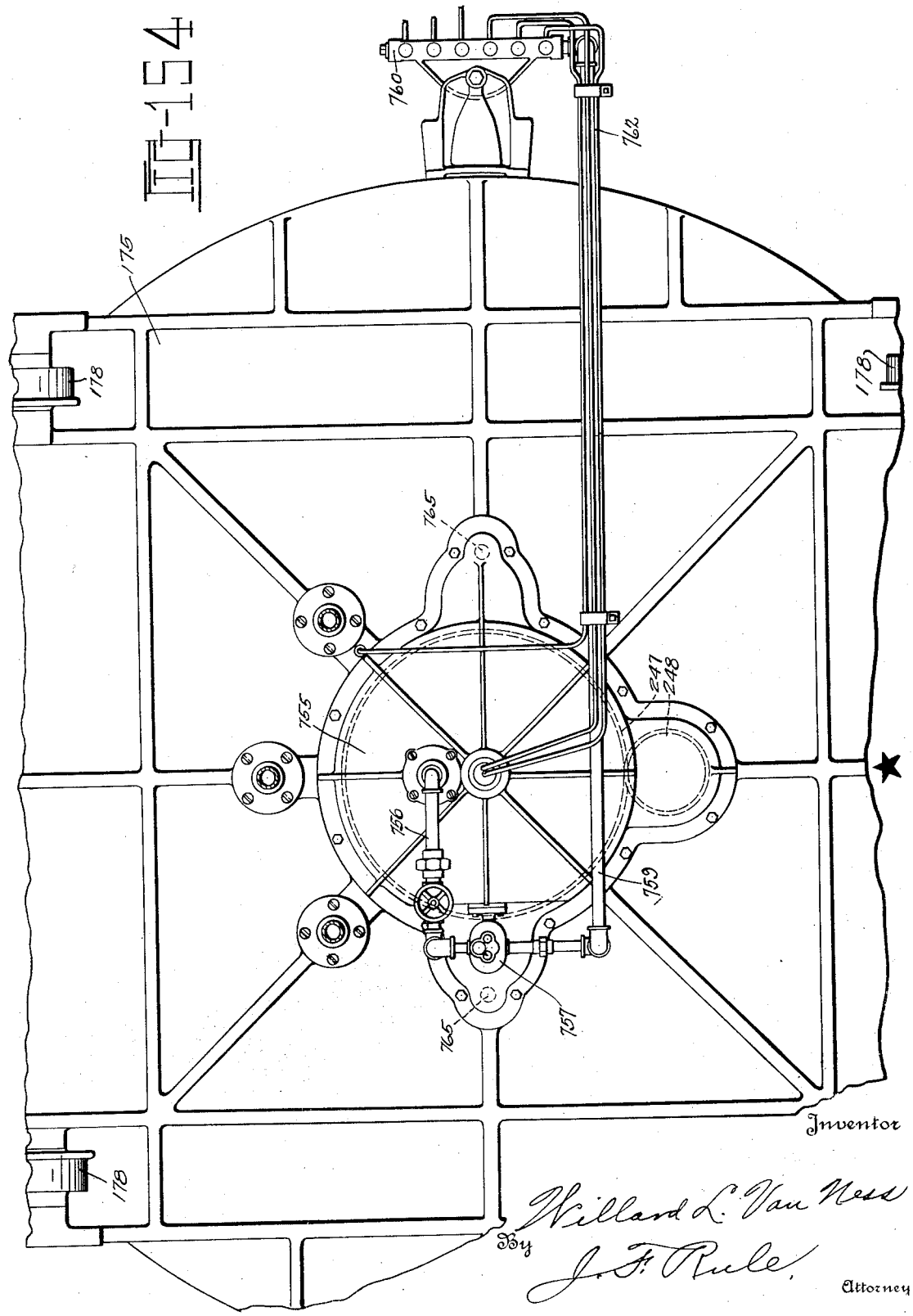

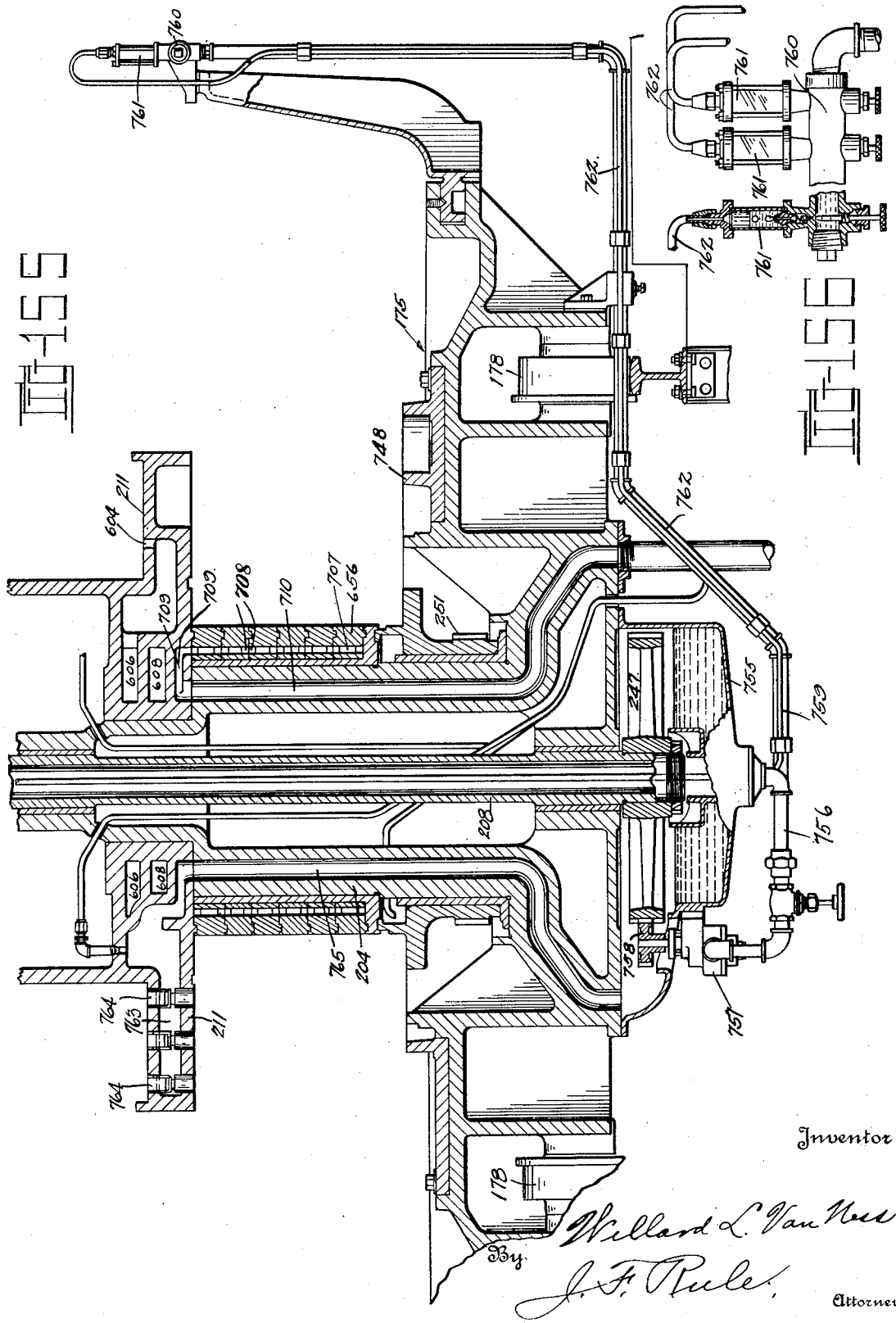

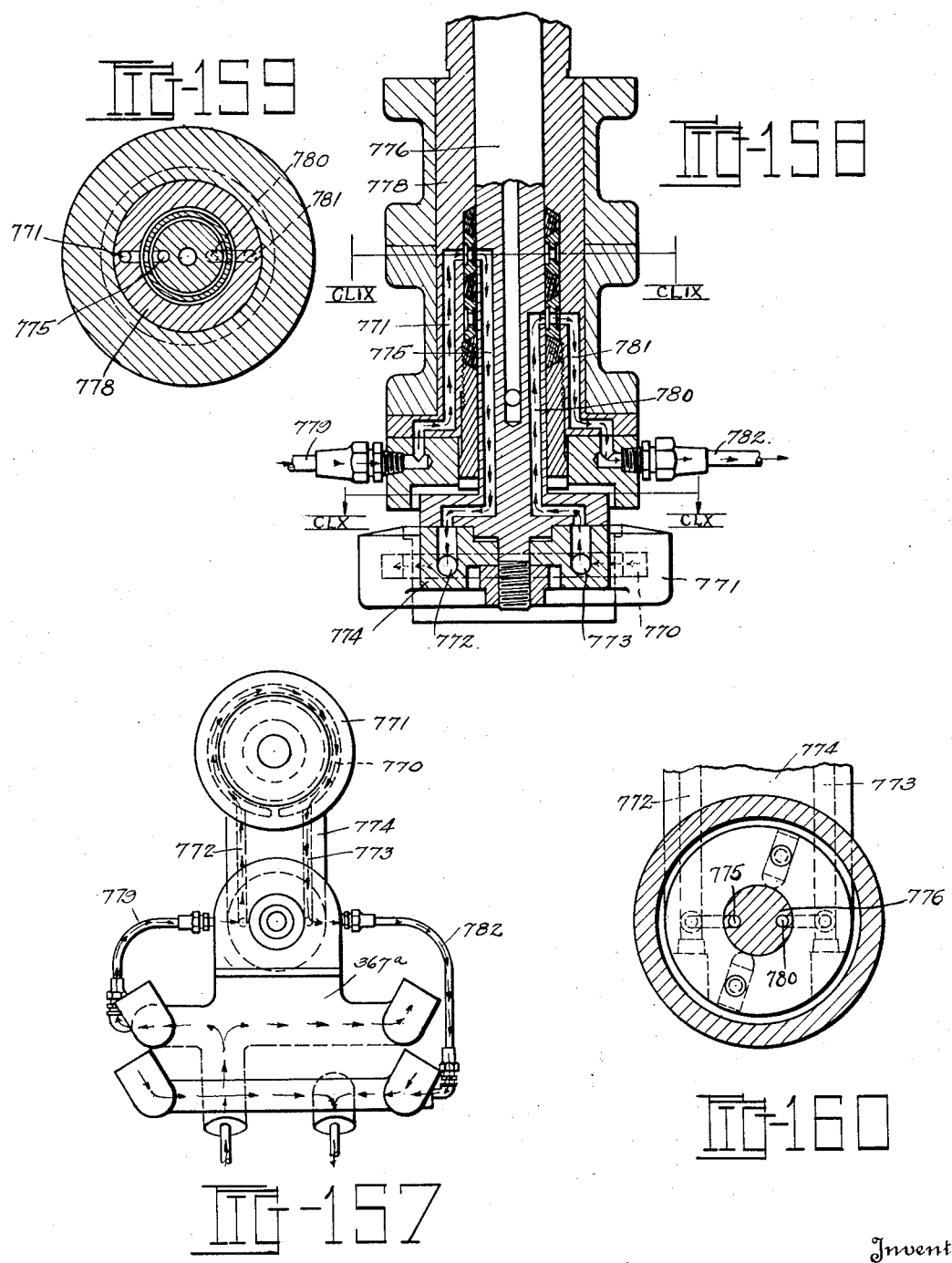

Patented Oct. 17, 1933

1,931,336

UNITED STATES PATENT OFFICE 1,931,336

GLASSWARE FORMING MACHINE

Willard L. Van Ness, Toledo, Ohio, assignor to Owens-Illinois Glass Company, Toledo, Ohio, a corporation of Ohio Application August 23, 1929. Serial No. 387,871

52 Claims. (Cl. 49—5)

The present invention relates to improvements in glassware forming machines and more particularly to that type in which body blank molds gather mold charges from a supply body of molten glass by suction at regular time intervals.

An object of my invention is to effect economy in machine construction and operation by eliminating certain molds and decreasing the duration of the idle periods of movement of the remaining molds to compensate for the reduction in the number of molds. In many types of machines, the gathering or body blank molds, for example, actually work only during movement from a charge gathering zone or station to a blank transfer station, or about 90° of their entire travel in each cycle of operations. During the remaining 270°, these molds move idly about the machine axis and without changing their speed of travel to the charge gathering zone. The above circumstances exist also with respect to the finishing mold operation. According to my invention the number of gathering and finishing molds is materially decreased and those remaining have their speeds of travel greatly accelerated while moving idly to the mold charging zone or station.

Another object of the invention is to provide means whereby blanks or parisons may be partly developed prior to final expansion in the finishing molds. To this end the machine embodies invertible neck molds to which the blanks or parisons are affixed during transfer from the body blank molds to the finishing molds and through which air under pressure may be applied internally of the blanks while the latter are enclosed in the body blank molds and later moving through the open air. Thus, the glass is properly conditioned and evenly distributed throughout the blanks or parisons prior to being enclosed in the finishing molds for final expansion.

A further object is to provide a machine of the above character embodying means to produce paste mold ware and including blank rotating means operable at least during the time the blanks are in the paste finishing molds.

A further object is to provide in a machine of the above character, means to control the working temperature of the molds. According to the present invention, this is accomplished by constantly circulating a cooling medium through passageways or chambers provided in the mold sections.

A still further object is to provide means to exhaust the air from the finishing molds substantially simultaneously with final expansion of the blanks or parisons enclosed in the finishing molds. In this manner, complete expansion of the blanks or parisons is obtained quickly, and the production of articles of glassware having improperly formed exterior surfaces is avoided.

It is likewise an object to provide novel means for holding the finished articles of glassware against lateral movement with the sections of the mold during opening of the latter. To this end, the bottom plate of each finishing mold is formed with vacuum slots through which the air is exhausted from the finishing mold during final shaping of an article of glassware. By maintaining the vacuum in the slots during and for a predetermined period of time after opening of the mold, the article of glassware is securely held in position upon the bottom plate.

In addition to the above enumerated objects, it is the purpose of the present invention to generally improve the construction of glassware blowing machines.

Other objects of the invention will appear hereinafter.

In the drawings:

Fig. 1 is a vertical sectional view of the machine with parts in elevation.

Fig. 2 is a fragmentary sectional elevation of the charge gathering or body blank mold unit and cooling means therefor.

Fig. 3 is a sectional view taken along the line III—III of Fig. 2, showing a part of the mold-projecting mechanism.

Fig. 3A is a detail perspective view of one of the charge gathering units.

Fig. 4 is a sectional elevation showing the ram reciprocating means and the neck mold and blank developing mechanism cooperating with the body blank or gathering mold.

Fig. 5 is a detail sectional view taken along the line V—V of Fig. 62, showing a portion of the means for controlling exhaust of air from the neck molds.

Fig. 6 is a fragmentary side elevation with parts in section, showing the gathering or body blank mold.

Fig. 7 is a horizontal sectional view with parts in elevation taken substantially along the line VII—VII of Fig. 6 and showing the gathering mold closed.

Fig. 8 is a view similar to Fig. 7, showing the gathering mold open.

Fig. 9 is a detail sectional elevation showing the separable connection between one of the gathering or body blank mold sections and its supporting arm.

Fig. 10 is a sectional elevation showing the gathering mold construction, whereby a cooling medium may be circulated through each section.

Fig. 11 is a horizontal sectional view showing in detail one of the valved openings in the body blank mold.

Fig. 12 is a side elevation of the charge gathering unit, showing the gathering or body blank mold projected to its charge gathering zone or position.

Fig. 13 is a view similar to Fig. 12, showing the gathering or body blank mold retracted to a position for cooperation with a neck mold.

Fig. 14 is a sectional view along the line XIV—XIV of Figs. 13 and 17, showing the series of vacuum passageways to the gathering mold so positioned that communication between the source of vacuum and the mold is shut off.

Fig. 15 is a view similar to Fig. 14 taken along the line XV—XV of Fig. 12, showing the vacuum passageways registering with each other as when the mold is projected.

Fig. 16 is a fragmentary plan view of the parts positioned as shown in Fig. 15.

Fig. 17 is a plan view showing the ram retracted; cut-off swung to one side of the body blank mold, and vacuum passageway closed.

Fig. 18 is a view similar to Fig. 17, showing the ram projected to its charge gathering position and the vacuum passageway open to permit suction gathering of glass.

Fig. 19 is a detail sectional elevation showing the position of the cut-off and actuating means therefor prior to swinging the cut-off into register with the gathering mold.

Fig. 20 is a view similar to Fig. 19, showing the cut-off in register with the gathering mold.

Fig. 21 is a fragmentary sectional elevation showing the rack and pinion mechanism embodied in the cut-off operating means.

Fig. 22 is a sectional view taken along the line XXII—XXII of Fig. 21.

Fig. 23 is a side elevation with parts in section, showing the means for controlling exhaust of air from the gathering molds.

Fig. 24 is a sectional plan view taken substantially along the line XXIV—XXIV of Fig. 23.

Fig. 25 is a view similar to Fig. 23, showing the vacuum control valve open.

Fig. 26 is a detail sectional view of the vacuum control valve closed, taken along the line XXVI—XXVI of Figs. 31 and 32.

Fig. 27 is a sectional view taken along the line XXVII—XXVII of Fig. 26.

Fig. 28 is a fragmentary plan view of a part of the cam mechanism for actuating one of the vacuum control valves.

Fig. 29 is a sectional view taken substantially along the line XXIX—XXIX of Figs. 25, 30 and 31, showing only the vacuum passageways in the top spider.

Fig. 30 is a sectional view taken along the line XXX—XXX of Fig. 29.

Fig. 31 is a sectional elevation taken along the line XXXI—XXXI of Figs. 25 and 32, showing the vacuum passageways leading to the gathering and neck molds.

Fig. 32 is a horizontal sectional view taken substantially along the line XXXII—XXXII of Fig. 31.

Fig. 33 is a sectional elevation view showing one of the vacuum passageways extending upwardly through the machine to the rams which carry the charge gathering or body blank molds.

Fig. 34 is a view similar to Fig. 33, showing one of the passageways through which air under pressure is applied to the neck molds.

Fig. 35 is a detail sectional view of the pressure reducing valve in the air pressure passageway.

Fig. 36 is a plan view more or less diagrammatically showing the means for and path of circulating water through the gathering molds.

Fig. 37 is a detail plan view of the distributor head comprising a portion of the cooling system and to which the outer ends of the telescopic water pipes are connected.

Fig. 38 is a sectional view taken substantially along the line XXXVIII—XXXVIII of Fig. 37.

Fig. 39 is a sectional view taken substantially along the line XXXIX—XXXIX of Fig. 37.

Fig. 40 is a sectional view of the ram cushioning feature embodied in the mold cooling system.

Fig. 41 is a plan view with parts in section, showing the arrangement of the water supply pipes at the upper end of the machine.

Fig. 42 is a detail sectional view showing the connections between the water pipes and distributor.

Fig. 43 is a plan view showing the various relative positions of the gathering or blank mold and cut-off in the charge gathering zone.

Fig. 44 is a diagrammatic plan view illustrating the high and low speed movements of the charge gathering or body blank molds.

Fig. 45 is a sectional plan view showing the means for locking the movable cam plate and high speed disk together, the locking device being shown at the gathering mold projecting or charge gathering zone.

Fig. 46 is a fragmentary plan view similar to Fig. 45, showing the locking device advanced to the position in which it begins to accelerate rotary movement of one of the gathering molds.

Fig. 47 is a diagrammatic plan view of the stationary and movable cams, the latter being grouped together just prior to gathering of a charge of glass by one of the gathering molds and acceleration of another mold to bring the latter to a position just in advance of the charge gathering zone.

Fig. 48 is a view similar to Fig. 47, showing the manner in which the gathering molds are moved one at a time away from the remaining molds of the group, at an accelerated speed.

Fig. 49 is a view showing one of the movable cam plates (which are carried by the gathering mold units) about to enter the speed decelerating section of the stationary cam adjacent the charge gathering zone or station.

Fig. 50 is a plan view of the stationary cam which forms part of the means for alternately accelerating and decelerating the speed of travel of the charge gathering molds.

Fig. 51 is a fragmentary side elevation of the stationary cam showing a second cam which alternately raises and lowers the centering pins which interconnect the gatherng mold carriages and the neck mold carriage during the decelerated speed of travel of the molds.

Fig. 52 is a sectional plan view showing part of the mechanism which reciprocates the gathering molds.

Fig. 53 is a detail perspective view of the slide block which actuates the ram reciprocating mechanism.

Fig. 54 is a fragmentary plan view showing one of the movable cam plates and the high speed slide which periodically accelerates the speed of travel of the gathering molds.

Fig. 55 is a sectional view taken along the line

LV—LV of Fig. 54, showing the means for connecting the ram carriages one at a time to the high speed disk during the accelerated movement of the carriages; also the combined locking and centering pin which connects the ram carriages to the low speed disk.

Fig. 56 is a horizontal sectional view taken along the line LVI—LVI of Fig. 55.

Fig. 57 is a fragmentary front elevation of one of the mold groups, showing the gathering and neck molds together.

Fig. 58 is a sectional view taken along the line LVIII—LVIII of Fig. 57, showing the flow regulating valve in the water supply pipe.

Fig. 58—A is a perspective view showing the gathering and neck molds together after passing the charge gathering zone.

Fig. 59 is a sectional elevation of one of the spindles or neck forming and blank developing units and operating mechanism therefor.

Fig. 60 is a detail sectional view of the vacuum control valve for the neck mold.

Fig. 61 is a detail plan view showing the cams for controlling flow of air under pressure to the neck molds.

Fig. 62 is a side elevation, with parts in section, of the spindle, or neck forming and blank developing unit.

Fig. 63 is a sectional elevation of the cam actuated collars forming part of the spindle and plunger rod reciprocating means.

Fig. 64 is a sectional view taken along the line LXIV—LXIV of Fig. 63.

Fig. 65 is a front elevation with parts in section showing the neck mold in its lowermost upright position.

Fig. 66 is a transverse sectional view through the spindle or neck mold carrier taken substantially along the line LXVI—LXVI of Fig. 62.

Fig. 67 is a sectional plan view of the neck mold and blank developing unit.

Fig. 68 is a detail sectional view of one of the cam actuated valves for controlling application of air under pressure to the neck mold.

Fig. 69 is a plan view of the neck mold opening and closing means.

Fig. 70 is a vertical sectional view taken substantially along the line LXX—LXX of Fig. 69.

Fig. 71 is a fragmentary front elevation showing the neck mold inverted and cooperating with the finishing mold.

Fig. 72 is a detail sectional view of the connection between the neck mold centering block and neck mold opening mechanism.

Fig. 73 is a view similar to Fig. 69, showing the neck mold opening and closing mechanism inactively positioned.

Fig. 74 is a view similar to Fig. 70, showing the mechanism inactively positioned.

Fig. 75 is a fragmentary front elevation of the neck mold centering and opening mechanism.

Fig. 76 is a sectional view taken substantially at the line LXXVI—LXXVI of Fig. 73.

Fig. 77 is a central vertical sectional view through the neck mold and blank developing unit and operating mechanism therefor.

Fig. 78 is a sectional view taken along the line LXXVIII—LXXVIII of Fig. 77.

Fig. 79 is a sectional view taken substantially along the line LXXIX—LXXIX of Fig. 77.

Fig. 80 is a sectional view taken along the line LXXX—LXXX of Fig. 77.

Fig. 81 is a sectional elevation showing the mechanism for oscillating the neck mold unit or spindle, the latter being inverted when the mechanism is positioned as shown in this figure.

Fig. 82 is a fragmentary side elevation with parts in section, of the mechanism positioned as shown in Fig. 81.

Fig. 83 is a view similar to Fig. 81, showing the position of the mechanism when the neck mold or spindle is upright.

Fig. 84 is a side elevation with parts in section, showing mechanism positioned as in Fig. 83.

Fig. 85 is a fragmentary front elevation of the spindle or neck mold carrier, showing in dotted lines the air pressure and vacuum passageways.

Fig. 86 is a sectional view of the spindle, taken substantially along the plane of line LXXXVI—LXXXVI of Fig. 85.

Fig. 87 is a fragmentary plan view of that portion of the spindle carrier enclosing the air pressure control valves.

Fig. 88 is a sectional view along the line LXXXVIII—LXXXVIII of Fig. 87.

Fig. 89 is a sectional view taken substantially at the line LXXXIX—LXXXIX of Fig. 87.

Fig. 90 is a sectional view taken along the line XC—XC of Fig. 87.

Fig. 91 is a sectional view taken along the line XCI—XCI of Fig. 87.

Fig. 92 is a fragmentary side elevation showing in dotted lines the air passageways through the neck mold carrier.

Fig. 93 is a sectional plan view showing part of the machine drive mechanism and indicating the points at which the different movements of the spindles or neck molds occur during a single revolution of the machine.

Fig. 94 is a sectional view taken along the line XCIV—XCIV of Fig. 93, showing the means for revolving the spindle during inversion thereof.

Fig. 95 is a sectional view taken along the line XCV—XCV of Fig. 93, showing the means for holding the spindle against rotation.

Fig. 96 is a sectional elevation showing in detail the means for terminating the period of rotation of the spindle of neck mold and positively holding the spindle in vertical position.

Fig. 97 is a plan view diagrammatically showing the relation between the vacuum control cams for gathering the mold charges, and the valve actuating cams regulating the flow of air used in developing and finally blowing the blank.

Fig. 98 is a plan view of the group of finishing molds, showing the opening and closing means therefor and indicating the points of accelerated and decelerated speeds of travel thereof.

Fig. 99 is a vertical sectional view with parts in elevation, showing a finishing mold unit cooperating with one of the neck mold units.

Fig. 100 is a plan view with parts in section, showing a finishing mold closed and mechanism individual thereto for controlling the opening and closing movements thereof.

Fig. 100—A is a view similar to Fig. 100, showing the finishing mold open.

Fig. 101 is a side elevation of a finishing mold unit.

Fig. 102 is a front elevation thereof.

Fig. 103 is a fragmentary sectional plan view taken along the line CIII—CIII of Fig. 105, showing the means for centering the finishing mold.

Fig. 104 is a view similar to Fig. 103, showing said device operatively positioned.

Fig. 105 is a vertical sectional view of the centering and locking device operatively positioned.

Fig. 106 is a sectional elevation of the vacuum control means at the lower end of the holder for the finishing mold bottom plate.

Fig. 107 is a sectional view taken along the line CVII—CVII of Fig. 108.

Fig. 108 is a sectional view with parts in elevation, showing the means for exhausting air from the finishing mold.

Fig. 109 is a detail sectional view of a part of the means for controlling exhaust of air from the finishing mold.

Fig. 110 is a fragmentary horizontal sectional view through the finishing mold, showing the combined centering block and mold locking means by which the mold is held against premature opening.

Fig. 111 is a detail sectional view of the mold centering and locking device.

Fig. 112 is a sectional view along the line CXII—CXII of Fig. 111.

Fig. 113 is a sectional elevation of the lower portion of the machine, showing the means for accelerating movement of the finishing molds.

Fig. 114 is a sectional plan view of the lower portion of the machine, showing the stationary and movable cams which control rotation of the finishing molds.

Fig. 115 is a detail plan view of the stationary finishing mold cam and movable cam plates (the latter mounted on the finishing mold carriages) just prior to acceleration of the movement of one of the plates and the corresponding finishing mold carriage.

Fig. 116 is a fragmentary plan view showing three of the movable cam plates in the position wherein their speed is synchronized with the speed of the neck molds and the fourth cam plate is in position for movement at an accelerated speed.

Fig. 117 is a detail view showing one of the movable cam plates and high speed slide in the position occupied during high speed travel of a finishing mold.

Fig. 118 is a diagrammatic view showing the shape and relative positions of the cams which control gathering of mold charges and developing thereof preparatory to enclosure in the finishing mold.

Fig. 119 is a diagrammatic view of the cam which controls movement of the locking or centering pin which interconnects the gathering molds and neck mold carriage during synchronized movement of the neck and body blank or gathering molds.

Fig. 120 is a diagrammatic plan view of the cams controlling the movements of the spindles or neck molds and the finishing molds during transfer of blanks to the latter and expansion in the finishing molds.

Fig. 121 is a fragmentary sectional view taken along the line CXXI—CXXI of Fig. 122, showing the drive connection between the main drive shaft and the neck mold or spindle carriage.

Fig. 122 is a horizontal sectional view taken along the line CXXII—CXXII of Fig. 121.

Figs. 123 to 132 inclusive illustrate the successive steps followed in transforming a mold charge into a finished article of glassware.

Fig. 123 shows the shape of the mold charge at the time it is gathered from the supply body of molten glass.

Fig. 124 shows the mold charge in the gathering mold just prior to upward projection of the plunger into the glass.

Fig. 125 shows the plunger projected into the glass in order to form the neck of the article being produced.

Fig. 126 is a view similar to Fig. 127, showing the glass expanded against the cavity walls after a short puff of compressed air has been directed into the mold through the plunger.

Fig. 127 shows the charge of glass transformed into a blank and expanded slightly after the gathering mold has been opened.

Fig. 128 is a view showing the blank collapsed.

Fig. 129 shows the neck mold inverted and the blank partly developed.

Fig. 130 is a view showing the blank completely developed and ready to be enclosed in a finishing mold.

Figs. 131 and 132 are views showing the successive steps in final expansion of the blank in the finishing mold.

Fig. 133 is a sectional plan view of the lower spider support upon which the spindle or neck mold carriage is mounted and showing the air passageways therethrough, said view taken substantially along the line CXXXIII—CXXXIII of Fig. 34.

Fig. 134 is a sectional view taken along the line CXXXIV—CXXXIV of Fig. 133.

Fig. 135 is a view similar to Fig. 133 taken along the line CXXXV—CXXXV of Fig. 33 and showing the vacuum passageways in the support.

Fig. 136 is a sectional view taken along the line CXXXVI—CXXXVI of Fig. 135.

Fig. 137 is a fragmentary plan view of the spindle or neck mold supporting carriage, showing the air and vacuum passageways therethrough.

Fig. 138 is a sectional view taken substantially along the line CXXXVIII—CXXXVIII of Fig. 137.

Fig. 139 is a sectional plan view of the bottom ring which forms part of the neck mold carriage.

Fig. 140 is a sectional view taken along the line CXL—CXL of Fig. 139.

Fig. 141 is a sectional view taken along the line CXLI—CXLI of Fig. 139.

Fig. 142 is a sectional view taken along the line CXLII—CXLII of Fig. 139.

Fig. 143 is a sectional plan view taken along the line CXLIII—CXLIII of Fig. 144, showing the means for moving the entire machine toward and away from the furnace.

Fig. 144 is a sectional view taken substantially along the line CXLIV—CXLIV of Fig. 143.

Fig. 145 is a sectional view taken substantially along the line CXLV—CXLV of Fig. 144.

Figs. 146 to 153 inclusive are detail views showing the means for elevating one end of the machine.

Fig. 146 is a sectional view taken along the line CXLVI—CXLVI of Fig. 147, showing the means for raising or lowering one end of the machine.

Fig. 147 is a sectional view taken along line CXLVII—CXLVII of Fig. 146.

Fig. 148 is a sectional view taken along the line CXLVIII—CXLVIII of Fig. 146.

Fig. 149 is a view similar to Fig. 148, showing the raising and lowering device in position to elevate one end of the machine, taken along the line CXLIX—CXLIX of Fig. 150.

Fig. 150 is a sectional view taken along the line CL—CL of Fig. 149.

Figs. 151, 152 and 153 are detail views of the stop which limits rotary movement of the shafts.

Fig. 154 is a bottom plan view of the machine showing, particularly, part of the lubricating system.

Fig. 155 is a vertical sectional view, showing the means for supplying lubricant to the bearings of the machine.

Fig. 156 is a detail view of the oil feed gauges.

Fig. 157 is a plan view more or less diagrammatically illustrating another form of cutoff mechanism wherein provision is made to cool the cutoff knife or ring and supporting arm therefor.

Fig. 158 is a fragmentary detail sectional view.

Fig. 159 is a transverse sectional view taken along the line CLIX—CLIX of Fig. 158.

Fig. 160 is a transverse sectional view taken substantially along the line CLX—CLX of Fig. 158.

General description

The following general statement of the construction and operation of the machine, preparatory to entering into a detail description of the mechanism, may materially assist one in obtaining a thorough understanding of the construction and method of operation of the illustrated embodiment of the machine.

The machine (Fig. 1) broadly comprises three main elements; first, means for gathering mold charges of molten glass by suction from a supply body; second, neck forming and blank developing or conditioning means; and, third, means for finally expanding the blanks to the shape of the articles of glassware being produced. These elements are mounted in superposed relation upon a stationary central pillar rising vertically from a wheeled base. The neck forming and blank developing means is arranged between the charge gathering and final shaping means mounted at the upper and lower ends respectively of the pillar. The machine is supported on a track so that it may be moved toward and from a furnace or tank (Fig. 2) which contains the supply body of molten glass from which mold charges are obtained. A motor mounted on the base of the machine serves to move the machine on the trackway toward and from the furnace.

The charge gathering means (Figs. 1 and 2) which in the present machine comprises four suction gathering molds or body blank molds, is arranged above the neck molds. These gathering molds move at varying speeds about the central pillar. During the charge gathering and neck forming operations the gathering molds move in synchronism with the neck molds and in register with one of the molds. During the remainder of each revolution or approximately 270°, the gathering molds move at a considerably higher rate of speed than said neck molds and are thereby quickly returned to the charge gathering zone or station after completion of each period of cooperation with the neck molds. In the present embodiment of the machine the high speed of travel of the gathering molds is approximately twelve times that of the neck molds.

The neck forming and blank conditioning means (Figs. 1, 4 and 99) comprises an annular series of neck molds arranged between the vertically spaced groups of charge gathering and finishing molds. These neck molds are rotatable continuously and at a constant speed in a circular path between the groups of charge gathering and finishing molds. In the illustrated embodiment of the machine, twelve neck molds are employed and are mounted in a fashion permitting inversion at regular time intervals from upright positions, in which the open ends face upwardly for cooperation with the charge gathering molds, to positions in which they suspend the blanks or parisons for final blowing in the finishing molds. With each neck mold is associated means to exhaust air therefrom and to apply short puffs of air under pressure internally of the blanks, in alternation. The air is exhausted from the neck mold to draw glass thereinto for completely forming the neck of the article of glassware being manufactured. The short puffs of air develop the blank preparatory to final expansion in the finishing mold.

The means for expanding the blanks or parisons to the final shape of the articles of glassware being produced, includes, in the present disclosure, four finishing or blow molds mounted below the neck mold carriage. These molds rotate at varying speeds about the central pillar. The speed of travel of the finishing molds is synchronized with that of the neck molds during the final blowing operation by locking them together, and is accelerated to approximately twelve times the speed of the neck molds during the remainder of each revolution. The final blowing operation takes place at a point approximately diametrically opposite the neck forming and blank transfer zone and as soon as development of the parison has advanced sufficiently.

The charge gathering and finishing or blowing molds are maintained at the proper temperature by constantly circulating cooling water through chambers formed in the walls of the mold sections.

In general terms, the operation of the illustrated embodiment of the machine is substantially as follows: Assume that one of the charge gathering units is approaching the charge gathering zone "G" (Fig. 44) and that its speed of movement has been decelerated to a point at which said mold and the neck mold carriage movements are synchronized. The gathering mold is projected radially outward into the furnace (Fig. 2) containing the molten glass. During this projecting movement a cutoff knife is moved to a position below the open lower end of the gathering mold. Upon arrival at its outermost position the cutoff knife contacts with the upper surface of the supply body of molten glass. Simultaneously with such positioning of the cutoff knife and gathering mold, suction is automatically applied to the mold so that a charge of molten glass is drawn into the latter by way of a vertical opening in the knife. The gathering mold is now retracted from the furnace and prior to passing the rim of the tank in front of the gathering area the cutoff is moved laterally across the bottom of the mold to thereby sever the mold charge from the supply body of glass. Continued retractive movement of the gathering mold brings the latter to a position directly above one of the neck molds. This neck mold whose cavity opens upward is immediately moved vertically upward into engagement with the open lower end of the gathering mold. A plunger which forms part of the neck mold unit is now projected upwardly into the lower end of the gathering mold and displaces a portion of the glass therein. This displaced glass is forced into the neck cavity (see Fig. 4). By means of suction, additional glass is drawn into the neck mold cavity and compacted therein. This operation gives final shape to the neck portion of the article of glassware being produced, initially shapes the blank or parison, and attaches it to the neck mold. As indicated above, the gathering molds and neck molds move in synchronism during the charge gathering and blank forming operations just described.

The gathering mold (Fig. 77) is now opened by suitable mechanism and leaves the bare blank projecting upward from the neck mold. Immediately after the gathering mold has completely opened, and lowering of the neck mold with parison attached thereto effected, said gathering mold has its speed of movement accelerated to approximately twelve times the speed of the neck mold to thereby quickly carry the gathering mold to a position adjacent and in advance of the charge gathering zone where it will again be projected radially outward to gather another charge of molten glass as above described.

The neck mold or spindle which is now supporting the bare blank or parison begins to rotate about its own axis immediately after the gathering mold opens. In addition to this rotary movement the neck mold is subject to an inverting movement about a horizontal axis extending radially of the machine so that the blank or parison may be swung downwardly to a position in which it is enclosed in a finishing mold. During this swinging movement, the blank is alternately expanded and contracted by periodic application of puffs of air under pressure internally of the blank. This develops and initially shapes the glass blank for final expansion.

A finishing or blowing mold moving about the central pillar below the neck mold carriage at varying speeds, is moved at high speed to a point adjacent and in advance of the transfer station at which the blank or parison is completely inverted preparatory to final blowing. The speed of travel of the finishing mold is decelerated as it approaches the transfer station "W" (Figs. 98 and 120) until it synchronizes with the speed of the inverted neck mold, whereupon the latter is moved vertically downward into operative engagement with the finishing mold which has a moment earlier closed about the blank. Air under high pressure is supplied through the plunger and expands the parison to the shape of the finishing mold cavity. Simultaneously with this application of high pressure air, or just in advance thereof, air is exhausted from the finishing mold by way of a port in the bottom plate of the finishing mold. By exhausting the air from the finishing mold as stated, complete and accurate final expansion of the parison is facilitated. Incidentally by exhausting the air from the finishing mold through the bottom plate, the expanded article is attached by vacuum to the bottom plate, and due to maintenance of the vacuum is held on the bottom plate after the finishing mold opens. At a predetermined point in the path of movement of the finishing mold, application of vacuum is discontinued so that the finished article may be removed from the bottom plate. The movements of the neck and finishing molds are synchronized during the final blowing operation. Immediately upon completion of final expansion of the blank or parison, the neck mold opens and moves upwardly away from the finishing mold and expanded article. The speed of travel of the finishing mold is immediately accelerated to thereby quickly carry the mold approximately 180° to a position adjacent the transfer station at which it will enclose another parison.

The above cycle of operations applies to all of the charge gathering and finishing molds. Where groups of gathering and finishing molds are employed as in the present embodiment of the machine (Figs. 44 and 98) several of the gathering molds will be cooperating with neck molds or spindles simultaneously in the initial formation of the blanks or parisons, and at the same time several of the finishing molds will be cooperating with other neck molds at a point diametrically opposite the blank forming and developing station, in final expansion of the blanks to the shape of the articles of glassware being produced. In the present case four gathering molds are employed, three of which will be moving in synchronism with the neck molds while the fourth is moving at an accelerated speed. This relation of mold speeds also applies to the finishing molds.

The framework (Figs. 1, 113, 154 and 155) which supports the main elements more or less generally referred to in the preceding description, comprises a base 175 mounted on wheels 178 which rest upon rails arranged in front of a furnace 203 (Fig. 2) containing a supply body of molten glass from which mold charges are obtained periodically. A central pillar 204 of cylindrical formation (Figs. 1 and 113) extends vertically upward from the center of the base 175. A continuously rotating drive shaft 208 is arranged within the pillar 204 and journaled in a series of bearings 206 forming a part of said pillar. Power for imparting movement to the several molds heretofore referred to is obtained from the drive shaft 208 as will be apparent presently.

The wheeled base (Figs. 1, 113 and 114) provides means whereby the machine may be moved bodily toward and from the furnace with ease. A motor 187 is employed to move the machine. The construction whereby the motor may be so employed comprises a pair of shafts 179 (Figs. 1, 114 and 143) journaled in bearings 176 just below the upper side 177 of the base and carrying the wheels 178 positioned between each pair of bearings. The motor 187 is operable to rotate the shaft 179 at the front end of the machine for the purpose stated. In providing driving connection between the motor and shaft 179 (Figs. 143 and 144) at the front end of the base 175, i. e., the end remote from the furnace, the shaft is extended through one side wall 181 of the base and journaled at its outer end in a bearing 182 in a gear housing 183. A worm gear 184 keyed to the shaft 179 within the gear housing 183 runs in mesh with a driving worm 185, carried by a shaft 186 which is rotated by the motor 187 operating through gears 188. The shaft 186 (Fig. 145) and gears 188 are enclosed in a housing 189.

The machine may be inoperatively positioned in a short period of time without stopping rotation thereof, by elevating the side adjacent the furnace so that the gathering molds do not contact with the supply body of molten glass in the furnace 203. The construction providing for such manipulation of the machine (Figs. 113 and 146 to 153 inclusive) includes mounting the shaft 179 at the rear end of the base, i. e., the end adjacent the furnace 203, in eccentric collars 190 (Figs. 113 and 146) which are positioned within openings extending through the wheels 178. One end 179a of this shaft 179 is extended beyond the side wall 181 of the base 175 and carries a worm gear 191 running in mesh with a worm 192 on a shaft 193, the latter journaled in bearings in a gear housing 194 (Fig. 146) and having one end 195 extending outwardly through said housing. This extended end 195 (Fig. 147) terminates in a squared shank 196. A wrench or lever (not shown) may be attached to the shank 196 when said shaft 179 is to be rotated for the purpose stated. Angular movement of the shaft is limited to 180° by a stop pin 197 (Figs. 146, 151, 152 and 153) which alternately engages the shoulders 198 on the gear housing. A change in the elevation of said shaft 179 effects a corresponding change in the elevation of the gathering molds as they move past the charge gathering zone or station. The advantages of this feature will appear hereinafter.

The central pillar which supports said main elements comprises upper and lower sections arranged end on end and connected together in a fashion to form a gear housing 214 (Figs. 1 and 4) substantially midway its height. This connection comprises a lower spider support 211 (Figs. 1 and 155) bolted or otherwise secured to the upper portion on the lower section of the pillar, said spider carrying an upstanding circular wall 213 which is suitably connected to a horizontal flange 212 on the upper section of the pillar, said flange constituting the upper wall of a gear housing 214.

The lower spider support 211 projects radially beyond the wall 213 of the gear housing 214 and supports the lower spider 231 which is connected through an annular series of upstanding neck mold or spindle frames 232 to a top spider 230. These spiders and frames (Figs. 57 and 58—A) together constitute a neck mold carriage "N" which supports the annular series of invertible neck molds or spindles referred to heretofore. This neck mold carriage which rotates continuously at a constant rate of speed incidentally provides a medium whereby the charge gathering and finishing molds are rotated in synchronism with the neck molds during a portion of each cycle of operations.

Driving connection between the main shaft 208 and the neck mold carriage whereby the latter may be continuously rotated at a constant speed includes a ring gear 233 (Figs. 1, 99, 121 and 122) secured to the lower spider 231 and meshing with one of a train of gears in the gear housing 214. This train of gears includes an idler gear 234 running in mesh with the ring gear 233. A vertical shaft 236 journaled in bearings 237 in the lower spider support 211 and upper wall 212 of the gear housing is arranged at one side of the idler 234. A gear 235 on the lower end of said shaft runs in mesh with the idler gear 234. A gear 238 is keyed to the upper portion of the shaft 236 and is driven by a gear 239 mounted on the main drive shaft 208. Through these gears continuous rotary motion is transmitted from the main drive shaft to the neck mold carriage "N".

The charge gathering and finishing molds 240 and 241 respectively are mounted on carriages or carriers individual thereto and adapted for rotation at a relatively high speed during the period of time in which they are not cooperating with the neck molds 246 or spindles. The construction whereby the speed of travel of the gathering molds 240 may be accelerated comprises a high speed disk 242 (Figs. 1 and 55) carried by a collar 243 which encircles the upper section of the central pillar 204 in proximity to the upper wall of the gear housing 214. This collar carries a gear 244 (Fig. 99) which encircles the pillar and runs in mesh with a gear 245 at the upper end of the shaft 236. Through this gearing the high speed disk 242 is constantly driven at a speed approximately twelve times that of the neck mold carriage. Means described hereinafter and carried in part by said disk 242 effects locking engagement between the disk and gathering mold carriages 240ª one at a time during a portion of each revolution. The lower end of the main drive shaft 208 carries a gear 247 which drives a pinion 248 at the lower end of a vertical shaft 249 journaled in bearings formed in the base 175, said shaft carrying at its upper end a pinion 250 running in mesh with a gear 251 encircling the lower section of the pillar 204 and carrying a high speed disk 252 at its upper end. Mechanism carried in part by this high speed disk 252 provides for locking engagement between said disk and the finishing mold carriages 241ª one at a time, whereby the latter may be moved about the pillar at a relatively high speed during a portion of each revolution. This mechanism and the means for locking the gathering molds and disk together will be specifically described hereinafter.

The main drive shaft 208 (Figs. 1 and 2) is constantly driven by a motor 150 operating through speed reduction gearing in a gear housing 229 at the upper end of the pillar 204. This speed reduction gearing includes a relatively large gear 219 fixed to the upper side of a circular plate 220 which also carries the dip cam 218. This gear 219 runs in mesh with a pinion 221 on the lower end of a vertical shaft 222 which in turn carries a large gear 223, the latter running in mesh with a pinion 224 on the lower end of a motor shaft 225 axially aligned with the main drive shaft 208 and journaled in bearings 226. These bearings are formed in a pedestal 227 upon whose upper end the motor 150 is mounted, said pedestal being bolted or otherwise secured to the upper side of the gear housing 229. Through this gearing the main drive shaft 208 is continuously rotated at a constant speed considerably lower than that of the motor 150.

Charge gathering means

In the illustrated embodiment of the machine, the means for gathering mold charges of molten glass from the furnace or tank 203 (Figs. 1, 2, 3, 3—A, 4, 8, 12 to 31 inclusive, 44 and 58—A) consists of a group of four units rotatably supported on the upper portion of the central pillar 204 above the gear housing 214. Obviously, a greater or less number of these units may be employed. These units (Figs. 1, 2, 3—A, 4 and 6) include mold carriages 240ª individual thereto and rotatable at variable speeds about said pillar independently of each other in a horizontal circular path. Included in each unit (Figs. 2, 3, 3—A and 4) is a ram 255 slidingly mounted on the carriage 240ª and adapted to be reciprocated along an inclined path radially of the machine by mechanism arranged at the upper end of and individual to the ram carriage; a partible charge gathering mold 240 pivoted to a vertical hinge pin suspended from the outer end of the ram 255; mechanism for alternately opening and closing the mold; cutoff or charge severing means carried by a rock shaft mounted in the hollow hinge pin; and means for cooling the gathering mold 240 by circulating cooling water or the like through chambers in the mold sections.

Each gathering mold carriage 240ª or ram carrier (Figs. 1, 2, 3—A and 4) comprises a base 257 connected thru vertical side members 258 to a pair of horizontally spaced guideways 259 which are inclined radially of the machine and slidingly support the ram 255 which carries the gathering mold 240. The base 257 (Figs. 2 and 3—A) is secured thru a bracket 260 to a trailer ring 260ª which encircles the central pillar 204 and may rotate freely thereon. The outer portion 261 (Figs. 3—A, 27 and 28) of the base 257 is stepped downwardly and slidingly engages the upper bearing surface of the top spider 230 of the neck mold carriage "N" (Fig. 4). A flange 262 at the outer end of the base 257 takes over a horizontal shoulder 230ª on the top spider 230 and secures the charge gathering unit and top spider 230 against relative vertical movement. This downwardly stepped portion 261 of the base encloses a valve for controlling the exhaust of air from the neck molds 246, and part of means for lining up or centering the gathering mold units and neck molds at regular time intervals. These features will be described hereinafter.

The ram 255 (Figs. 2, 3, 3—A, 4 and 12 to 18 incl.) which supports the charge gathering mold 240 at its outer end is slidingly mounted in the guideways 259. This ram as will be apparent presently also carries the charge severing mechanism and a major portion of the means for alternately opening and closing the charge gathering mold 240. Each ram 255 (Fig. 3) carries a pair of rack bars 266 which extend lengthwise thereof and comprise part of the mechanism for reciprocating the ram 255. These rack bars 266 are spaced apart transversely of the ram as shown.

The ram is adapted to be reciprocated radially of the machine in the guideways 259 to thereby project the charge gathering mold 240 to a charge gathering position and retract the mold 240 to a position over and in register with the neck molds 246 at regular time intervals. The means for reciprocating the ram 255 (Figs. 2, 3, 3—A and 4) is mounted upon the guideways 259. The frame 267 connects the guideways 259 and incidentally provides means to retain the ram 255 against upward movement in said guideways. This frame 267 includes horizontally spaced side walls 268 (Figs. 1, 3—A and 13) extending in the direction of the length of the ram and slidingly supporting therebetween a ram slide 269 having formed on its lower side a pair of transversely spaced rack bars 270. These rack bars 270 run in mesh with a pair of pinions 271 (Figs. 2 and 3) carried by a shaft 272 which extends transversely of the frame 267 and is journaled in bearings in the side walls 268 of said frame. A collar 273 is keyed to the shaft 272 between the pinions 271 and is formed with a pair of pinions 274 which run in mesh with the rack bars 266 carried by the ram 255. The gear ratio in the illustrated embodiment of this mechanism is such that the ram moves twice the distance moved by the ram slide 269 at the gathering station. Thus, the slide need move only a relatively short distance to project the mold 240 into a charge gathering position. The ram slide 269 (Figs. 2, 3—A and 4) includes an adjustable cam roll carrier 275 whose position may be changed by adjusting the set screws 276. A cam roll 277 on the carrier 275 runs in a track 278 (Figs. 2 and 52) on the lower side of stationary spider 279 (Fig. 2) connected to the central pillar 204 by means of a collar 280. A slideway 281 extends radially of the spider 279 and opens thru the periphery thereof at a point adjacent the supply tank or furnace 203. A dip slide 282 (Figs. 2, 52 and 53) is mounted for radial reciprocation in the slideway 281. An arcuate cam 283 on the lower side of the dip slide 282 at times is positioned to cooperate with the trackway 278 in forming a complete circular track and at other times engages the cam rolls 277 one at a time and thru them actuates the ram reciprocating mechanisms. Such movement of the dip slide 282 is obtained by mounting a cam roll 284 on the upper face of the slide and positioning said roll in the closed constantly rotating cam 218. This cam 218 (Fig. 2) is carried by the circular plate 220 in the gear housing 229 and rotates constantly at a relatively high speed with said plate. The cam 218 is so shaped that it actuates the ram reciprocating mechanism in a fashion to alternately project and retract the ram and charge gathering mold at the charge gathering zone or station "G".

Each charge gathering mold 240 (Figs. 2, 3—A, 4, 8, and 9) comprises two sections connected thru mold arms 290 to a hollow hinge pin 291 extending vertically downward from a sleeve 292 adjacent the outer end of the ram 255. The sections of the gathering mold 240 are provided with horizontal fingers 293 (Fig. 9) each carrying a connecting pin 294 extending vertically therethru and adapted to project into an upwardly opening recess 295 in one of the mold arms 290. Push pins 296 slidingly supported in the mold arms 290 in vertical alignment with said connecting pins 294 are operable in an obvious manner to remove the connecting pins from engagement with the mold arms 290. The walls of the mold cavities converge downwardly and thereby assist vacuum in holding the mold charges of molten glass therein. The lower end of each charge gathering mold 240 is provided with a circular tapered recess 297 which is adapted to fit over a tapered rib formed on the neck mold 246 primarily for the purpose of effecting accurate vertical alignment between the body blank and neck molds and secondarily to obtain an airtight seal between the molds.

Means to alternately open and close the charge gathering mold 240 (Figs. 2, 4 and 8) is carried in part by the ram 255 and in part by the central pillar 204. That portion of the mechanism carried by the ram 255 includes opposed slideways 300 formed in the inner faces of walls 301 extending downwardly adjacent the outer end of the ram. The slideways 300 support a pair of slide blocks 302 spaced apart and yieldingly connected together by a slide rod 303 and spring 304. One of these blocks 302 is connected thru links 305 to rearward extensions 306 on the mold arm 290. Reciprocation of the slide blocks 302 alternately opens and closes the mold 240. While the ram is in its retracted position a cam roll 307 is adapted to run in a stationary cam 308 connected to the central pillar 204 by means of a circular plate 309. This cam 308 (Figs. 2 and 58—A) terminates at points adjacent opposite sides of the ram projecting or charge gathering position so that when the ram is projected the mold opening mechanism carried thereby is free to move with said ram away from the cam 308. The mold opening and closing mechanism is held against operation while the ram is being reciprocated, by means of a latch 310 (Figs. 2 and 4) pivoted on a transverse pin 311 between the walls 301. This latch 310 carries a cam roll 312 at one end adapted to take over the inner end of one of the slide blocks 302 (Fig. 2). A coil spring 313 in the holder 314 adjacent the other end of said latch 310 yieldingly holds the latch in such position that the latter tends to project the cam roll 312 as shown in Fig. 2 wherein it holds the slide block against movement which would open the gathering mold.

While the gathering mold 240 and cutoff knife 315 occupy the charge gathering position as shown in Fig. 2 the air is exhausted from the mold cavity to draw a measured quantity of molten glass into the mold by way of the opening 318 in the cutoff. By exhausting the air from the mold cavity the cutoff ring 316 is moved upwardly in its supporting frame 315 and held in sealing contact with the lower end of the gathering mold. Exhaust of air from the mold cavity is in part controlled by movement of the ram 255 as will be apparent presently. The means whereby air may be exhausted from said gathering mold 240 is substantially as follows: A vacuum passageway 330 (Figs. 12 to 16, inclusive, 26, 29, 30, 31, 32, and 33) extends vertically thru one of the side members 258 or uprights of the gathering mold carriage, the lower end of said passageway communicating thru a lateral conduit 331 at regular time intervals with a vacuum chamber 332 (Figs. 31 and 33) in the top spider 230 of the neck mold carriage "N". This chamber 332 (Figs. 29, 30, 31 and 58—A) communicates at all times thru a valved opening 334 and a series of passageways 332$^a$, 332$^b$, 332$^c$ and port 332$^d$ in the top spider 230 with a vertical conduit 333 in one of the spindle frames 232. This vacuum conduit 333 (Fig. 33) leads downwardly to a series of vacuum chambers 595, 599 and 605 formed in the lower spider 231 and lower spider support 211, and thence by way of a conduit 607 to a suitable source of vacuum described in detail hereinafter. The upper end of the vacuum passageway 330 in the gathering mold carrier or carriage (Figs. 12 to 18 incl.) opens into a passageway 335 extending lengthwise in one of the guideways 255. This passageway 335 leads to a lateral port 336 opening thru the inner face of said guideway. The ram 255 is provided with a vacuum passageway 337 extending lengthwise thereof and having a lateral port 338 at its inner end adapted at times to register with the port 336 referred to above. The outer end of the passageway 337 in the ram 255 communicates thru a lateral port 339, with a vertical passageway 340 in a downward extension 341 at the outer end of the ram. This downward extension 341 includes a circular flanged head 342, about which the sections of the gathering mold 240 close just prior to gathering glass from the supply body. When the ram is completely projected to the charge gathering position (Figs. 2, 15 and 18) the ports 336 and 338 are in register with each other so that the air may be exhausted from the gathering mold by way of the series of passageways and ports above described. When the ram is completely retracted (Figs. 13, 14 and 17) the port 338 is open to the atmosphere and exhaust of air from the gathering mold cavity is discontinued.

In addition to the partial control of the exhaust of air from the gathering mold 240 by movement of the ram 255, cam controlled valve mechanism is employed to positively regulate the manner of duration of said application of vacuum. This mechanism (Figs. 12, 13, 23 and 27 incl. and 33) comprises a downwardly opening valve 343 arranged in the opening 334 and normally held closed by means of a spring 344 encircling the valve stem. The entire valve mechanism may be removed from the chamber 332 by removing the cage 345 in which said valve mechanism is mounted. The valve stem, at regular time intervals, is brot into register with a vertical opening 346 extending thru the downwardly stepped portion 261 of the base of one of the mold carriages 240$^a$. A push rod 347 slidingly carried by the mold carriage normally projects into said opening 346 and is adapted for downward movement therethru at regular time intervals for the purpose of unseating the valve 343 so that air may be exhausted from the gathering mold cavity. Means to move the push rod downwardly includes a bell crank lever 348 (Figs. 12, 13, 23, 24, 25 and 28) pivoted to the upper end of said rod 347 and mounted upon a hinge pin 349 at the inner end of a bracket 350 on one side of the frame 268 (Figs. 2, 23 and 25). An arm 351 of the bell crank lever 348 is connected thru a spring 352 to an ear 353 at one end of a cross bar 354 mounted at the outer end of the frame 268 said spring yieldingly holding the rod in its uppermost position. The bell crank lever 348 is rocked just after the charge gathering mold arrives at the charge gathering position in the furnace 203 to position the valve 343 as shown in Fig. 25. This is accomplished by providing a pair of sliding plungers 355 (Figs. 23 and 25) one of which carries a cam roll 356 adapted to engage a stationary cam 357, the latter shaped to move the plungers radially inward and open the vacuum control valve 343.

*Cutoff mechanism*

In order to avoid direct contact between the gathering mold and the supply body of molten glass and provide means for severing the mold charges from the supply body, the cutoff mechanism to be now set forth is employed. A cutoff or shear mechanism (Figs. 2, 3—A, 19, 20, 21, 22 and 43) is mounted on the ram 255 and actuated by movement of the ram radially of the machine. This mechanism includes a frame 315 or carrier which supports a circular cutoff knife 316, said frame being secured to the lower end of a rock shaft 317 extending upwardly thru the mold hinge pin 291. A vertical opening 318 extending thru the knife (Fig. 2) is brought into register with the mold cavity just prior to completion of the projecting stroke of the ram 255 by swinging the frame 315 laterally inward from a position at one side of the mold. This is accomplished by imparting a rotary movement to the rock shaft 317 just after the ram begins to move radially outward. The mechanism for imparting rotary movement to the rock shaft 317 includes a spiral pinion 319 mounted on the upper end of said rock shaft running in mesh with a rack bar 320. This rack bar 320 is mounted in a guideway 321 in one side of the ram 255 for reciprocation relative to and in the direction of the length of said ram. A substantially U-shaped frame member 322 (Figs. 17, 18 and 22) is slidingly mounted in a guideway 323 opposite a guideway 321. The frame member 322 and rack bar 320 are connected together for sliding movement as a unit relative to the ram 255. The inner ends of the rack bar and frame 322 (Fig. 2) are connected thru a link 324 to a parallel bar 325 arranged between the rack bars 266 carried by the ram and connected to the ram thru a pair of parallel links 326. A coil spring 327 connects an intermediate portion of the parallel bar 325 to the ram 255 and exerts a rearward pull on the bar tending to move the cutoff into position below and in register with the gathering mold 240 as shown in Fig. 2. The upper side of the parallel bar constantly engages the collar 273 (Figs. 2 and 3) between the gears 274. The inner portion of the bar 325 is decreased in height so that when the ram is projected said bar may move upwardly and inwardly under the influence of the spring 327 and thereby impart lengthwise movement to the rack bar 320 for swinging the cutoff laterally into position below the gathering mold. The inclined surface 328 on the upper side of the parallel bar 325 engages the collar 273 during a portion of the retractive stroke of the ram 255. The bar is thereby moved downwardly and radially outward to swing the cutoff knife 316 laterally away from the position below said gathering mold shortly after the mold begins to move away from the glass. This latter movement of the cutoff knife 316 severs the mold charge from the supply body of molten glass. By changing the length of the inclined surface 328 on the parallel bar 325, the speed of travel of the cutoff knife 316 may be varied.

Cooling gathering molds

The charge gathering molds 240 are maintained at a temperature permitting efficient operation, by constantly circulating cooling water thru chambers 360 in the mold sections (Figs. 2, 3—A, 6 to 13 inclusive, 36 to 40 inclusive, 41 and 42). Means providing for circulation of cooling water thru said chambers 360 includes delivery and exhaust pipes 361 and 362, respectively, (Figs. 2, 3—A, 6 and 36) arranged below each ram in parallel relation thereto. Each pipe comprises a series of sections telescoping one within the other, the outer section being secured to a two-compartment cushioning member 260 and communicating with one compartment of the latter thru an opening 364 in the outer wall. These pipes 361 and 362 are connected to inlet and exhaust pipes 365 and 366, respectively, extending upwardly for a purpose which will be apparent presently. The inner sections (Figs. 2, 6, 36, 38 and 39) of the telescopic pipes 361 and 362 are connected to a distributor head 367 adjacent the mold 240, said head in turn connected thru a group of flexible pipes to the chambers 360 (Figs. 9 and 10) in the gathering mold sections. A substantially T-shaped passageway 368 in the distributor head 367 provides communication between the outer end of the inlet pipe 361 and a pair of flexible pipes 369 (Figs. 36 and 37) which lead to a pair of valved inlet openings 370 in the lower portions of said chambers 360. The outer section of the exhaust pipe 362 (Figs. 36, 37 and 39) communicates with a transverse passageway 371 in the distributor head 367, said passageway communicating at both ends with flexible pipes 372 leading to valved openings in the upper portions of the chambers 360 in the gathering mold.

Each of the flexible pipes 369 and 372 is connected to the gathering mold section by means of a valve housing 373 (Figs. 8, 10 and 11) one end of which is threaded into an opening in the outer wall of the corresponding chamber 360. This housing 373 is rotatably connected to the corresponding flexible pipe by a coupling 374 which encircles the housing and is held in place thereon between a radial flange 375 and a lock nut 376, the latter threaded on the outer end of the valve housing. Radial openings 377 in the housing and an annular channel 378 in the coupling provide communication between the interior of said housing and the corresponding flexible pipe. The valve 379 is mounted on a valve stem 380 axially of the housing. The inner end of the stem abuts a stop 381 within the chamber 360 and is yieldingly held in contact therewith by a spring 382 encircling the outer portion of the stem and exerting inward pressure upon the valve 379. A plug or closure 383 is threaded into the outer end of the housing and in part supports the valve 379 and spring 382. By rotating the housing 373 to change the spaced relation between the valve seat 384 and the stop 381 the area of the opening thru which the cooling medium enters or leaves the chamber 360 may be varied. Thus, the circulation of the cooling medium may be positively controlled.

The air cushioning chambers 363 provide means to reduce the strain on the telescoping pipes 361 and 362 and associated parts during the retractive stroke of the ram. Incidentally this feature may to some degree cushion stopping of the ram at the inner end of its path of movement.

The supply and circulation of the cooling medium for the gathering molds is obtained by means (Figs. 1, 2, 3—A, 36, 41 and 42) including a distributor head 386 encircling the standard 227 upon which the motor "M" (Fig. 1) is mounted. Water is supplied to the distributor head thru a feed pipe 387 (Figs. 1, 2, 36 and 41) communicating with a passageway 388 in the standard 227, said passageway extending downwardly and opening into an annular chamber 389. The annular chamber 389 (Figs. 41 and 42) communicates thru series of radial ports 390 with an annular groove or channel 391 in a ring 392 which encircles the standard 227 and is confined between upper and lower packing rings 393. This ring 392 is provided with a series of ports 394 and an exterior annular channel 395 corresponding to the channel 391 on its inner surface. These ports 390 and 394 and the channels 391 and 395 provide constant communication between the annular chamber 389 in the standard 227 and chambers 396 in arms 397 extending radially outward from the body portion 398 of the distributor 386. These arms 397 (Figs. 1, 2, 41 and 42) are provided with vertical ports 399 leading to extensible pipes 400, the latter pivoted at their inner ends to the arms 397 and connected at their outer ends to a pipe section 401 attached to a bracket 402 (Figs. 1, 3—A and 57), said pipe 401 and bracket 402 being supported on one of the ram carriages 240ª. A pipe 403 is secured at its upper end to the pipe section 401 and at its lower end to a flange 404 (Figs. 2 and 57) on the frame 268 which supports the ram reciprocating mechanism. A flow regulating valve 405 (Figs. 2, 3—A and 58) is arranged in the pipe 403. This valve includes a rotary disk 406 adapted to be adjusted relative to a port 407 (Fig. 58) to thereby change the effective area of the port. This is obtained by manual operation of a hand wheel 408 connected to the disk 406 thru a shaft 409.

The lower end of the pipe 403 opens into one end of the pipe 365 (Figs. 2 and 36) which extends inwardly and downwardly to the extensible delivery pipe 361 arranged beneath the ram 255. The discharge pipe 366 extends upwardly from the extensible discharge pipe 362 and is connected to a pipe 410 leading upwardly to a discharge pipe 411 (Figs. 1, 2, 36 and 57). This pipe 411 provides for the discharge of water into a circular channel 412 (Fig. 1, 2 and 41) in the cover 413 of the gear housing 229 the latter enclosing the speed reduction gearing thru which the motor drives the main shaft 208 and the dip cam 218. This channel 412 communicates thru a series of radial channels 414 (Fig. 41) with a discharge pipe 415 (Fig. 1) which conducts the water from the trough 414 to the upper end of the conduit 416 extending axially thru the hollow shaft 208 and opening just over a receptacle (not shown).

Neck forming and blank developing means

The neck or finish forming and blank developing means whereby the necks of the articles are completely formed and the blanks are partly developed prior to transfer to the finishing molds includes an annular series of spindles (Figs. 57, 58—A and 59 to 97 incl.). These spindles are arranged in a plane below the charge gathering molds 240 and rotate continuously and at a constant speed about a central pillar 204. The neck mold carriage "N" heretofore described as including upper and lower spiders 230 and 231 respectively connected by the mold or spindle frames 232, rotatably support said neck molds and spindles. These spindles in addition to performing the functions above described are inverted at regular time intervals and thereby operate as transfer devices whereby the blanks or parisons after proper development are transferred from the charge gathering molds to the finishing molds which are arranged in a plane below the series of spindles or neck molds. In order to form the neck or finish on a blank and attach it to a spindle, the latter is moved vertically upward to bring the neck mold 246 into contact with one of the gathering molds which has just obtained a charge of glass from the furnace 203 and has its open end facing downwardly. A portion of the glass is drawn downwardly into the neck cavity (Fig. 59) by exhausting air therefrom.

The means for exhausting air from each neck mold includes a valved opening 510 (Figs. 59, 60, 62 and 77) thru which air in the neck mold cavity is removed. The valve 511 in the opening 510 comprises a fixed sleeve 512 (Figs. 60 and 77) threaded in said opening and provided with a valve seat 513 at its inner end. A sleeve 514 is slidingly supported in said fixed sleeve 512 and carries a valve disk 515 which normally engages the seat 513 under pressure of a coil spring 516. Radial openings 517 adjacent the inner end of the sliding sleeve 514 and an external annular groove or channel 518 in the sliding sleeve 514 provide communication between the neck mold cavity and passageway 519 when the sleeve is moved inwardly against pressure of the spring 516. The sleeve 514 (Figs. 62 and 77) is of such length that it normally projects beyond the outer end of the fixed sleeve 512. Upward movement of the neck mold into contact with one of the gathering molds moves the sleeve 514 into register with a button 520 carried by the base 261 of the mold carriage 240ª. This button 520 (Figs. 60 and 62) is formed at the outer end of a sleeve 521 slidingly mounted in an opening 522. A packing gland 523 encircles the outer portion of the sleeve 521 and under tension of a coil spring 524 compresses a packing gasket 525 which is arranged between the inner end of the button 520 and said gland. The opening 522 (Figs. 31, 32 and 62) leads to a lateral passageway 526 which terminates in a downwardly directed port 527 adapted for register at times with an upwardly opening port 528 in the upper spider 230. This port 528 extends upwardly from a vacuum chamber 529 in said upper spider, said chamber communicating by way of a valved opening 530 with the passageway 332ᶜ in the lower part of the upper spider 230. This passageway 332ᶜ communicates thru a port 332ᵈ with the vacuum passageway 333 extending downwardly thru the neck mold frame 232. A valve 532 (Fig. 31) is arranged in the opening 530 so that a vacuum may be maintained at all times in the series of chambers and passageways up to a point in proximity to the neck mold. This valve 532 is of the same construction as the valve controlling the exhaust of air from the gathering mold and is adapted to be operated by a push rod 533 (Fig. 24) connected at its upper end to a bell crank lever 534 which is yieldingly held by a spring 535 in a position to space the push rod 533 out of contact with the valve 532. Cam controlled plungers 536 mounted in the cross bar 354 and moved inwardly at regular time intervals by a cam 537 (Fig. 97) on a stationary bracket 538 rock the lever 534 and project the push rod 533 downwardly to open the valve 532.

After initial formation of the blank or parison and attachment thereof to the spindle, the latter is inverted to position the blank for final expansion in a finishing mold 241.

During the inverting movement of the spindle, which movement constitutes swinging the mold about a horizontal axis extending radially of the neck mold carriage, puffs of air under pressure are introduced into the blank to further develop the same. The structure whereby further development of the blank in the open air is obtained is substantially as follows: Each of the spindles including the neck mold and the plunger carrier (Figs. 4, 58—A, 77 and 99) is mounted in a support 421 extending radially outward from one of the frames 232 and connected to the latter thru a disk or head 422 (Figs. 77 and 99) which is rotatably mounted in the frame 232. A tubular plunger carrier or rod 420 and shell or housing 431 are mounted for rotation and axial reciprocation in the support 421. The housing 431 and rod 420 are held against relative rotation by forming the upper portions of the rod 420 (Figs. 77 and 80) substantially rectangular in cross-section and slidingly fitting this portion in similarly shaped bearing sleeve 419 which is secured against rotation in the upper end of the housing 431. A neck mold holder 427 is provided at one end of the plunger carrier housing 431 (Figs. 62, 65 and 77) said holder having a slideway 426 in which the two sections of a partible neck mold thimble carrier 423 are slidingly mounted for movement toward and from each other. A two-part neck mold thimble 424 is carried by the sections of the carrier 423. Coil springs 425 connect the two sections of the carrier 423 and yieldingly hold them in contact with each other and close about a plunger 429 at times.

The plunger 429 is separably connected to the upper end of the plunger rod 420 and subject to axial movement with said rod within the chamber 430 (Fig. 77) to thereby position said plunger for cooperation with the neck mold thimble 424 at regular time intervals. An opening 420ª extending lengthwise thru the rod 420 and plunger 429 comprises part of the means permitting application of puffs of air under pressure internally of the blank for the purpose of partly developing the blanks prior to and during inversion of the spindles.

The plunger rod 420 and housing 431 therefor, are adapted to be rotated as a unit about an axis extending lengthwise of the rod for a short period of time prior to and during inversion of the neck mold in transferring a blank from the gathering mold 240 to the finishing mold 241. This assists in uniformly distributing the glass in the blanks or parisons prior to final blowing in the finishing molds. For this purpose the housing 431 is splined in a sleeve 433 which is rotatively carried by the support 421. A beveled gear 434 on the inner end of the sleeve 433 runs in mesh with a pinion 435 secured to the outer end of a horizontal shaft 436 extending radially of the neck mold carriage thru the centers of the disk 422 and frame 232. By rotating the shaft 436 rotary movement is imparted to the plunger rod 420 and housing 431.

Axial movement of the rod 420 and housing 431 as a unit is necessary in order to bring the neck mold alternately into contact with the charge gathering and finishing molds, after the former has been vertically aligned with said molds. To this end the housing 431 which extends downwardly thru the support 421 (Figs. 65 and 77) is journaled at its lower end in a cross-bar 437, the outer ends of which are connected thru yielding links 438 to the outer ends of a pair of levers 439 which are secured to opposite ends of a shaft 441, the latter journaled in bearings 440 on the support 421 for the neck mold carrier at a point just above the radial shaft 436. Any tendency of the cross-bar 437 to rotate with the housing 431 is overcome by a guide rod 442 (Fig. 77) extending downwardly from the support 421 and slidingly projecting thru a rearward extension 443 on the cross-bar. By rocking the lever 439 the spindle housing 431 may be moved axially in the support 421.

Axial movement of the rod 420 within the housing 431 in order to periodically project the plunger 429 into position for cooperation with the neck mold thimble 424 is obtained by the construction to be now described. The plunger rod 420 (Figs. 60, 62, 65 and 77) extends downwardly thru said cross-bar 437, and has its lower portion 444 reduced in diameter and partly enclosed in a sleeve 445 between the upper end of which and the main portion of the rod 420 is arranged a thrust bearing 446. The lower end of the rod 420 (Figs. 77 and 79) is supported in a thrust bearing 448 interposed between a retaining ring 449 and a cross-bar 450 arranged between said bearings and the sleeve 445. The opposite ends of this cross-bar 450 are connected thru yielding links 451 (Figs. 65, 67 and 79) to a pair of levers 452 keyed to opposite ends of a shaft 453 journaled in bearings 454 on the support 421. By rocking the levers 452 about the axis of the shaft 453 the plunger rod or carrier 420 may be moved lengthwise relative to the housing 431. By providing yielding connections between said levers and cross bars up and down movements of the housing and plunger are cushioned and an exceptionally effective seal between the plunger, neck mold and parts contacting therewith are obtainable.

In providing for rocking of the levers or arms 439, which axially reciprocate the housing 431 and rod 420, the bearings 440 (Figs. 62, 66 and 77) are spaced apart on the shaft 441 to permit placing a segmental gear 455 on the latter. This gear is keyed to the shaft and meshes with a rack bar 455ª which is slidingly supported on the upper half of the horizontal shaft 436 which axially rotates the neck mold 246. The rack bar 455ª is semi-circular in cross-section and provided with an extension (Figs. 59, 67 and 77) terminating in a circular head 456 having an outwardly opening channel 457 in its periphery. The head 456 is formed with a shaft opening 458 thru which the shaft 436 extends. A yoke 459 (Figs. 62, 63, 67 and 77) extends into the peripheral channel 457 and is carried by a slide block 460 mounted in a slideway 461. This slide 460 carries a cam roll 462 running in a stationary cam 463 (Fig. 118) which is shaped to reciprocate the slide block radially and thereby oscillate the shaft 441.

A segmental gear 464 (Figs. 4, 59, 62, 66, and 77) is keyed to the shaft 453 between the bearings 452 and runs in mesh with a rack bar 465 the latter having sliding contact with the lower half of the shaft 436 and formed with a longitudinal extension 466 which projects thru an opening in the aforementioned circular head 456 (Figs. 63, 64 and 77) and terminates in a collar or head 467 having an outwardly opening channel 468 in its periphery. This rack bar 465 is reciprocated axially to alternately raise and lower the levers 452 which control axial movement of the plunger rod 420 and plunger relative to the housing 431, such movement of the rack bar 465 being obtained by providing a yoke 469 which projects into the peripheral channel 468 in the collar 467 and is periodically reciprocated axially of the shaft 436. The yoke 469 is formed on a slideway 471 and carries a cam roll 472 running in a stationary cam 473 (Fig. 118), the latter shaped to reciprocate said block.

For the purpose of oscillating the neck mold unit or spindle about the axis of the shaft 436 (Figs. 59, 62, 66, 77 and 81 to 84 incl.) to thereby alternately position the neck mold 246 in vertical alignment with the blank and finishing molds, a gear 475 is formed on a collar 476 extending radially inward from the head 422 and runs in mesh with a quadrant rack 477 journaled on a horizontal shaft 478 extending rearwardly thru an opening in a downward extension 479 of the retaining ring 480 and fixed in an extension 479ª depending from the frame 232 or bracket which forms part of the neck mold carriage. The sleeve 481 (Figs. 81, 82, 83 and 84) upon which the quadrant rack 477 is mounted also carries a helical gear segment 482 which meshes with a rack bar 483 (Figs. 66, 81 and 83) on a slide 484 mounted for reciprocation radially of the neck mold carriage in a slideway 485. A hexagonal head 497 (Figs. 62 and 66) is formed on the outer end of the sleeve 493 so that a wrench or some other implement may be fitted thereon and manipulated to rotate the sleeve and thereby effect a change in the spaced relation between the rack bar 483 and the cam roll 486. A lock nut 498 on the threaded extension 494 secures the slide to the sleeve. This slide 484 carries a cam roll 486 running in a stationary cam 487 (Figs. 59, 62 and 118) formed on the lower side of the stationary table 488 which also supports the cams 463 and 473. This cam 487 (Figs. 60 and 118) is so shaped that it reciprocates the slide 484 at regular time intervals and thru the rack bar 483 and gear 482 oscillates the head 422 to thereby alternately invert and reinvert the neck mold 246 or spindle. The neck mold is positively locked in vertical alignment with the gathering and finishing molds in alternation by a locking pin 489 (Figs. 59, 77, and 81 to 84 incl.) carried by the yoke 459 and adapted to be reciprocated with the latter. The pin 489 extends thru an arcuate slot 490 in the body of the quadrant rack 477 and alternately extends into diametrically opposed openings 491 in the head 422 which are brought into register one at a time with an opening 492 in the frame 232 in which the head 422 is supported.

In order to correct any inaccuracy in the position of the neck molds relative to the gathering and finishing molds as regards vertical alignment thereof, the following structure is provided. The rack bar 483 is slidingly arranged in the slide 484 (Figs. 59, 62 and 70) so that the spaced relation between the rack bar and the cam roll 486 may be varied. A sleeve 493 (Fig. 59) extends lengthwise thru the rack bar and is formed with a threaded extension 494 adapted to be screwed into a threaded recess 495 in the slide 484. This threaded end or extension 494 is split transversely and as a result may be expanded by axial movement of the tapered screw 496 to thereby lock the sleeve 493 against accidental movement and secure the rack bar 483 in any adjusted position relative to the cam roll 486.

*Spindle rotation*

Rotation of the spindle and with it the neck mold 246 about its own axis while inverting to a position for cooperation with one of the finishing molds 241 is obtained by rotating the shaft 436 (Figs. 59, 66, 77, 93, 94, 95 and 96). This shaft carries a pinion 500 adjacent its inner end, running in mesh with a rack bar 501 during a portion of each revolution of the machine. The inner end portion of this shaft 436 is journaled in a bearing 502 formed on arms 503 extending radially inward from the corresponding neck mold or spindle frame 232. The rack bar 501 (Figs. 93, 94, 95 and 96) is mounted on the upper wall 504 of the gear housing 214 (Figs. 1, 4 and 59) and extends about the periphery of the gear housing between station "B" (Fig. 93) at which the gathering mold 240 opens, and the station "C" where the bare suspended blank is completely inverted and about to be enclosed in one of the finishing molds for final blowing.

The neck mold 246 is held against rotation during movement between stations "D" and "E" (Fig. 93) while the blank is enclosed in one of the finishing molds for final shaping. For this purpose a slide block 505 (Fig. 96) is secured to the inner end of the shaft 436 and slides in a channel 506 or slideway, one end of which terminates at station "D" (Fig. 93) spaced a short distance from one end of the rack bar 501. The fact that the slide block 505 enters said slideway 506 just as the pinion 500 moves beyond the end of the rack bar 501 insures against rotation of the shaft 436 between stations "D" and "E". Between stations "E" and "F" (Fig. 93) the neck mold 246 reinverts to the position shown in Fig. 62 preparatory to upward movement for cooperation with one of the gathering molds 240 in the formation of another blank or parison. During reinversion of the neck mold it is subjected to a complete revolution about its own axis with the result that at station "F" where the reinversion is complete, said mold is properly positioned for upward movement into engagement with one of the gathering molds. A part of this rotary movement is obtained by rotation of the gear 434 about the pinion 435 and the remainder by arranging a short rack bar 507 (Fig. 93) in proximity to the end of the slideway 506 and between the stations "E" and "F". After the neck mold 246 has been positioned as shown in Fig. 62 the pinion 500 moves circumferentially beyond the rack bar 507 and the slide block 505 enters another slideway 508 corresponding to the slideway 506 and positioned between the stations "F" and "B". Shortly after the slide block 505 enters the slideway 508 and immediately following completion of the charge gathering operation the neck mold 246 is moved axially upward (Figs. 58—A and 59) for contact with the open lower end of one of the gathering molds. This neck mold movement is obtained by outward sliding of the rack bar 455ª (Figs. 77 and 118) under influence of the cam 463 as pointed out heretofore. During this neck mold movement the levers 452 (Fig. 77) are swung upwardly to project the plunger 429 into the neck mold thimble to form the neck cavity and partly shape the finish or lip of the article being produced.

Each neck mold unit embodies means for introducing short puffs of air under low pressure internally of the blanks or parisons after completion of the neck forming operation and during inversion of the neck mold to position the blanks or parisons for final expansion in the finishing mold. The neck mold units also embody means for controlling application of air under high pressure internally of the blanks while in the finishing molds. The construction thru which these operations are accomplished is substantially as follows:

The neck mold and spindle support 421 (Figs. 77 and 85 to 92 incl.) includes a series of valved passageways thru which air under high and low pressure may be conducted to the flexible pipe 540 (Fig. 62) which leads to a conduit 540ª in an extension 450ª on the cross-bar 450 and thence to an annular channel 450ᵇ which communicates with the passageway extending upwardly thru the plunger rod 420 to the neck mold 246. Each neck mold frame 232 (Figs. 34, 85, 86, 137 and 138) is provided with a vertically extending chamber 541 opening thru the lower end of the frame and registering with a port 542 (Fig. 137) which provides communication between said chamber 541 and a chamber 543 in the lower spider top ring 231. The chamber 541 (Figs. 34, 35 and 85) leads upwardly to a valve 544 which is interposed between said chamber 541 and a chamber 545 in the upper portion of the frame 232. This valve 544 (Fig. 35) is adapted to reduce the pressure of air passing thru it so that the upper chamber 545 contains low pressure air while air under high pressure is contained within the lower chamber. The valve construction by which the air pressure is reduced includes a cap plate 546 having connected diametrically opposed ports 547 communicating with the lower and upper chambers 541 and 545 respectively. These ports communicate with each other thru a valve opening 548 in which a valve 549 is normally seated under the influence of high pressure air in the chamber 541. This valve 549 is fixed to the center of a diaphragm 550 whose marginal portions are secured between the cap 546 and the frame 232. On the side of the diaphragm opposite the valve 549, a valve adjusting device is arranged. This device consists of a coil spring 551 constantly bearing against the center of the diaphragm 550 and seated in a holder 552 which is adjustable by means of a screw 553 to vary the tension of the spring 551. By adjusting the screw 553 so that the spring 551 flexes the diaphragm 550 sufficiently to open the valve 549 in opposition to the air in the lower chamber 541, the air under high pressure passes thru the valve opening 548 into the upper, or low pressure air chamber 545. The area of the diaphragm 550 affected by the air under pressure in the upper chamber 545 is considerable greater than the area of the valve 549, with the result that the valve will close before pressure in the upper chamber 545 equals that in the lower chamber. The pressure differential may be regulated by adjusting the screw 553.

The high pressure air chamber 541 (Fig. 85)

communicates with a conduit 554 extending upwardly thru the frame 232 to a horizontal passageway 555 (Figs. 31, 84 and 85) leading to a port 556 opening into a circular channel 557 in the inner face of the head 422. At a point substantially diammetrically opposite the port 556 (Figs. 85 and 86) said circular channel 557 communcates with the high pressure conduit 558 (Figs. 85, 86 and 88 to 92 incl.) extending lengthwise of the support 421 to a lateral passageway leading to a valved chamber 560. A cam controlled valve 590 is arranged in the chamber 560. Another passageway 561 (Figs. 87, 91 and 92) leads upwardly from the valve 560 to a conduit 562 extending lengthwise of the support 421 parallel with and above the conduit 558, to a lateral port 563 which provides communication between the conduit 562 and flexible pipe 540 (Fig. 62) by which air under high pressure is conducted to the plunger rod 420.

A conduit 564 (Figs. 85 and 86) connects the low pressure chamber 545 and a circular channel 565 in the inner face of said head 422. This channel 565 communicates with a conduit 566 (Figs. 85 to 87 incl. and 91) extending lengthwise of the support 421 to a low pressure air control valve 567. A passageway 568 provides communication between the valve 567 and the conduit 562 (Figs. 86 and 88) which leads to the flexible pipe 540. A passageway 569 provides communication between the conduit 562 and a valved relief port 570 thru which both high and low pressure air may be exhausted at regular time intervals thru the conduit 562 to the atmosphere.

Each of the valves 590, 567 and 581 (Figs. 68 and 86) for controlling high and low pressure and exhaust of air thru the port 570 respectively includes a plug valve 571 normally resting upon a seat 572 under tension of a coil spring 573 which encircles a stem 574 carried by the valve. This stem is connected to a plunger 575 slidingly fitted in a housing 576. Inlet ports 577 in the side walls of the housing 576 lead to the annular opening defined by the seat 572 and normally closed by the valve 571. The plunger 575 normally extends outward beyond the housing 576 and occupies a position wherein it may be engaged by stationary cams 580, 582, 588 and 589 (Fig. 97). The relative positions of the cams may be substantially as shown in Fig. 97 wherein the cam 580 opens the valve 590 just after completion of the neck forming operation so that low pressure air is introduced into the neck mold to compact the glass in the gathering mold. Cams 582 (Fig. 97) in a plane above the cam 580 are spaced apart about a portion of the machine to periodically open the valve 567 and below short puffs of low pressure air internally of the blanks, which, during this operation, are exposed to the outside air. Between the cams 582 is a series of cams 588 which at proper time intervals open the relief valve 581 (Fig. 92) so that the puffs of low pressure air may escape to the atmosphere by the way of the port 570 and allow blanks to sag or contract slightly. This working of the glass simultaneously with rotation of the neck mold about its own axis develops and materially assists in uniform distribution in the articles of glassware being produced. A relatively long cam 589 is arranged at the final blowing station to open the lower or high pressure valve 590 to permit application of air under high pressure internally of the blanks or parisons after they have been enclosed in the finishing molds.

The vacuum chamber 333 and high pressure air chamber 541 in each neck mold frame 232 (Figs. 31, 33, 34, 85, 137 and 138) are in constant communication with a vacuum chamber 591 and a high pressure air chamber 543 respectively, in the top ring 592 of the lower spider 231. This lower spider 231 consists of top and bottom rings 592 and 593 respectively secured together and rotatable as a unit upon the lower spider support 211. Each vacuum chamber 591 (Figs. 33 and 137) opens upwardly thru a pair of ports 594 which provide communication between said chamber and the vacuum passageways 333 in the neck mold frame 232. It will be noted in Fig. 85 that in assembly, the vacuum chambers 333 are formed in adjacent portions of each pair of frames 232 and may therefore communicate directly with a single vacuum chamber 591 in the top ring 592 of the lower spider 231, said chamber lying directly beneath the dividing line between the frames. This condition also exists with regard to the air pressure chambers 541 and 545, is being noted in Fig. 85 that a single air pressure chamber 543 in the top ring 592 communicates thru upwardly directed ports 542 with two chambers or passageways 541 in abutting neck mold frames 232. The vacuum and air chambers 591 and 543 respectively in the top ring 592 are connected to vacuum and air pressure conduits 595 and 596 respectively extending radially inward to ports 598 and 597 communicating with vacuum and air pressure chambers 599 and 600 respectively in the bottom ring 593 of the lower spider 231.

This bottom ring 593 (Figs. 139 and 141) of the lower spider 231 is provided with a series of relatively long channels 601 extending circumferentially of the upper face of the ring and connecting the upper ends of the vacuum ports 598. Each channel 601 (Fig. 141) faces upwardly and is at all times in direct communication with one of the vacuum chambers 595 in the top ring 592 of the spider 231. These channels 601 form part of means for applying vacuum to the bottom plate of the finishing mold 241 and temporarily attaching finished articles of glassware to the latter as will be described hereinafter. The vacuum chambers 599 (Figs. 33, 139 and 141) in the bottom ring 593 which communicate with the channels 601 are connected thru vertical ports 602 with a circular channel 603 extending entirely around the lower face of the bottom ring 593. This channel 603 overlies an annular series of vertical ports 604 which lead downwardly to vacuum chambers 605 in the lower spider support 211. Each of these individual vacuum chambers 605 (Figs. 135 and 143) is in direct communication with an annular chamber 606 which in turn is connected to any suitable source of vacuum by way of the vertical passageway 607 (Figs. 135, 136 and 141) which extends downwardly thru the lower spider support 211, the lower section of the central pillar 204, and the base 175 of the machine. The annular chamber 606 (Figs. 33, 34, 134, 136 and 140) is formed in the upper portion of the lower spider support that an annular air chamber 608 may be positioned immediately below said vacuum chamber and entirely within the support 211. This air pressure chamber 608 (Figs. 34, 133 and 142) communicates thru radial ports 609 with a series of radially extending air chambers 610 whose outer ends open upwardly thru vertical ports 611 into a circular channel 612 formed in the lower face of the bottom ring 593, the latter communicating with the annular series of chambers 600 in said bottom ring 593 by way of a series of vertical ports 613. This construction provides for constant supply of air under pressure from any suitable source by way of a vertical passageway 614 extending upwardly thru the spider support 211 and the lower section 204 of the central pillar to said chambers.

The neck molds 246 (Figs. 4, 58—A, 59, 70 to 76 incl. and 99) are open for a short period of time just after completion of the final blowing operation and just prior to reinversion to an upright position preparatory to cooperation with one of the gathering molds 240, in initial formation of a blank or parison. For the purpose of opening the neck mold arms 626 or bars are adapted to engage fingers 633 on the neck mold carrier sections and then move away from each other thereby separating the mold sections. The mechanism by which the arms 626 are moved toward and from each other includes a slide 615 movable in a slideway 616 extending radially of the top ring 592 of the lower spider 231. This slide 615 is provided at its inner end with an upwardly stepped portion 615$^a$ (Figs. 70 and 74) including a rack bar 617 extending horizontally inward from the slide and running in mesh with a pinion 618 mounted on a shaft 619 extending transversely of a slide 620. This slide 620 is mounted in an inwardly extended portion of the slideway 485 and carries a cam roll 621 on its upper side running in a stationary cam 622. A stationary rack bar 623 is slidingly fitted in a guideway 624 extending lengthwise of the upper face of the slide 620 and meshes with the pinion 618. The inner end of the rack bar 623 is connected to a plate 625 which in turn is secured to the lower spider 231 of the neck mold carriage.

The arms or bars 626 are pivoted at their inner ends to the slide 615 to links 627 and at an intermediate point to curved arms 628. The bars 626 are formed with lateral fingers 629 which are adapted to engage stationary rollers 630 at a predetermined point in the path of movement of said fingers to thereby limit the lengthwise movement of said bars 626. These rollers 630 also limit inward movement of the parallel bars 626 toward each other under influence of the coil springs 631. The outer ends of the parallel bars 626 are formed with short fingers 632 which take over fingers 633 on the neck mold 246 preparatory to opening the latter. These fingers 633 are of sufficient length to allow considerable relative vertical movement between the arms and neck mold without disengaging the fingers 632 and 633. This is necessary in that the neck molds are subject to certain degrees of vertical movement to position them for cooperation with the blank and finishing molds.

Forward movement of the slide 620 (Fig. 74) and pinion 618 therewith imparts rotary movement to said pinion in a clockwise direction with the result that the slide 615 and parallel bars 626 connected thereto are projected radially outward as a unit causing engagement between the fingers 632 and 633. Engagement between the fingers 629 and rollers 630 prevents continuation of the projecting movement of the bars 626. The slide 615 continues its outward movement with the result that the parallel bars 626 are moved horizontally away from each other and thereby separate the sections of the neck mold in opposition to the closing influence of the coil springs 425. The neck mold is now moved upwardly a short distance by means of the lever 439 (Figs. 58—A and 77) to clear the finishing mold 241 preparatory to reinversion of the neck mold to the position shown in Fig. 62. Just before the reinverting movement begins, the slide 615 is moved radially inward to the position shown in Fig. 73 and thereby retracts the parallel bars 626, clearing the path to be followed by the neck mold while reinverting.

For the purpose of properly positioning the neck mold 246 to insure engagement between fingers 632 and 633 (Figs. 58—A, 72, 73 and 76) a centering block 634 is mounted in slideways 635 and slidingly connected to the upper face of the slide 615 (Fig. 72) and is movable outwardly a predetermined distance with said slide. This centering block (Fig. 73) is provided at its outer end with a vertical recess 636 in which a cam roll 637 on the neck mold holder 427 seats preparatory to engagement between the fingers 632 and 633. Inclined walls 638 (Fig. 73) lead to the recess 636, and if necessary, will serve to direct the roller 637 into the recess. The centering block (Figs. 70, 72, 74 and 75) is connected thru a pin 639 to the slide 615. This pin extends vertically thru an opening 640 in the inner end of said centering block and has its lower end projecting into a slideway 641. The pin 639 projects upwardly into a channel 642 extending lengthwise of the lower face of the slide 484 (Figs. 59 and 72), said slide forming part of the mechanism for inverting and reinverting the neck mold 246, heretofore described. At the forward end of the channel 642 (Figs. 70, 72 and 73) a vertical opening 643 is formed so that when the pin 639 reaches said end during projection of the centering block it (the pin) may move upwardly and thereby securely lock said centering block 634 against further outward movement. Upward movement of the centering pin into the opening 643 is obtained by providing opposed fingers 644 adjacent the lower end of the pin 639, said fingers normally occupying a position in a pair of inclined notches 645 adjacent the outer end of the walls of the slideway 641. When the pin moves outwardly with the centering block 634 it strikes the outer end wall of the channel 642. Immediately the inclined lower walls of the notches 645 cause upward movement of the pin to a position (Figs. 59 and 72) in which the opposed fingers 644 rest upon the upper surfaces 646 of the side walls of the slideway 641. The slide 615 continues its forward movement with the result that the parallel bars 626 may be projected independently of the centering block 634 to a position in which the fingers 632 and 633 are interengaged as shown in Figs. 69 and 70.

During a portion of each revolution of a charge gathering mold 240 its movement is synchronized with that of the neck mold carriage so that said gathering mold and one of the neck molds 246 may cooperate in forming a blank or parison (Figs. 44, 47 and 118). This cynchronized movement is obtained by locking the gathering mold carriage 240$^a$ in a predetermined position upon the neck mold carriage, wherein the gathering mold and one of the neck molds are in vertical alignment. The locking means also insures alignment of the molds. The mechanism (Figs. 55, 59, 62 and 99) whereby the above results may be obtained comprises a centering pin 650 of which there is an annular series corresponding in number to that of the neck molds, mounted for vertical movement in the upper spider 230 of the neck mold carriage. Each centering pin 650 is arranged directly above and in vertical alignment with the center of one of the shafts 436 (Fig. 99) and may be reciprocated vertically in an opening 651 in said upper spider. The upper end of the centering pin 650 is tapered and adapted to project into a recess 652 formed in the downwardly stepped portion 261 of the base of the mold carriage 240ª. This downwardly opening recess 652 is centrally positioned in the mold carriage base so that when the centering pin is completely projected into the recess alignment of the gathering mold and one of the neck molds will be assured. Vertical movement of the centering pin 650 is obtained by means of a stationary continuous cam 653 (Figs. 4, 51, 56, 59, 62, 99 and 119) in which a cam roll 654 carried by the pin 650 runs. This cam 653 is so shaped that it moves the centering pin 650 upwardly at point "K" just prior to arrival at the charge gathering station, such position of the pin being maintained until arrival at point "L" where preliminary formation of the blank or parison is complete. Thus the two molds are held in register with each other during the period of time they cooperate in initial shaping of the glass.

*Finishing mold units*

The partly developed blanks or parisons are expanded to their final shape in finishing molds 241 (Figs. 98 and 99) which are arranged below the neck mold carriage. These finishing molds 241 close about the partly expanded blanks after the latter have been swung downwardly to a pendant position due to inversion of the neck molds. In the illustrated embodiment of the machine there are four finishing mold units arranged to rotate at variable speeds about the central pillar 204 in a horizontal plane just below the neck mold carriage "N". Each finishing mold unit (Figs. 99 and 101) includes a radially extending carriage 655 secured to a trailer ring 656 encircling the lower portion of the central pillar 204 about which said ring and carriage are free to rotate. A pair of upper and lower arms 657 and 658 respectively extend radially outward from the base 659 of the carriage 655 and support a vertical hinge pin 660 upon which the finishing mold arms 661 are pivoted. The finishing mold sections 662 (Figs. 100 and 100ª) are connected to the mold arms 661 and adapted to be moved toward and from each other in alternation by cam controlled mechanism mounted upon the carriage 655. This mechanism includes a slide 663 (Figs. 99, 100, 100ª, 101 and 110) mounted in a horizontal slideway 666 in the upper side of the mold carriage base. This slide 663 carries a cam roll 664 running in a stationary cam 665 (Figs. 99 and 120) extending entirely around the central pillar 204 on the lower side of the lower spider support 211. A clevis 667 (Figs. 99, 101 and 111) is mounted on a second slide 668 which is connected by a rod and spring 669 and 670 respectively to the other slide 663 in the slideway 666. This clevis 667 is connected thru fingers 671 (Figs. 101 and 110) and yielding links 672 to the mold arms 661. When the finishing mold is completely closed the parting line should be coincident with a radial center line extending thru the vertical axes of the machine and mold. To insure such positioning of the mold a centering block 673 is mounted on a vertical hinge pin 674 carried by the clevis 667, said block adapted for projection after closing of the mold into engagement with adjacent faces of a pair of tapered bars 676 mounted on the mold arms adjacent the hinge pin 660. The centering block 673 when projected radially outward engages the inclined faces 676ª of the bars and causes movement of the mold arms 661 about the axis of the mold in the event the parting line of the mold is not properly positioned.

The bottom plate 677 (Figs. 108, 101 and 110) for each finishing mold 241 is supported in a holder 678 which extends vertically upward from a horizontal arm 679 or bracket connected to the lower portion of the mold hinge pin 660. Means to exhaust air from the mold 241 simultaneously with expansion of a parison therein includes an axial opening 680 in the bottom plate 677 and holder 678 therefor, said opening leading to vacuum slots 681 or grooves in the upper face of the bottom plate. A flexible pipe 682 connects the lower end of said opening 680 and an axial opening 683 extending thru said hinge pin, the latter opening 683 communicating at times with the vacuum chamber 599 (Figs. 139 and 141) in the bottom ring 593 of the lower spider. The flexible pipe 682 which connects the axial openings 683 and 680 in the mold hinge pin 660 and the bottom plate and holder for the latter, leads directly to a cam controlled valve 684 mounted on the hinge pin. This valve 684 (Figs. 99, 101, 106, 107 and 108) comprises a housing 685 in which the valve disk 686 is arranged, said disk being positioned between a port 687 leading to the passageway 683 in the mold hinge pin 660 and the adjacent end of the flexible pipe 682. A coil spring 688 normally seats the valve disk and shuts off communication between said pipe 682 and port 687. The valve stem 689 extends outwardly thru and beyond a guide 690. Means to open the valve at regular time intervals includes a sleeve 691 telescoped over said guide and contacting with the extended end of the valve stem 689. This sleeve carries a cam roll 692 adapted to be engaged at times by a stationary cam 693 secured to the base 175 of the machine and extending inwardly over the circular trough.

The upper end of the opening 683 extending thru the mold hinge pin 660 leads to a series of communicating conduits 694 in the arm 657 at the upper end of the mold carriage 655, said passageways in turn leading to an arcuate channel 695 formed in the lower face of said arm. This channel 695 is at all times in register with at least one of an annular series of upwardly opening ports 696 (Figs. 99, 105 and 108) each leading downwardly to a horizontal passageway 697 extending radially inward thru the bottom ring 593 of the lower spider 231 to valved ports 697ª opening into the vacuum chambers 601. Valves 698 are interposed between said horizontal passageways 697 and the vacuum chambers 601 in said bottom ring 593. Each valve includes an upwardly extending stem 699 whose upper end projects into an annular groove 700 in a plunger 701 extending horizontally of the bottom ring 593 with its outer end projecting beyond the periphery thereof. This annular groove 700 has at least one wall 702 tapered to provide a cam surface, which during sliding movement of the plunger, under influence of a cam 703 on the arm 657 engages the upper end of the valve stem 699 and moves the latter downwardly to thereby open the valve 698 and permit exhaust of air from the finishing mold. The plunger is normally positioned by means of a spring 704 to allow the valve to close under influence of a spring 705.

*Cooling finishing molds*

The temperature of each finishing mold 241 (Figs. 99, 100, 140 and 155) is maintained at the proper degree by constantly circulating a cooling medium such as water thru chambers 706 in the mold sections. The construction providing for supply of cooling water to the chambers 706 includes a vertical opening 707 in one of the trailer rings 656 said opening leading to annular grooves 708 in the upper and lower faces of the ring. These grooves 708 and the opening 707 communicate with the water compartment 709 in the lower spider support 211, said compartment connected to a conduit 710 in the central column. A pipe 711 communicates with each opening 707 in the trailer ring by way of a radial port 712 in the latter and leads radially outward to a valve box 713 carried by the bottom plate holder 679. This valve box (Figs. 99, 101, 102 and 108) carries a T-pipe connection 714 on its upper side. From this connection a pair of pipes 715 lead to the chambers 706 (Figs. 100 and 100—A) in the finishing mold sections. Overflow pipes 716 are connected to the upper ends of the chambers and extend downwardly to a position in which they may discharge water into a cup 717 carried by the bottom plate holder 679, said cup having a drain outlet 718 through which the water or other cooling medium is discharged into the circular trough 199 in the upper side of the base 175. The valve box 713 (Fig. 99) encloses a valve disk 719 provided with a port 720 adapted to be brought into register with a port 721 in the valve stem guide 722. The port 721 in the guide leads to an annular groove 723 which is at all times in communication with said T-pipe connection. The valve disk is carried by a rotary stem 724, to the outer end of which is fixed a hand wheel 725. By rotating the hand wheel, the effective area of the aligned ports in the valve disk 719 and stem guide 722 may be varied to thereby regulate the rate of flow and volume of water entering the water chambers 706 of the finishing mold sections.

During a portion of each revolution of a finishing mold 241 (Figs. 98 and 99) its speed of travel is synchronized with that of the neck mold carriage so that the finishing mold and one of the neck molds 246 may cooperate in final expansion of a blank or parison. These molds must be accurately aligned during the final expansion of the blanks in order to insure formation of quality ware. Means to insure perfect alignment of the molds includes an annular series of centering pins 726 (Figs. 99, 103, 104 and 105) individual to the spindles or neck molds 246 and mounted upon the bottom ring 593 of the lower spider 231. Each centering pin is mounted in a radially extending slideway 727 on the lower side of the bottom ring 593 and is adapted to project into a recess 728 formed in a block 729 secured to the upper arm 657 of the finishing mold carriage 655. This centering pin 726 is reciprocated at regular time intervals by means including a cam roll 730 and a stationary cam 731 extending about and mounted upon the lower spider support 211.

The charge gathering and finishing mold carriages 240ª and 655 respectively (Figs. 1, 4, 44 to 58—A, 98, 99, 101, 113, 118 and 120) are moved at a considerably higher rate of speed than the neck mold carriage "N" during a portion of each cycle of operations. Acceleration of the speed of travel of the charge gathering and finishing mold carriages during a portion of each revolution thereof is obtained by securing them to high speed disks 242 and 252 respectively, which, as previously stated, are subject to continuous rotation at a constant speed approximately twelve times that of the neck mold carriage "N". Similar mechanisms are employed in accelerating the speed of travel of the gathering and finishing molds. Accordingly, the detailed description will be limited to one mechanism wherever the structure employed is common to the mechanisms for accelerating the speed of movement of both the gathering and finishing molds. A slide 735 (Figs. 54, 55 and 99) is mounted for radial movement in a slideway 736 formed in the high speed disks 242 and 252. A vertically extending pin 737 is mounted in the outer end portion of said slide and carries upper and lower cam rolls 738 and 739 respectively. A coil spring 740 exerts an inward pull on the slide, tending to hold the latter at its innermost position. A cam 741 (Figs. 54, 55, 56 and 99) is rigidly secured to the base of each mold carriage, said cam being substantially V-shaped in plan and opening downwardly. The peak 742 or apex of the cam 741 is disposed radially outward from the remaining portion of the cam.

Stationary cams 743 and 748 are arranged below the slides 735 for the gathering and finishing molds, respectively, and as will be apparent presently, operate to secure the slides 735 and cams 741 together during the period of accelerated movement of the mold carriages. The stationary cam 743 (Figs. 45, 47, 48 and 50) which forms part of the means to accelerate the gathering mold, opens upwardly and extends in uniform spaced relation to and about the axis of the machine between the points H and I (Figs. 45, 47 and 50). That portion of the cam between said points H and I in a clockwise direction is spaced from the axis of the machine the same distance as the apex or peak of the cam 741 secured to the mold carriage. Thus, during movement of the gathering mold carriage 240ª over that portion of the cam lying between the points H and I, these cams 741 and 743 are in vertical alignment and the cam roll 738 is held in the peak of the cam 741. A portion 751 of the inner wall of the stationary cam 743 (Figs. 47, 48 and 50) extends about a relatively short radius between the points J and K in a clockwise direction, this portion 751 being connected to the main portion of the cam through sections 752 formed on a radius still shorter than that of the section 751. The outer wall of the cam 743 is cut away between stations J and K as shown in Fig. 50.

While the gathering mold carriage 240ª occupies a position between the points J and K in a clockwise direction, it is secured to the neck mold carriage "N" and is moving at a relatively slow speed in synchronism with said carriage "N". The high speed disk 242 and slide 735 carried thereby are rotating at approximately twelve times the speed of the neck mold carriage "N" and, therefore, move past the mold carriage several times while the latter is moving between points J and K with the neck mold carriage. Each time the slide passes beneath the mold carriage it (the slide) is reciprocated radially independently of the carriage due to the travel of the upper cam roll 738 (Figs. 54 and 55) through the V-shaped cam 741 on the bottom of the mold carriage. Such radial reciprocation of the slide between points J and K so as not to interfere with decelerated speed of travel of the charge gathering molds is possible due to the absence of an outer wall of the stationary cam 743 between said points J and K. When the mold carriage 240ª arrives at the point K (Figs. 45 and 47) the rear end wall of the cam 741 occupies a position coincident with a line drawn from K to L (Figs. 45 and 50). The upper cam roll 738 on the slide immediately enters the cam 741 as heretofore, but due to movement of the latter and its position over the cam 752 between the points K and H, the cam roll 738, peak 742 of the cam 741 and the main portion of the stationary cam 743 are vertically aligned at point H where the speed of the mold carriage is completely accelerated so that it moves in synchronism with the high speed disk 242. The mold carriage continues such high speed movement until it arrives at the point I. Between the points I and J the speed of travel of the mold carriage 240ª is decelerated until it again moves in synchronism with the neck mold carriage "N". This is obtained by engagement of the cam roll with the inwardly curved portion 752 of the inner wall of the stationary cam 743 lying between points I and J. Between the points I and J the slide 735 is moved radially inward so that the upper cam roll 738 moves along the forward section 741ª (Fig. 54) of the cam 741 and gradually reduces the speed of travel of the latter, a speed corresponding to that of the neck mold carriage. The centering pin 650 (Fig. 55) moves upwardly substantially at point J (Figs. 47, 49 and 51) to lock the neck mold carriage "N" and gathering mold carriage 240ª together for synchronized movement to approximately the point K at which the centering pin 650 is retracted. The centering pin is lowered substantially at point K and the speed of the gathering mold carriage is then accelerated as above described. The finishing mold carriages 655 are connected to the neck mold carriage for synchronized movement therewith by means of a centering pin 726 (Figs. 103, 104 and 105). Synchronized movement of the charge gathering and neck molds 240 and 246, respectively, takes place during the charge gathering operation and preliminary formation of the blanks, whereas the movement of the neck molds 246 and finishing molds 241 are synchronized only during the final expansion of the blanks at a point substantially diametrically opposite that portion of the cam 743 lying between points J and K (Figs. 47 and 50). The cam 748 (Figs. 1, 115 and 116) which in part controls acceleration of the speed of travel of the finishing molds 241 is identical in shape to the cam 743. The open side of the cam 748 is diametrically opposite the corresponding portion of the cam 743 and provides for a decelerated speed of travel by the finishing molds between points M and O (Figs. 115 and 116) in a clockwise direction and high speed travel between points P and R.

Machine lubrication

Lubrication of the machine is obtained by forcing oil through a series of pipes leading to the various mechanisms. A receptacle 755 (Figs. 154 and 155) is mounted on the lower side of the base 175 of the machine and adapted to contain a supply of oil which is delivered to the bearing surfaces to be lubricated. An outlet pipe 756 extends from the bottom of the receptacle to a force pump 757 which is driven through gears 758 and 247 by the main drive shaft 208. A pipe 759 leads from the pump 757 to a manifold 760 which in turn is connected through sight feed gauges 761 to a series of pipes 762 which extend upwardly through the central pillar 204 to points from which the oil may flow by gravity to the surfaces to be lubricated. With respect to the lubrication of the bearing surfaces between the lower spider support 211 and the bottom ring 593 of the lower spider 231, the spider support 211 (Figs. 99 and 155) is formed with a chamber 763 into which one of the pipes 762 opens. A series of rollers 764 are arranged in openings formed in the upper wall of the chamber 763, and contact with the lower face of the bottom ring 593. These rollers are rotated due to movement of the ring 593 over the support 211. These rollers, due to rotation thereof, carry oil from the chamber 763 to the bearing surfaces of the bottom ring 593 which in turn distributes the lubricant over the entire bearing surfaces of the ring 593 and lower spider support 211. A return passageway 765 extends vertically through the central pillar 204 and provides for the return of excess oil to the receptacle 755.

The successive steps in each cycle of operations necessary to produce an article of glassware on the machine, are as follows:

A gathering mold 240 upon reaching the gathering station G and having its speed of travel decelerated so that it moves in synchronism with the neck mold carriage "N" is secured against circumferential movement relative to the neck mold carriage by the centering pin 650 which is projected upwardly by the cam 653 as shown in Figs. 2 and 4.

The dip cam 285 (Figs. 2, 4, 52 and 118) which is rotating continuously at a high constant speed, moves the dip slide 282 radially inward and through the rack and gear mechanism interposed between the slide and ram 255 projects the latter radially outward along an inclined path to a charge gathering position in the furnace 203. As the ram moves radially outward, the bar 325 which forms part of the cutoff operating mechanism is moved lengthwise and upwardly and operates through the rack 320, pinion 319 and rock shaft 317 to swing the cutoff 315 laterally into register with the lower end of the charge gathering mold 240. When the mold is fully projected, the cutoff 315 forms a seal between the lower end of the gathering mold and the surface of the glass in the furnace 203. The ports 336 and 338 (Figs. 14, 15 and 16) in the ram carriage and ram, respectively, are brought into register with each other upon completion of the projecting movement of the ram so that air may be exhausted from the gathering mold 240 and replaced by a mold charge of molten glass which enters the mold cavity by way of the opening 318 in the cutoff. The duration of the period of exhaust of air from the gathering mold is determined by the length of the cam 357 (Figs. 12, 25, 26 and 97), which through the bell crank 348 and push rod 347 opens the valve 343, the latter arranged in a vacuum chamber 332 in the upper spider 230. After the mold cavity has been completely filled with glass, the ram begins its retractive movement due to continuous rotation of the dip cam 285. At the same time, the mold 240 and cutoff knife 315 are lifted above the surface of the glass in the furnace 203. During retractive movement of the ram and prior to arrival of the mold at the rim of the furnace (Fig. 2), the inclined portion 328 of the bar 325 is moved into contact with the sleeve 273, and due to continuous inward movement of the ram said bar 325 is projected forwardly to the position shown in Figs. 4 and 19, resulting in lateral movement of the cutoff across the lower end of the gathering mold. This operation severs the excess glass from the lower end of the mold charge. The vacuum control valve 343 may be closed at any time following completion of the charge gathering operation. When the gathering mold 240 is fully retracted (Fig. 62) it occupies a position in vertical alignment with one of the neck molds 246. At this particular time the neck mold is spaced a short distance below the gathering mold.

Upward movement of the neck mold into contact with the open lower end of the gathering mold (Figs. 4, 59 and 77) is obtained by upward swinging of the levers 439. The plunger 429 moves with the neck mold 246 and after the neck mold has sealed against the lower side of the gathering mold 240, continues its upward movement independently of the mold to form a neck or finish cavity and displace a portion of the glass in the gathering mold. This displaced glass enters said neck cavity. When the neck mold or spindle moves upwardly into engagement with the gathering mold, the valve 511 (Figs. 59, 60 and 62) is automatically opened, and a valve 532 (Figs. 31 and 32) is opened by means of the push rod 533, the latter valve being arranged in the vacuum chamber 529. Such opening of these valves permits exhaust of air from the neck cavity and insures complete filling of the latter with molten glass. Thus, the blank is shaped substantially as shown in Fig. 125, wherein it will be noted the upper surface of the blank has been drawn away slightly from the upper wall of the mold cavity. A short puff of air under low pressure is applied through the plunger 429 to expand the blank to the shape of the mold cavity as shown in Fig. 126. This is accomplished by means of a cam 580 (Fig. 97) which opens the valve 567 (Figs. 59, 62 and 92).

The gathering mold 240 is now opened by the cam 308 (Figs. 2, 4, 44 and 118) and upon being completely opened is secured to the high speed disk 242 which quickly carries it to the point I (Figs. 45, 50 and 118).

A series of short puffs of air under low pressure is applied to the interior of the blank through the plunger 429 to give preliminary shape to the blank and even distribution of the glass therein. This is controlled by the cams 582 and 588 (Fig. 97) which alternately open the valves 567 and 581, the latter operating to relieve internal pressure from the blank or parison which at this stage of development is almost entirely exposed to the outside air. During this application of air under low pressure internally of the blank, the spindle or neck mold is rotating about its own axis and inverting about the axis of the shaft 436 (Figs. 4 and 77) to position said blank as shown in Fig. 99. Rotation of the blank about the axis of the spindle is obtained by rotating the shaft 436 (Fig. 59). Inversion of the spindle to position the blank as shown in Fig. 99 is obtained by moving the rack bar 483 radially outward, said rack bar being so moved by the cam 487 (Figs. 4, 74 and 118) as described heretofore.

When the neck mold 246 is completely inverted (Figs. 99, 129 and 130) the plunger 429 is moved upwardly out of contact with the neck or the blank, and the finishing mold 241 is closed about the lower portion of the blank. The cam 665 (Fig. 99) controls opening and closing of the finishing mold. At this point the neck mold 246 with the blank suspended therefrom is moved vertically downward from the position shown in Fig. 130 to the position shown in Fig. 131 so that the neck and finishing molds are brought together preparatory to final expansion of the blank. This downward movement of the neck mold is obtained by swinging the lever 439 (Fig. 99) downwardly about the axis of the shaft 441. Air under high pressure is now applied through the plunger internally of the blank in the finishing molds by opening the valve 590. A cam 589 (Fig. 97) holds the valve 590 open a period of time whose length is determined by the type of ware being produced.

When the blank has been completely expanded in the finishing mold, the neck mold 246 is opened to release the upper end of the finished article so that the finishing mold 241 may be quickly moved about the axis of the machine past a discharge or ware ejecting station "S" to a position where it will enclose another blank which is to be expanded. The neck mold 246 is opened by the arms 626 (Fig. 73), as previously described, and while open is moved vertically upward, approximately at station "T" (Fig. 118) until it clears the upper end of the finishing mold a sufficient distance to permit reinversion of said mold to the position shown in Fig. 77 wherein its upper end is in a plane a short distance below the retracted position of the gathering mold 240.

The finishing mold 241 opens during its movement between stations (Figs. 98 and 120) and accordingly the finished article may be removed from the mold approximately at station "S" (Fig. 118). As previously described, the article is held in position upon the bottom plate of the finishing mold by vacuum and may be removed from the bottom plate only after the application of vacuum has been discontinued. The point at which the cam 693 (Fig. 99) terminates, determines the point of discharge of the finished articles.

In Fig. 41 is illustrated the manner in which the distributor head 386 and pipes 400 for supplying cooling water to the gathering mold move about the vertical axis of the machine. Each of a predetermined number of the arms 397 is connected to a gathering mold unit through a telescopic pipe 400 and through such connection said unit imparts rotary movement to the distributor head 386 during a part of each period of accelerated movement of the gathering units. Thus the head is rotated in a step-by-step fashion.

In another form of cutoff mechanism (Figs. 157 to 160 inclusive) provision is made to prevent excessive heating of the knife or cutoff ring and supporting arm therefor. The structure comprises a closed passageway 770 in the frame supporting the cutoff ring 771 communicating with delivery and return conduits 772 and 773 in the cutoff arm 774. The delivery conduit 772 communicates with a passageway 775 extending lengthwise of the rock shaft 776 which supports the cutoff knife and arm. A passageway 777 in the supporting sleeve 778 communicates at one end with the conduit 775 and at its other end with a pipe 779 which leads to the distributor head 367$^a$ through which cooling water flows to and from the gathering mold. The return conduit 773 leads to a conduit 780 extending upwardly through the rock shaft 776 to the upper end of a passageway 781 in said supporting sleeve 778, the latter passageway connected to a pipe 782 leading to the return passageway in the distributor head 367$^a$.

The construction above set forth provides for continuous circulation of cooling water through the cutoff knife or ring and through the arm which supports the knife. The temperature of the elements is thereby maintained at such a point that warping of the knife and arm is prevented and the detrimental effects of an excessively heated cutoff knife on the gathered glass are avoided.

Modifications may be resorted to within the spirit and scope of the appended claims.

What I claim is:

1. In a glassware forming machine, the combination of an annular series of neck molds rotating at a constant speed about a vertical axis, a group of partible body blank molds less in number than and arranged above the neck molds movable past a charge gathering zone, means to move the body blank molds past the charge gathering zone and a predetermined distance there beyond at the same speed as the neck molds, means to deliver mold charges to the blank molds in said zone, means to transfer the mold charges from the body blank molds to the neck molds while said molds travel through said predetermined distance, and means to then accelerate the speed of movement of the body blank molds one at a time relative to the neck molds to thereby quickly return them to a position adjacent and in advance of the charge gathering zone after said transfer of the glass to the neck molds.

2. In a glassware forming machine, the combination of a stationary central pillar, a continuously rotating drive shaft extending through the pillar, an annular series of neck molds rotatable about the pillar and driven at a constant speed by the shaft, a group of body blank molds arranged above and less in number than the neck molds and rotatable about said pillar, a group of finishing molds arranged below the neck molds and rotatable about the pillar, and means operatively connected to the drive shaft and actuated thereby to move the body blank and finishing molds at higher speeds than that of the neck molds during a major portion of each cycle of operations.

3. In a glassware forming machine, the combination of a stationary central pillar, a continuously rotating drive shaft extending through the pillar, an annular series of neck molds rotatable about the pillar and operatively connected to and driven at a constant speed by the shaft, a group of body blank molds arranged above and less in number than the neck molds and rotatable about said pillar, a group of finishing molds arranged below and less in number than the neck molds and rotatable about the pillar, means whereby the body blank and finishing molds are rotated as a unit with the neck molds at regular time intervals, and means operated by rotation of the drive shaft to alternately accelerate and decelerate the speed of movement of the body blank and finishing molds at regular time intervals.

4. In a glassware forming machine, the combination of an annular series of neck molds rotatable about a vertical axis, means to rotate said molds at a constant speed, a group of body blank molds above the neck molds, said group comprising a lesser number of body blank molds than neck molds, means to secure pairs of body blank and neck molds together during movement through a predetermined portion of their path of rotation, a member constantly rotating about said vertical axis at a higher speed than the neck molds, and means to connect the body blank molds one at a time to said member at regular time intervals to thereby accelerate the speed of travel of the body blank molds.

5. In a glassware forming machine, the combination of a stationary central pillar, a constantly rotating drive shaft extending lengthwise through the pillar, an annular series of neck molds rotatably supported on the pillar, a group of body blank molds arranged above and less in number than the neck molds, a group of finishing molds arranged below and less in number than the neck molds, driving connection between said shaft and neck molds whereby the latter are rotated at a constant speed, means to connect certain of the blank and finishing molds to certain of the neck molds during a portion of each cycle of operations, and means actuated by rotation of the shaft to accelerate the speed of movement of the blank and finishing molds at regular time intervals and for a major portion of each cycle of operations.

6. In a glassware forming machine, the combination of a stationary central pillar, a constantly rotating drive shaft extending lengthwise through the pillar, an annular series of neck molds rotatably supported on the pillar, a group of body blank molds arranged above and less in number than the neck molds, a group of finishing molds arranged below and less in number than the neck molds, driving connection between said shaft and neck molds whereby the latter are rotated at a constant speed, means to connect certain of the blank and finishing molds to certain of the neck molds during a portion of each cycle of operations, rotatable members individual to and below the groups of body blank and finishing molds, means interconnecting said members and the drive shaft for constantly rotating said members at a higher speed than that of the neck molds, and means operating at regular time intervals to connect the blank and finishing molds one at a time with corresponding rotatable members to thereby effect acceleration of the speed of travel of blank and finishing molds.

7. In a glassware forming machine, the combination of a stationary central pillar, a constantly rotating shaft therein, a group of body blank molds rotatably mounted on said pillar, a high speed ring below said blank molds, driving connection between said ring and shaft for constantly rotating the ring at a relatively high speed, means to connect the blank molds one at a time to said high speed ring during a major portion of each cycle of operations to thereby move the blank molds at a relatively high rate of speed, a neck mold carriage rotatably supported on the pillar below said high speed ring, neck molds greater in number than the body blank molds and mounted on the carriage, connection between said carriage and shaft whereby the former is rotated at a constant speed lower than that of the high speed ring, means operating at regular time intervals to connect the body blank molds to the neck mold carriage to thereby synchronize the rotary speeds of one of the blank molds and the neck molds, a group of finishing molds corresponding in number to the body blank molds and arranged below the neck molds, said neck molds adapted to transfer blanks from the body blank molds to the finishing molds, and means to invert the neck molds one at a time to suspend parisons in position for final expansion in the finishing molds.

8. In a glassware forming machine, the combination of a body blank mold, a series of neck molds below the body blank mold rotating at a constant speed, a finishing mold below the neck molds, said molds rotatable about a common vertical axis, means to deliver charges of molten glass to the body blank mold at regular time intervals, means to rotate all of the molds at the same speed during a minor portion of each revolution, and cam mechanism to increase the speed of rotation of the body blank and finishing molds during the remaining portion of each revolution.

9. In a glassware forming machine, an annular series of invertible neck molds rotatable continuously about a vertical axis, said molds each having a cavity shaped to form a neck and sealing surface on the glassware, means to attach blanks to the neck molds while the latter occupy upright positions in which they open upwardly, means to invert the neck molds to suspend the blanks in position for final expansion, finishing molds less in number than the neck molds and adapted to enclose the inverted blanks, means to partly expand the blanks or parisons during inversion of the neck molds, and means for effecting sealing contact between the neck and finishing molds.

10. In a glassware forming machine, an annular series of neck molds rotatable about a vertical axis, means to rotate the molds at a constant speed, means to partly form blanks, means to attach the partly formed blanks to the neck molds and thereby complete formation of a part of said blanks, means to invert the neck molds to position the blanks upright in a plane below the axis about which the neck molds invert, finishing molds arranged to enclose the inverted blanks, said finishing molds being less in number than the neck molds, means to finally expand the blanks in said finishing molds, and means to rotate the finishing molds about said axis at the same speed as the neck molds at times and at a higher speed at other times.

11. In a glassware forming machine, a group of gathering molds mounted for rotary movement about a vertical axis, means to move the molds at a relatively low speed during a portion of each revolution, means including a disk and cam slide thereon rotating constantly at a relatively high speed to accelerate the speed of travel of the molds at regular time intervals, and a series of neck molds greater in number than the gathering molds and cooperating with the latter at times.

12. In a glassware forming machine, the combination of a neck mold carriage rotatable about a vertical axis at a constant speed, an annular series of invertible neck molds thereon, a suction body blank mold above the neck mold carriage common to all of the neck molds, means including a disk rotating constantly at a high speed to rotate the body blank mold about said vertical axis at a higher speed than the neck mold carriage during a major portion of each revolution and means to secure the body blank mold to the neck mold carriage at regular time intervals in register with one of said neck molds.

13. In a glassware forming machine, the combination of a neck mold carriage rotatable about a vertical axis, neck molds on the carriage, means to continuously rotate the carriage at a constant speed about said axis, a blank mold carriage above the neck mold carriage, a partible body blank mold on the blank mold carriage common to all of the neck molds, means including a disk rotating constantly at a high speed to rotate the latter at a higher speed than the neck mold carriage during a major portion of each revolution, means to secure the carriages together during a minor portion of each revolution with one of the neck molds in register with the blank mold, and a finishing mold below the neck mold carriage and with which the neck molds cooperate at regular time intervals.

14. In a glassware forming machine, superposed body blank and neck mold carriages rotatable about a vertical axis, molds on said carriages, the body blank molds being less in number than the neck molds and operating with different neck molds during successive cycles of operations, means to rotate the neck mold carriage continuously at a constant speed, means to rotate each body blank mold carriage at the same speed as the neck mold carriage during a minor portion of each revolution and at a higher speed during the remaining portion thereof, and means including centering pins individual to the neck molds and mounted in the neck mold carriage to lock the carriages together during said minor portion of each revolution.

15. In a glassware forming machine, the combination of a neck mold carriage rotatable about a vertical axis, neck molds thereon, means to continuously rotate the neck mold carriage at a constant speed about said axis, a group of body blank molds less in number than the neck molds and arranged above said carriage for rotation about said axis, means to rotate the body blank molds at the same speed as the neck molds during a minor portion of each revolution and at a higher rate of speed at other times, and cam controlled centering pins individual to the neck molds mounted in the neck mold carriage and adapted to secure the body blank molds and neck mold carriage together during synchronized movement thereof.

16. In a glassware forming machine, the combination of a neck mold carriage rotatable about a vertical axis, neck molds thereon, means to continuously rotate the neck mold carriage at a constant speed about said axis, a group of body blank molds arranged above said carriage for rotation about said axis, means to rotate the body blank molds in synchronism with the neck molds during a portion of each revolution and at a higher rate of speed at other times, cam controlled centering pins individual to the neck molds mounted in the neck mold carriage and adapted to secure the body blank molds and neck mold carriage together during synchronized movement thereof, a group of finishing molds arranged below the neck mold carriage, means to rotate the finishing molds at varying speeds about said axis, and means individual to the neck molds to secure the finishing molds and neck mold carriage together during a portion of each cycle of operations.

17. In a glassware forming machine, a neck mold carriage rotatable about a vertical axis, means for rotating it at a constant speed, neck molds mounted thereon for movement about horizontal axes extending radially of said carriage, said molds each having a cavity shaped to form a neck and sealing surface on the glassware, a plunger movable into and out of each neck mold and adapted to cooperate therewith in forming a portion of the finished glassware, means to exhaust air from each neck mold while it occupies an upright position with its open end facing upwardly, means to invert the neck mold to a position with its open end facing downwardly, means to rotate the neck mold about its axis during the inverting movement, means to introduce air under pressure into the neck mold during rotation and inversion thereof, a group of body blank molds less in number than the neck molds and arranged above the latter, means for rotating said body blank molds at the same speed as the neck molds at times and at a higher speed at other times, and finishing molds arranged below the neck molds.

18. In a glassware forming machine, an annular series of invertible neck molds rotatable about a vertical axis, means to rotate said molds continuously and at a constant speed, a group of suction body blank molds arranged above and less in number than the neck molds and adapted to be rotated about said vertical axis, a group of finishing molds arranged below and less in number than the neck molds and adapted to be rotated about said vertical axis, and means to rotate the blank and finishing molds with the neck molds as a unit during a predetermined portion of each revolution and at a higher speed than that of the neck molds during the remaining portion of each revolution.

19. In a glassware forming machine, an annular series of invertible neck molds rotatable about a vertical axis, means to rotate said molds continuously and at a constant speed, a group of suction body blank molds arranged above the neck molds for rotation about said vertical axis, a group of finishing molds arranged below the neck molds for rotation about said vertical axis, means to rotate the blank and finishing molds at the same speed as the neck molds during a predetermined minor portion of each revolution and at a higher speed than that of the neck molds during the remaining portion of each revolution, a neck mold carriage supporting the neck molds and disposed between the groups of blank and finishing molds, and means carried by the neck mold carriage and including vertically slidable pins individual to the neck molds to lock the blank and finishing molds and said carriage together during said minor portion of each revolution.

20. In a glassware forming machine, the combination of a stationary central pillar, a stationary continuous cam thereon, a finishing mold, a carrier for the finishing mold mounted for rotation about said pillar, a movable cam on said carrier, a disk rotating constantly at a relatively high speed about said pillar in a plane between the cams, a connector on said disk adapted for engagement with the movable cam at times to lock the disk and finishing mold together, said stationary cam shaped and operating to cause locking engagement between said disk and the movable cam on the carrier at times whereby said disk and mold carrier are moved in synchronism.

21. In a glassware forming machine, a stationary central pillar, a finishing mold carrier mounted for rotation on the pillar, a finishing mold on said carrier, a movable cam secured to the lower side of and rotatable with the carrier, a stationary cam encircling the pillar below the other cam, a portion of said stationary cam being disposed in vertical alignment with the path of travel of the cam on the mold carrier, a member rotating at a relatively high speed about said pillar between said cams and adapted to be secured to the movable cam during a portion of each revolution, and a connector carried by said member, said stationary cam causing operative engagement between the connector and movable cam to thereby lock the finishing mold carrier and said member together.

22. In a glassware forming machine, a stationary central pillar, a mold carrier mounted for continuous rotation in a horizontal plane about said pillar, a mold on said carrier, a movable cam secured to the lower side of and rotatable with the carrier, a device mounted for rotation about the pillar in a plane below the mold carrier, means to constantly rotate said device at a higher speed than the normal speed of the mold carrier, and a stationary cam encircling the pillar in a plane below said device and operating to secure said device to the movable cam at times and thereby cause high speed movement of the mold carrier with said device.

23. In a glassware forming machine, a stationary central pillar, a mold carrier mounted for continuous rotation in a horizontal plane about said pillar, a mold on said carrier, a neck mold carriage arranged below said mold carrier and rotatably supported on the pillar, a series of neck molds on said carriage, means to continuously rotate said carriage at a constant speed, means to lock the mold carrier to a different neck mold during a minor portion of each successive revolution of the mold carrier, and cam controlled means including a disk mounted on the pillar and rotating constantly at a relatively high speed for rotating said mold carrier at a relatively high speed during a major portion of each revolution of the carrier.

24. In a glassware forming machine, a stationary central pillar, a mold carrier mounted for continuous rotation in a horizontal plane about said pillar, a body mold on said carrier, a neck mold carriage arranged below said mold carrier and rotatably supported on the pillar, a series of neck molds on said carriage, means to continuously rotate said carriage at a constant speed, means to interlock the mold carrier and neck mold carriage during a minor portion of each revolution of the mold carrier and effect engagement between the body mold and a different neck mold during successive cycles of operations, cam controlled means for rotating said mold carrier at a higher speed than that of the neck mold carriage during the remaining portion of each revolution of the carrier, said cam controlled means including an angular cam attached to the lower side of the mold carrier, a device rotating between the mold carrier and neck mold carriage, a roller carried by said device and movable into the angular cam at times, and a stationary cam causing periodic interlocking of said roller and the angular cam on the mold carrier, whereby the speed of the latter is synchronized with the high speed of said device.

25. In a glassware forming machine, a neck mold carriage rotatable about a vertical axis, means to continuously rotate the carriage at a constant speed, neck molds on said carriage, a charge gathering mold arranged above the carriage for rotation about said vertical axis, a finishing mold positioned below said carriage for rotation about said vertical axis, means to interlock the carriage, gathering and finishing molds during a minor portion of each cycle of operations, and separate means to move the charge gathering and finishing molds at a higher speed than that of the neck molds during the remainder of each cycle of operations.

26. In a glassware forming machine, a neck mold carriage rotatable about a vertical axis, means to continuously rotate the carriage at a constant speed, an annular series of neck molds on said carriage, charge gathering and finishing mold carriages arranged above and below the neck mold carriage, molds on said carriages, means interlocking said carriages during a minor portion of each cycle of operations, whereby rotation of the neck mold carriage imparts rotary movement to the charge gathering and finishing mold carriages, and separate means for rotating the charge gathering and finishing mold carriages at a higher rate of speed than the neck mold carriage during the remainder of each revolution.

28. In a glassware forming machine, the combination of a neck mold carriage rotatable about a vertical axis, a series of neck molds thereon, a group of body molds less in number than the neck molds arranged above said carriage for rotation about said vertical axis, means rotating the neck mold carriage continuously and at a constant speed, means to move the body molds at a higher rate of speed than said carriage during a major portion of each revolution thereof, means carried by the neck mold carriage to secure the body molds to the neck mold carriage at times thereby causing movement of said molds as a unit during the remaining portion of each revolution, said last named means including combined centering and locking pins individual to the neck molds, and cam mechanism operating to move the pins into and out of position to secure the body molds and neck mold carriage together.

28. In a glassware forming machine, the combination of a stationary central pillar, a stationary continuous cam thereon, a finishing mold, a carrier for the finishing mold mounted for rotation about said pillar, a movable cam on said carrier, a disk rotating constantly at a high speed about said pillar between said cams, a connector carried by said disk for engagement with the cam on the carrier at times to secure the movable cam and disk together, said stationary cam shaped to cause a predetermined rate of acceleration of the speed of the movable cam and carrier prior to movement thereof at the speed of said disk, and later a predetermined rate of deceleration of the speed of said cam and carrier to their speed of rotation prior to acceleration.

29. In a glassware forming machine, the combination of an annular series of neck molds rotatable about a vertical axis past charge gathering, blank transfer, and final blowing zones, a body blank mold arranged in a plane above said neck molds, said body blank mold mounted for rotation about said axis, a finishing mold arranged in a plane below said neck molds and rotatable about said axis, means for delivering a mold charge of molten glass to the body blank mold in the charging zone, means for aligning said body blank mold with one of the neck molds in advance of the transfer zone, means for attaching the mold charge to the said neck mold and simultaneously forming a portion of the finished glassware, means for inverting said neck mold in the transfer zone for cooperation with the finishing mold, means causing sealing contact between the neck and finishing mold, means for expanding the glass to its final shape in said finishing mold, means for opening the neck mold upon completion of said final expansion leaving the finished article of glassware enclosed in the finishing mold, means for accelerating the speed of travel of the blank mold from a position substantially at said transfer zone to a position adjacent and in advance of the charging zone, and means for accelerating the speed of travel of the finishing mold from the blowing zone to a discharge zone.

30. In a glassware forming machine the combination of a series of partible neck molds rotatable continuously about a vertical axis, said neck molds each having a cavity to form a neck and sealing surface on the glassware, means for rotating said molds, a suction gathering blank mold common to and arranged above the series of neck molds and rotatable about said vertical axis, a partible finishing mold common to and arranged below the neck molds and rotatable about said axis, all of said molds movable past mold charging, blank transfer, and final blowing zones, means for delivering a mold charge of molten glass to the blank mold in the charging zone, means for causing cooperation of the blank mold and one of the neck molds during movement between the charging and transfer zones to thereby form a blank and affix it to the neck mold, means for opening the blank mold, means for then accelerating the speed of travel of the blank mold from the transfer zone to a point adjacent the charging zone, means for inverting the neck mold and effecting sealing engagement between said mold and the finishing mold and thereby enclosing the blank in said molds, and means for expanding the blank to its final shape.

31. In a glassware forming machine the combination of a series of partible neck molds rotatable continuously about a vertical axis, means for rotating said molds, a suction gathering blank mold arranged above the series of neck molds and rotatable about said vertical axis, a partible finishing mold arranged below the neck molds and rotatable about said axis, all of said molds movable past mold charging, blank transfer, and final blowing zones, means for delivering a mold charge of molten glass to the blank mold in the charging zone, means for causing cooperation of the blank mold and one of the neck molds during movement between the charging and transfer zones to thereby form a blank and affix it to the neck mold, means for opening the blank mold, means for then accelerating the speed of travel of the blank mold from the transfer zone to a point adjacent the charging zone, means for inverting the neck mold and effecting sealing engagement between said mold and the finishing mold and thereby enclosing the blank in said molds, means for expanding the blank to its final shape, means for opening the neck mold after completion of an article of glassware leaving the latter enclosed in the finishing mold, means for accelerating the speed of travel of the finishing mold from the blowing zone to a discharge zone, and means for opening the finishing mold in the discharge zone for the removal of said article of glassware.

32. In combination an annular series of partible neck molds rotatable about a vertical axis past charge gathering and blank transfer zones, said neck molds each having a cavity to form a neck and sealing surface on the glassware, means for rotating said molds at a constant speed, a partible blank mold common to said neck molds and arranged in a plane above the neck molds and rotatable about said vertical axis, means for rotating said blank mold about said axis at the same speed as the neck mold while moving past said charging zone and traveling to the transfer zone and at a higher speed at other times, means for reciprocating the blank mold between the charging zone spaced radially outwardly from the neck molds and in position over and in register with one of said neck molds, means for delivering a mold charge of molten glass to the blank mold while in said charging zone, means for partially forming a blank and affixing it to one of the neck molds while the latter and said blank mold are in register, means for finishing the blank, means for inverting said neck mold at the transfer zone and thereby suspending the blank in position to be enclosed in a finishing mold, and a finishing mold adapted to enclose said blank for final shaping.

33. In combination an annular series of partible neck molds rotatable about a vertical axis, means for rotating the molds continuously and at a constant speed, a body blank mold arranged above the neck molds and rotatable about said axis, all of said molds movable past charging, transfer, and discharge zones, means for delivering mold charges of molten glass to the body blank mold in the charging zone, means causing cooperation of the blank and neck molds in transferring mold charges into blanks, means for expanding the blanks, means for moving the body blank mold at a higher speed during a major portion of each cycle of operations than during the remaining portion, and means whereby the body blank mold is caused to cooperate with different neck molds in succeeding cycles of operation.

34. In a glassware forming machine an annular series of neck molds rotatable about a vertical axis, means for continuously rotating said molds at a constant speed, a group of body blank molds arranged above and less in number than the neck molds, a high speed disk arranged in a plane above the neck molds and rotating about said vertical axis at a higher speed than the neck molds, means for continuously rotating said disk, means for bringing the body blank molds and neck molds into register with each other at times, and means for locking the body blank molds one at a time to the disk during a major portion of each cycle of operations whereby said body blank molds are caused to travel at a higher speed than the neck molds.

35. In a glassware forming machine, an annular series of invertible neck molds rotatable about a vertical axis past charge gathering, blank transfer, and final blowing zones, a group of body blank molds arranged above, and lesser in number than the neck molds, a group of finishing molds arranged below and lesser in number than the neck molds, means for continuously rotating the neck molds at a constant speed, means for rotating the body blank and neck molds at the same speed in proximity to and in the charging and transfer zones, means for rotating the finishing molds at the same speed as the neck molds at said transfer and blowing zones, and means causing movement of the body blank and finishing molds at a higher speed than the neck molds at other times.

36. In a glass ware forming machine, a rotary mold carriage, a body blank mold, a ram carrying the blank mold and mounted on the carriage for projection and retraction radially of the machine between two operating positions, means including closed passageways in the walls of the molds for supplying cooling medium to the molds, and means utilizing the cooling medium to cushion the stopping of the ram movement at its retracted position.

37. In a glassware forming machine, a rotary mold carriage, a body blank mold, a ram carrying the blank mold and mounted on the carriage for reciprocation radially of the machine between two operating positions, said mold having closed chambers in its walls, a cushioning chamber supported on and rotatable with the mold carriage, telescopic pipe connection between the cushioning chamber and the chambers in the mold walls, and means for supplying cooling water to the pipes and chambers in the mold walls and maintaining a predetermined level of water in the cushioning chamber.

38. In a glassware forming machine, an annular series of neck molds, a group of body blank molds above the neck molds, a group of finishing molds below the neck molds, each group comprising a lesser number than the neck molds, means for continuously rotating the neck molds at a constant speed, means for moving the body blank and finishing molds at the same speed as the neck molds at times, and means individual to the groups of body blank and finishing molds for moving them at a higher speed than the neck mold at times, each of said last named means including a high speed disk and devices carried by the disk and molds associated therewith for locking the disk and molds together at times.

39. In a glassware forming machine the combination of an annular series of neck molds rotatable about a vertical axis, said neck molds each having a cavity to form a neck and sealing surface on the glassware, a group of body blank molds less in number than and arranged above the neck molds, a group of finishing molds below the neck molds, means for delivering mold charges of molten glass to the body blank molds, means to bring pairs of neck and body blank molds into register and sealing contact at regular time intervals, means to then cause movement of portions of the mold charges into the neck molds and thereby transform the charges into blanks and affix them to the neck molds, means to invert the neck molds to thereby suspend the blanks in position for expansion in the finishing molds, means for closing the finishing molds about the blanks and bringing the adjacent faces of the neck and finishing molds into sealing contact, and means for blowing the blanks to their finished form in the combined neck and finishing molds.

40. A glassware forming machine comprising a stationary central column, a neck mold carriage encircling the column and including a continuous upwardly facing bearing surface, neck molds on said carriage, means for rotating said carriage at a constant speed, blank mold carriers rotatively supported on the bearing surface and column and less in number than the neck molds, blank molds on said carriers, an annular series of equally spaced combined centering and locking pins mounted for vertical movement in the neck mold carriage, said pins adapted at times to project through and above said bearing surface to secure blank mold carriers to the neck mold carriage, means for so projecting said pins during a minor portion of each cycle of operations, and means for moving the blank mold carriers at a higher speed than the neck mold carriage during a major portion of each cycle of operations.

41. A glassware forming machine comprising a stationary central column, a neck mold carriage encircling the column and including a continuous upwardly facing bearing surface, neck molds on said carriage, means for rotating said carriage at a constant speed, blank mold carriers rotatively supported on the bearing surface and column and less in number than the neck molds, blank molds on said carriers operating with different neck molds during successive cycles of operations, an annular series of equally spaced combined centering and locking pins mounted for vertical movement in the neck mold carriage, said pins adapted at times to project through and above said bearing surface to secure blank mold carriers to the neck mold carriage, means for so projecting said pins during a minor portion of each cycle of operations, a ring mounted for rotation on the central column in proximity to the neck mold carriage, means for rotating said ring at a higher speed than the neck mold carriage, and means operating automatically to secure the blank mold carriers one at a time to said ring during a major portion of each cycle of operations.

42. A glassware forming machine comprising a stationary central column, a neck mold carriage encircling the column and including a continuous upwardly facing bearing surface, neck molds on said carriage, means for rotating said carriage at a constant speed, blank mold carriers rotatively supported on the bearing surface and column and less in number than the neck molds, blank molds on said carriers operating with different neck molds during successive cycles of operations, an annular series of equally spaced combined centering and locking pins mounted for vertical movement in the neck mold carriage, said pins adapted at times to project through and above said bearing surface to secure blank mold carriers to the neck mold carriage, means for so projecting said pins during a minor portion of each cycle of operations, a ring mounted for rotation on the central column in proximity to the neck mold carriage, means for rotating said ring at a higher speed than the neck mold carriage, and means operating automatically to secure the blank mold carriers one at a time to said ring while the centering and locking pins are disposed below said bearing surface.

43. A glassware forming machine comprising a stationary central column, a neck mold carriage encircling the column and including a continuous upwardly facing bearing surface, an annular series of neck molds on said carriage, means for rotating said carriage at a constant speed, blank mold carriers rotatively supported on the bearing surface and column and less in number than the neck molds, blank molds on said carriers operating with different neck molds during successive cycles of operations, an annular series of equally spaced combined centering and locking pins mounted for vertical movement in the neck mold carriage, said pins adapted at times to project through and above said bearing surface to secure blank mold carriers to the neck mold carriage, means for so projecting said pins during a minor portion of each cycle of operations, a ring mounted for rotation of the central column in proximity to the neck mold carriage, means for rotating said ring at a higher speed than the neck mold carriage, means operating automatically to secure the blank mold carriers one at a time to said ring during a major portion of each cycle of operations, said means for securing the blank mold carriers and ring together including a downwardly facing substantially V-shaped cam on each carrier, a slide mounted for radial movement on said ring, cam rolls on the upper and lower sides of the slide, and a cam below the slide engaging the lower cam roll and formed to hold the upper roller at the apex of the cams on the blank mold carriers one at a time at regular time intervals.

44. In a glassware forming machine, the combination of a stationary vertical column, a neck mold carriage rotatively supported thereon, an annular series of neck molds on the carriage, a group of body blank mold carriers less in number than the neck molds and arranged above the latter for movement about said column, downwardly opening body blank molds on said carriers, a group of finishing hold carriers corresponding in number to the body blank mold carriers and arranged in a plain below the neck mold carriers for movement about said column, partible finishing molds on said finishing mold carriers, mechanism for rotating the neck mold carriage at a constant speed, and means for moving said carriers at a higher speed than the neck molds during a major portion of each cycle of operations and causing the body blank and finishing molds to cooperate with different neck molds during successive cycles of operations.

45. In a glassware forming machine, the combination of a stationary vertical column, a neck mold carriage rotatively supported thereon, an annular series of neck molds on the carriage, a group of body blank mold carriers less in number than the neck molds and arranged above the latter for movement about said column, downwardly opening body blank molds on said carriers, a group of finishing mold carriers corresponding in number to the body blank mold carriers and arranged in a plane below the neck mold carriers for movement about said column, partible finishing molds on said finishing mold carriers, a main drive shaft extending upwardly through said column, means for rotating the shaft, a counter shaft arranged alongside of the drive shaft and operatively connected thereto, means operated by said counter shaft for moving said carriers at the same speed as that of the neck mold carriage, means for accelerating the speed of the body blank and finishing mold carriers at times including high speed rings driven by said drive shaft at a higher speed than the neck mold carriage, and automatic means operating to connect said carriers one at a time to the rings during a major portion of each cycle of operations.

46. In a glassware forming machine, a stationary central column, a neck mold carriage mounted for rotation about said column, means for rotating the carriage continuously at a constant speed, an annular series of neck molds on the carriage, means for delivering mold charges of glass to the neck molds, means whereby the mold charges are transformed into blanks while affixed to the neck molds, a group of finishing mold carriers arranged in a plane below and less in number than the neck molds, partible finishing molds on the carriers adapted for cooperation with the neck molds, each finishing mold cooperating with different neck molds during successive cycles of operation, automatically releasable means securing the finishing mold carriers and carriage together during a minor portion of each cycle of operations, and mechanism for accelerating the speed of the finishing mold carriers one at a time during the remaining portion of each cycle of operations.

47. In a glassware forming machine, a stationary central column, a neck mold carriage mounted for rotation about said column, means for rotating the carriage continuously at a constant speed, an annular series of neck molds on the carriage, means for delivering mold charges of glass to the neck molds, means whereby the mold charges are transformed into blanks while affixed to the neck molds, a group of finishing mold carriers arranged in a plane below and less in number than the neck molds, partible finishing molds on the carriers adapted for cooperation with the neck molds, each finishing mold cooperating with different neck molds during successive cycles of operation, automatically releasable means securing the finishing mold carriers and carriage together during a minor portion of each cycle of operations, a high speed ring rotating continuously about said column at a considerably higher speed than the neck mold carriage, a radially movable slide carried by said ring, cam rolls on the upper and lower sides of said slide, a stationary continuous cam engaging one of the cam rolls and controlling the radial position of the slide and other roll, and substantially V-shaped cams attached to the lower sides of the finishing mold carriers, said cams shaped and operating to effect driving connection between the high speed ring and finishing mold carrier one at a time during a major portion of each cycle of operations.

48. In a glassware forming machine, the combination of an annular series of neck molds mounted for rotation about a vertical axis, means for continuously rotating the molds at a constant speed, a group of body blank molds arranged above and less in number than the neck molds, a group of finishing molds corresponding in number to that of the body blank molds and arranged below the neck molds, means whereby the body blank and finishing molds are caused to move with and at the same speed as the neck molds at times, means for accelerating the speed of travel of said body blank and finishing molds at other times, means whereby the body blank molds are projected radially beyond the path of travel of the neck molds at a charging position to gather mold charges of molten glass, means for moving portions of the gathered mold charges into the neck molds to partially form a blank, and means for completing the blank.

49. In a glassware forming machine, a neck mold carrier mounted for rotation about a vertical axis, means for rotating the carrier continuously and at a constant speed, an annular series of neck molds uniformly spaced about the margin of the carrier, a group of body blank molds arranged above and less in number than the neck molds, a group of finishing molds corresponding in number to that of the body blank molds and arranged below the neck molds, said body blank and finishing molds rotatable about the axis of rotation of the neck mold carrier, means for holding the body blank molds and finishing molds one at a time in register with one of the neck molds during a minor portion of each cycle of operations and in register with different neck molds in successive cycles of operation, and means individual to the body blank and finishing molds for rotating them at a higher speed than that of the neck molds during the remaining portion of each cycle of operations.

50. In a glassware forming machine, the combination of a stationary central pillar, a continuously rotating drive shaft extending through the pillar, an annular series of neck molds mounted for rotation about the pillar and operatively connected to and driven at a constant speed by the shaft, a group of body blank molds arranged above and less in number than the neck molds and rotatable about said pillar, a group of finishing molds arranged below and less in number than the neck molds and rotatable about the pillar, means whereby the body blank and finishing molds are rotated as a unit with the neck molds at regular time intervals, means for alternately accelerating and decelerating the speed of movement of the body blank and finishing molds at regular tiem intervals including carriers individual to the molds, downwardly facing substantially V-shaped cams on the lower sides of the carrier, upwardly facing stationary continuous cams individual to and spaced below said carriers, a high speed disk disposed between each of the continuous cams and the adjacent group of mold carriers and rotating continuously about said central pillar, and a radially movable connector carried by each high speed disk, said connector moved into engagement with the cams on the mold carriers one at a time at regular time intervals by the corresponding stationary cam.

51. In a glassware forming machine, an annular series of neck molds, means for rotating them at a constant speed about a vertical axis, a group of body blank molds arranged above and a group of finishing molds arranged below and less in number than said series of neck molds, mold carriers individual to the body blank and finishing molds, means for connecting the body blank and finishing molds to the neck molds at regular time intervals and during a minor portion only of each cycle of operations, a downwardly facing V-shaped cam on the lower side of each mold carrier, a continuous stationary cam below and in proximity to each group of said V-shaped cams and extending about the axis of rotation of the molds, a high speed disk moving continuously about said axis between each stationary cam and the adjacent group of V-shaped cams, and a connector carried by each high speed disk and movable radially thereof under influence of the corresponding stationary cam into engagement with the V-shaped cams one at a time to secure the mold carriers and high speed disk together.

52. In a glassware forming machine, an annular series of neck molds, means for rotating them at a constant speed about a vertical axis, a group of body blank molds arranged above and a group of finishing molds arranged below and less in number than said series of neck molds, mold carriers individual to the body blank and finishing molds, means for connecting the body blank and finishing molds to the neck molds at regular time intervals and during a minor portion only of each cycle of operations, a downwardly facing V-shaped cam on the lower side of each mold carrier, a continuous stationary cam below and in proximity to each group of said V-shaped cams and extending about the axis of rotation of the molds, a high speed disk moving continuously about said axis between each stationary cam and the adjacent group of V-shaped cams, a slide mounted for radial reciprocation on each high speed disk, a pair of vertically aligned cam rolls on the upper and lower sides of said slide, and yielding means normally holding the slide in its innermost position to effect engagement between the lower cam roll and the corresponding stationary cam, said stationary cam shaped to move the slide and rollers radially outward into engagement with the corresponding V-shaped cams one at a time and hold them so engaged during a major portion of each cycle of operations.

WILLARD L. VAN NESS.